(12) United States Patent
Yahata et al.

(10) Patent No.: US 11,128,852 B2
(45) Date of Patent: *Sep. 21, 2021

(54) RECORDING MEDIUM, PLAYBACK DEVICE, AND PLAYBACK METHOD

(71) Applicant: PANASONIC INTELLECTUAL PROPERTY CORPORATION OF AMERICA, Torrance, CA (US)

(72) Inventors: Hiroshi Yahata, Osaka (JP); Tadamasa Toma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/864,659

(22) Filed: May 1, 2020

(65) Prior Publication Data

US 2020/0260061 A1 Aug. 13, 2020

Related U.S. Application Data

(63) Continuation of application No. 16/539,484, filed on Aug. 13, 2019, now Pat. No. 10,687,038, which is a
(Continued)

(30) Foreign Application Priority Data

Jul. 6, 2015 (JP) .................................. 2015-135393

(51) Int. Cl.
*H04N 9/87* (2006.01)
*H04N 9/82* (2006.01)
(Continued)

(52) U.S. Cl.
CPC .............. *H04N 9/87* (2013.01); *G11B 20/10* (2013.01); *G11B 20/1262* (2013.01);
(Continued)

(58) Field of Classification Search
USPC .................................. 386/230–232, 239–248
See application file for complete search history.

(56) References Cited

U.S. PATENT DOCUMENTS

| 6,088,506 | A | 7/2000 | Yoshio et al. |
| 2007/0280641 | A1 | 12/2007 | Uchimura |

(Continued)

FOREIGN PATENT DOCUMENTS

| CN | 101202095 | 6/2008 |
| CN | 101911713 A | 12/2010 |

(Continued)

OTHER PUBLICATIONS

English Translation of Chinese Search Report dated Aug. 5, 2020 for Chinese Patent Application No. 201910789379.1.

(Continued)

*Primary Examiner* — Hung Q Dang
(74) *Attorney, Agent, or Firm* — Greenblum & Bernstein, P.L.C.

(57) ABSTRACT

A playback device reads out from a recording medium and plays multiple High Dynamic Range (HDR) video streams that are encoded with video information. The playback device includes a first register, a second register and a playback unit. For each of the HDR video streams, the first register stores first information indicating whether the playback device corresponds to or not, and the second register stores second information indicating whether a display device connected to the playback device corresponds to or not. The playback unit plays the HDR video streams using a playback format selected based on a playback program stored in the recording medium, in a case where the first information and the second information indicate that there are multiple playback formats corresponding to both the playback device and the display device.

4 Claims, 46 Drawing Sheets

Related U.S. Application Data continuation of application No. 15/690,437, filed on Aug. 30, 2017, now Pat. No. 10,432,906, which is a continuation of application No. 15/290,018, filed on Oct. 11, 2016, now Pat. No. 10,057,557, which is a continuation of application No. PCT/JP2015/004063, filed on Aug. 17, 2015.

(60) Provisional application No. 62/109,262, filed on Jan. 29, 2015, provisional application No. 62/048,385, filed on Sep. 10, 2014.

(51) Int. Cl.

| | | |
|---|---|---|
| *H04N 21/426* | (2011.01) | |
| *H04N 21/432* | (2011.01) | |
| *H04N 21/44* | (2011.01) | |
| *H04N 21/488* | (2011.01) | |
| *G11B 27/28* | (2006.01) | |
| *G11B 27/30* | (2006.01) | |
| *G11B 27/32* | (2006.01) | |
| *G11B 20/12* | (2006.01) | |
| *G11B 27/34* | (2006.01) | |
| *H04N 5/85* | (2006.01) | |
| *H04N 9/804* | (2006.01) | |
| *G11B 20/10* | (2006.01) | |

(52) U.S. Cl.
CPC ............ *G11B 27/28* (2013.01); *G11B 27/309* (2013.01); *G11B 27/3027* (2013.01); *G11B 27/322* (2013.01); *G11B 27/329* (2013.01); *G11B 27/34* (2013.01); *H04N 5/85* (2013.01); *H04N 9/8042* (2013.01); *H04N 9/8233* (2013.01); *H04N 21/42646* (2013.01); *H04N 21/4325* (2013.01); *H04N 21/44008* (2013.01); *H04N 21/4884* (2013.01); *G11B 2220/2562* (2013.01)

(56) References Cited

U.S. PATENT DOCUMENTS

| | | |
|---|---|---|
| 2010/0208042 A1 | 8/2010 | Ikeda |
| 2011/0142426 A1 | 6/2011 | Sasaki et al. |
| 2011/0150421 A1 | 6/2011 | Sasaki |
| 2011/0164121 A1 | 7/2011 | Ikeda et al. |
| 2011/0205224 A1 | 8/2011 | Oh |
| 2011/0310235 A1 | 12/2011 | Sasaki et al. |
| 2014/0037206 A1 | 2/2014 | Newton |
| 2014/0038514 A1 | 2/2014 | Robbins |
| 2014/0125696 A1 | 5/2014 | Newton et al. |
| 2014/0371894 A1 | 12/2014 | Shan |
| 2016/0301907 A1 | 10/2016 | Uchimura |
| 2017/0221524 A1 | 8/2017 | Uchimura |

FOREIGN PATENT DOCUMENTS

| | | |
|---|---|---|
| CN | 103597812 | 2/2014 |
| JP | 9-282848 | 10/1997 |
| JP | 2007-328840 | 12/2007 |
| JP | 2011-160431 A | 8/2011 |
| WO | 2011/004600 | 1/2011 |
| WO | 2011/080907 | 7/2011 |
| WO | 2012/172460 | 12/2012 |

OTHER PUBLICATIONS

International Search Report of PCT application No. PCT/JP2015/004063 dated Nov. 2, 2015.
English Translation of Chinese Search Report dated Apr. 12, 2019 for Chinese Patent Application No. 201580002748.8.

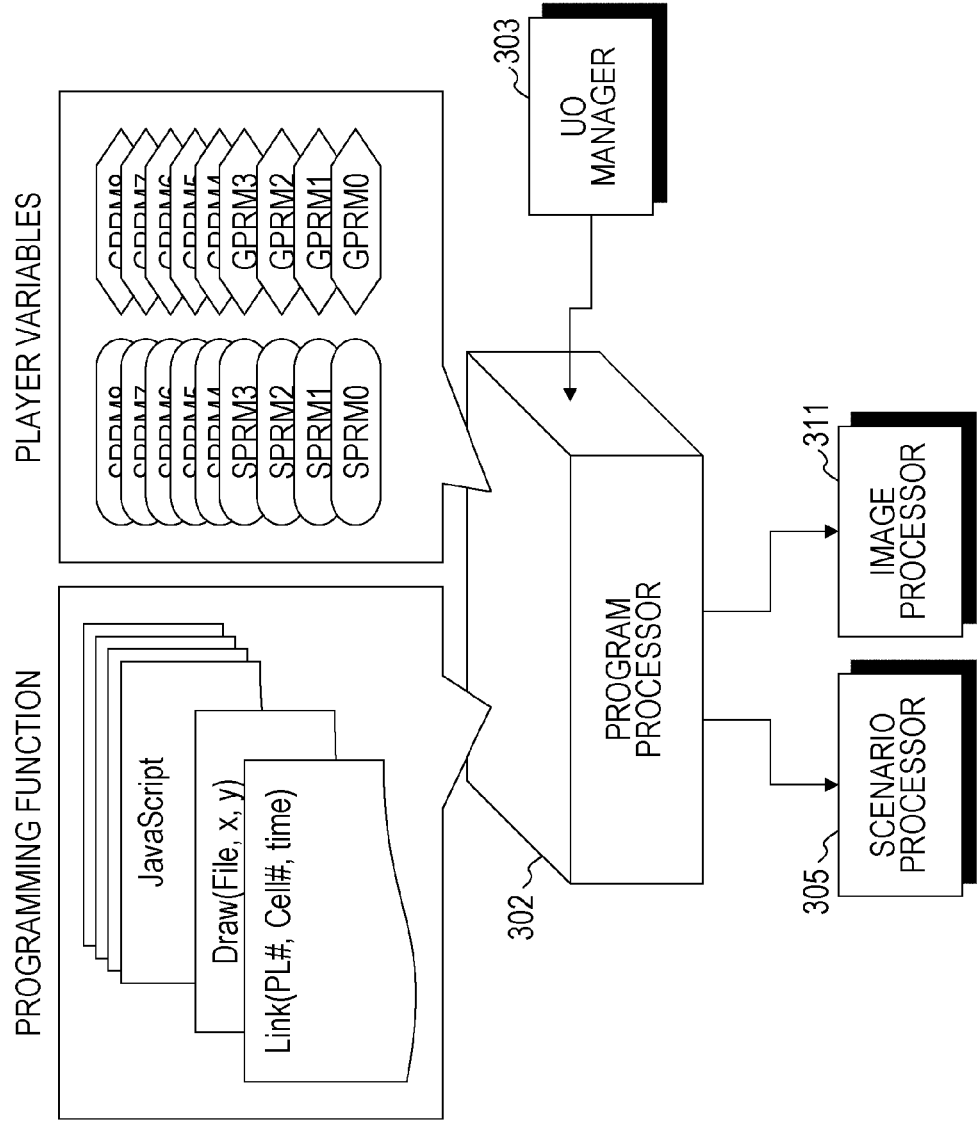

FIG. 24

PLAYER VARIABLES (SYSTEM PARAMETERS)

| 0 | Language Code | 11 | Player audio mixing mode for Karaoke | 22 | reserved |
|---|---|---|---|---|---|
| 1 | Audio stream number | 12 | Country code for parental management | 23 | Player status |
| 2 | Subtitle stream number | 13 | Parental level | 24 | reserved |
| 3 | Angle number | 14 | Player configuration for Video | 25 | reserved |
| 4 | Title number | 15 | Player configuration for Audio | 26 | reserved |
| 5 | Chapter number | 16 | Language code for AST | 27 | reserved |
| 6 | Program number | 17 | Language code ext. for AST | 28 | reserved |
| 7 | Cell number | 18 | Language code for STST | 29 | reserved |
| 8 | Key name | 19 | Language code ext. for STST | 30 | reserved |
| 9 | Navigation timer | 20 | Player region code | 31 | reserved |
| 10 | Current playback time | 21 | reserved | 32 | reserved |

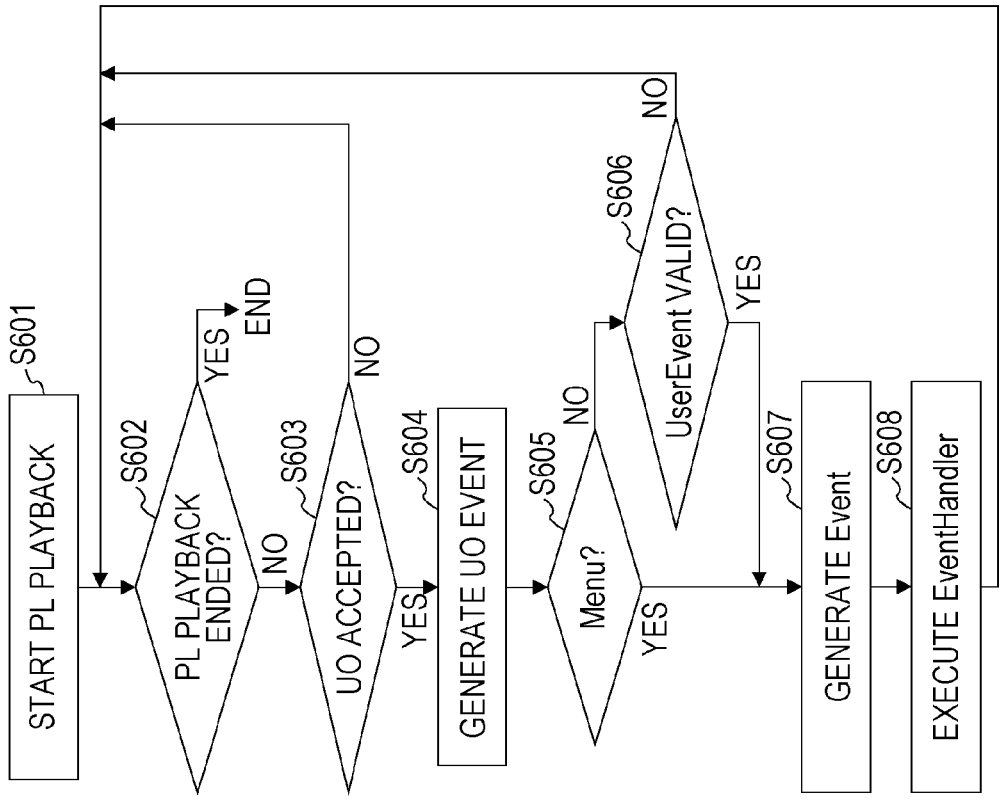
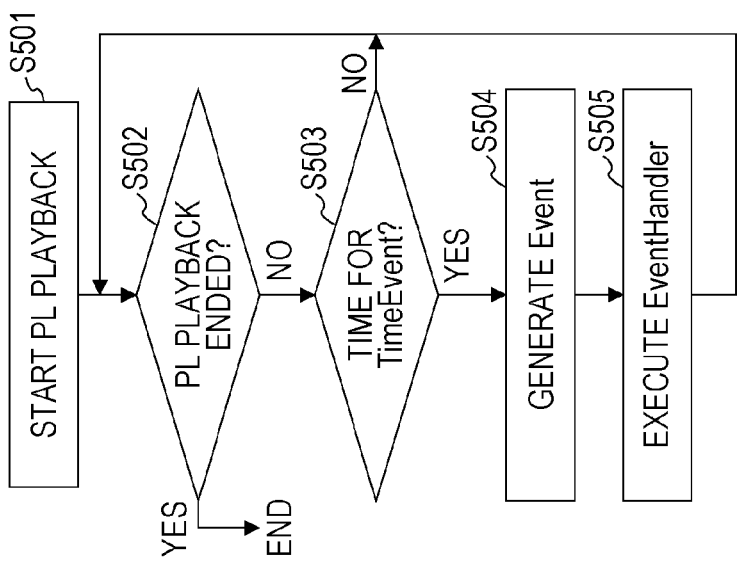

FIG. 40

```
PID assignment table
┌─────────────────────────────┐
│ HDR video streams           │
│ HDR_video_PID1 –            │
│ HDR_video_PID32             │
├─────────────────────────────┤
│ SDR video streams           │
│ SDR_video_PID1 –            │
│ SDR_video_PID32             │
├─────────────────────────────┤
│ audio streams               │
│ audio_PID1 – audio_PID32    │
├─────────────────────────────┤
│ HDR PG streams              │
│ HDR_PG_PID1 – HDR_PG_PID32  │
├─────────────────────────────┤
│ SDR PG streams              │
│ SDR_PG_PID1 – SDR_PG_PID32  │
├─────────────────────────────┤
│ HDR IG streams              │
│ HDR_IG_PID1 – HDR_IG_PID32  │
├─────────────────────────────┤
│ SDR IG streams              │
│ SDR_IG_PID1 – SDR_IG_PID32  │
└─────────────────────────────┘
```

FIG. 41

```
Palette_definition_segment(){
  segment_descriptor()
  palette_id
  palette_version_number
  while (processed length < segment length)
    palette_entry(){
      palette_entry_id
      Y
      Cr
      Cb
      transparent_alpha
    }
  }
}
```

RECORDING MEDIUM, PLAYBACK DEVICE, AND PLAYBACK METHOD

CROSS-REFERENCE TO RELATED APPLICATIONS

This is a continuation application of U.S. patent application Ser. No. 16/539,484, filed Aug. 13, 2019, which is a Continuation of U.S. patent application Ser. No. 15/690,437, filed Aug. 30, 2017 and now U.S. Pat. No. 10,432,906 issued Oct. 1, 2019, which is a Continuation of U.S. patent application Ser. No. 15/290,018, filed Oct. 11, 2016 and now U.S. Pat. No. 10,057,557 issued Aug. 21, 2018, which is a Continuation of International Patent Application No. PCT/JP2015/004063, filed Aug. 17, 2015, which claims the benefit of U.S. Provisional Patent Application No. 62/109,262, filed Jan. 29, 2015, U.S. Provisional Patent Application No. 62/048,385, filed Sep. 10, 2014, and Japanese Patent Application No. 2015-135393, filed Jul. 6, 2015. The disclosure of each of these documents, including the specification, drawings, and claims, is incorporated herein by reference in its entirety.

BACKGROUND

1. Technical Field

The present disclosure relates to a recording medium in which is recorded encoded video streams, a playback device and playback method for playing encoded video streams recorded in the recording medium.

2. Description of the Related Art

Technology relating to DVDs has conventionally been disclosed (e.g., Japanese Unexamined Patent Application Publication No. 9-282848). However, further improvement was needed with this technology.

SUMMARY

In one general aspect, the techniques disclosed here feature a recording medium, in which is recorded a main video stream where a main video has been encoded, and a sub-video stream where a sub-video, that is to be superimposed on the main video and displayed, has been encoded, wherein the sub-video stream includes bitmap data indicating a design of the sub-video and palette data specifying the display color of the design, and wherein the palette data includes first palette data for a first luminance dynamic range, and second palette data for a second luminance dynamic range that is broader than the first dynamic range.

According to the above form, further improvement can be realized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 23 is a diagram for describing the functional configuration of a program processor;

FIG. 24 is a diagram illustrating a list of system parameters (SPRM);

FIG. 29A is a flowchart illustrating the flow of processing relating to a time event in a BD-ROM player;

FIG. 29B is a flowchart illustrating the flow of processing relating to a user event in a BD-ROM player;

FIG. 40 is a diagram illustrating PIDs used in each stream;

FIG. 41 is a diagram illustrating the configuration of a PDS;

DETAILED DESCRIPTION

Underlying Knowledge Forming Basis of the Present Invention

However, further improvement was needed with the above-described Japanese Unexamined Patent Application Publication No. 9-282848. The present Inventors found that the following problem occurs relating to the recording media such as DVD and the like described in the "Background Art" section.

Most representative of information recording media recording video data is the DVD (hereinafter, may also be referred to as "Standard Definition" (SD-DVD). A conventional DVD will be described below.

Figure 1:
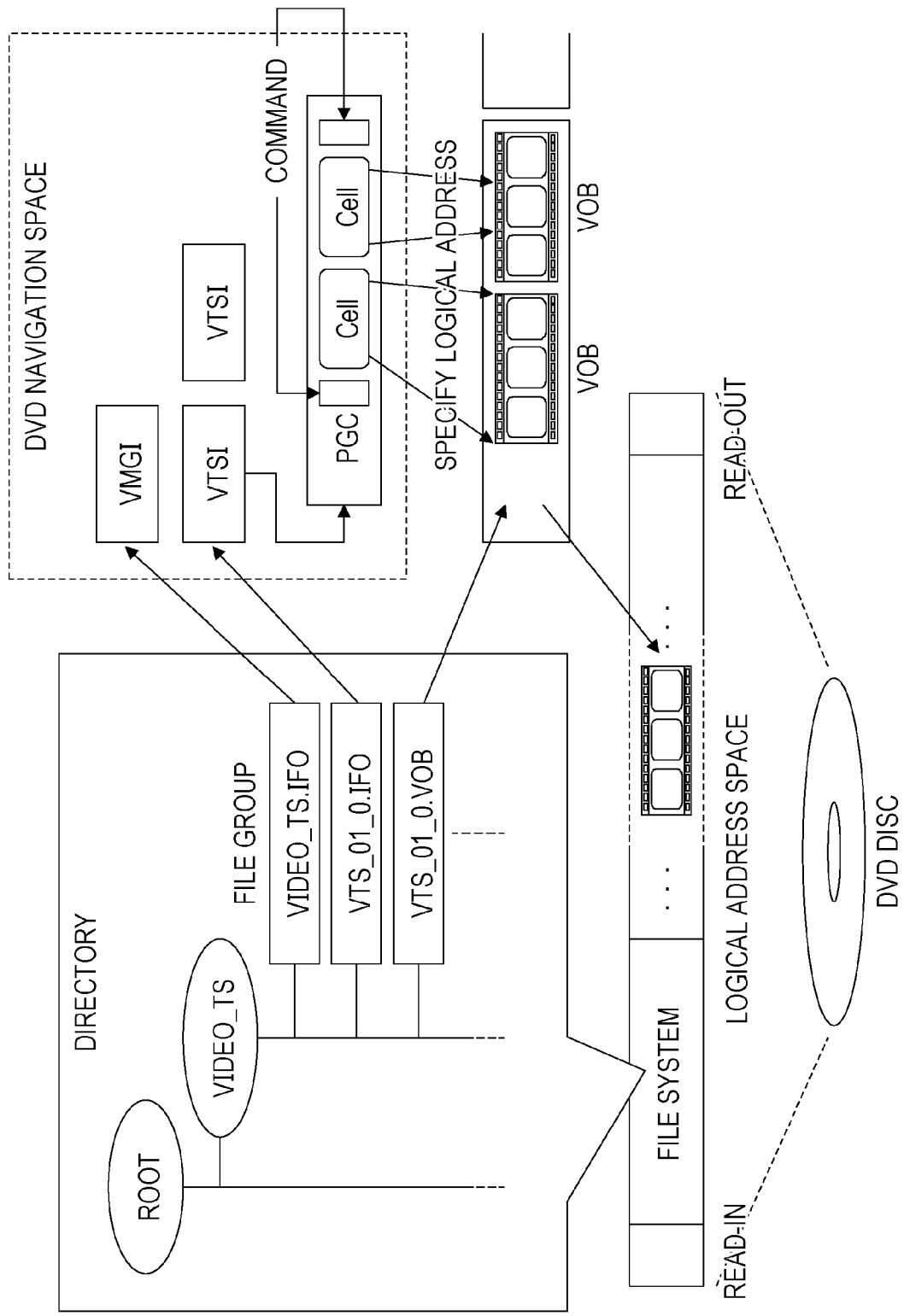
FIG. 1 is a diagram illustrating an SD-DVD structure.

FIG. 1 is a diagram illustrating the structure of an SD-DVD. As shown in the lower tier in FIG. 1, the DVD disc has a logical address space provided between a read-in and a read-out. Volume information of a file system is recorded from the beginning of the logical address space, and after that is recorded application data such as video, audio, and so forth.

The file system is an arrangement for managing data, that is stipulated by Standards such as ISO9660, Universal Disc Format (UDF), and so forth, and is an arrangement to express data on the disc in increments called directories or files. There are file systems called File Allocation Tables (FAT) and NT File System (NTFS) in everyday-use personal computers (PC) as well, whereby data recorded in a hard disk are expressed on the computer as structures called directories or files, thereby improving usability.

In the case of an SD-DVD, both UDF and ISO9660 file systems are used. The two together are also referred to as "UDF bridge". The recorded data is arranged so that the data can be read out by a file system driver according to either UDF or ISO9660. Note that the DVD used here is a ROM disc for packaged media, to which writing is physically impossible.

Data recorded in the DVD can be viewed through the UDF bridge as directories or files such as illustrated to the upper left in FIG. 1. Immediately below the root directory ("ROOT" in FIG. 1) is placed a directory called "VIDEO_TS", and it is here that DVD application data is recorded. Application data is recorded as multiple files, primary files being the following types of files.

VIDEO_TS.IFO Disc play control information file
VTS_01_0.IFO Video title set #1 play control information file
VTS_01_0.VOB Video title set #1 stream file
. . .

As shown in the above example, two suffixes are stipulated. "IFO" is a suffix indicating that the file has play control information recorded therein, and "VOB" is a suffix indicating that the file has an MPEG stream, which is AV data, recorded therein.

Play control information is information attached to the AV data, such as information to realize interactivity employed with the DVD (technology to dynamically change playing in response to user operations), metadata, and so forth. Play control information is also commonly referred to as navigation information regarding DVDs.

The play control information files include the "VIDEO_TS.IFO" that manages the entire disc, and the "VTS_01_0.IFO" that is play control information for individual video title sets. Note that multiple titles, in other words, multiple different movies and tunes, can be recorded in a single disc in the case of DVD. "01" in the file name body indicates the No. of the video title set, and in the case of the video title set #2, for example, this is "VTS_02_0.IFO".

The upper right portion in FIG. 1 is DVD navigation space in the application layer of the DVD, and is the logical structure space where the aforementioned play control information is loaded. Information within the "VIDEO_TS.IFO" is loaded in the DVD navigation space as VIDEO Manager Information (VMGI), as well as are "VTS_01_0.IFO" and play control information existing for each of other video title sets as Video Title Set Information (VTSI).

Described in the VTSI is Program Chain Information (PGCI) which is information of a play sequence called Program Chain (PGC). PGCI is made up of a set of Cells and a type of programming information called commands.

A Cell itself is information indicating a partial section or a whole section of a VOB (short for Video Object, and indicates an MPEG stream), and playing a Cell means to play the section of this VOB instructed by the Cell.

Commands are processed by a virtual machine of the DVD, and are close to Java (a registered trademark) Script and so forth executed in browsers to display Web pages, for example. However, while Java (registered trademark) Script performs window or browser control (e.g., opening a new browser window, etc.) besides logical operations, DVD commands differ in that they only execute playback control of AV titles, e.g., instructing a chapter to play or the like, for example, besides logical operations.

A Cell has the start and end addresses (logical addresses) of a VOB recorded in the disc as internal information thereof. A player reads out data using the start and end address information of the VOB described in the Cell, and executes playback.

Figure 2:
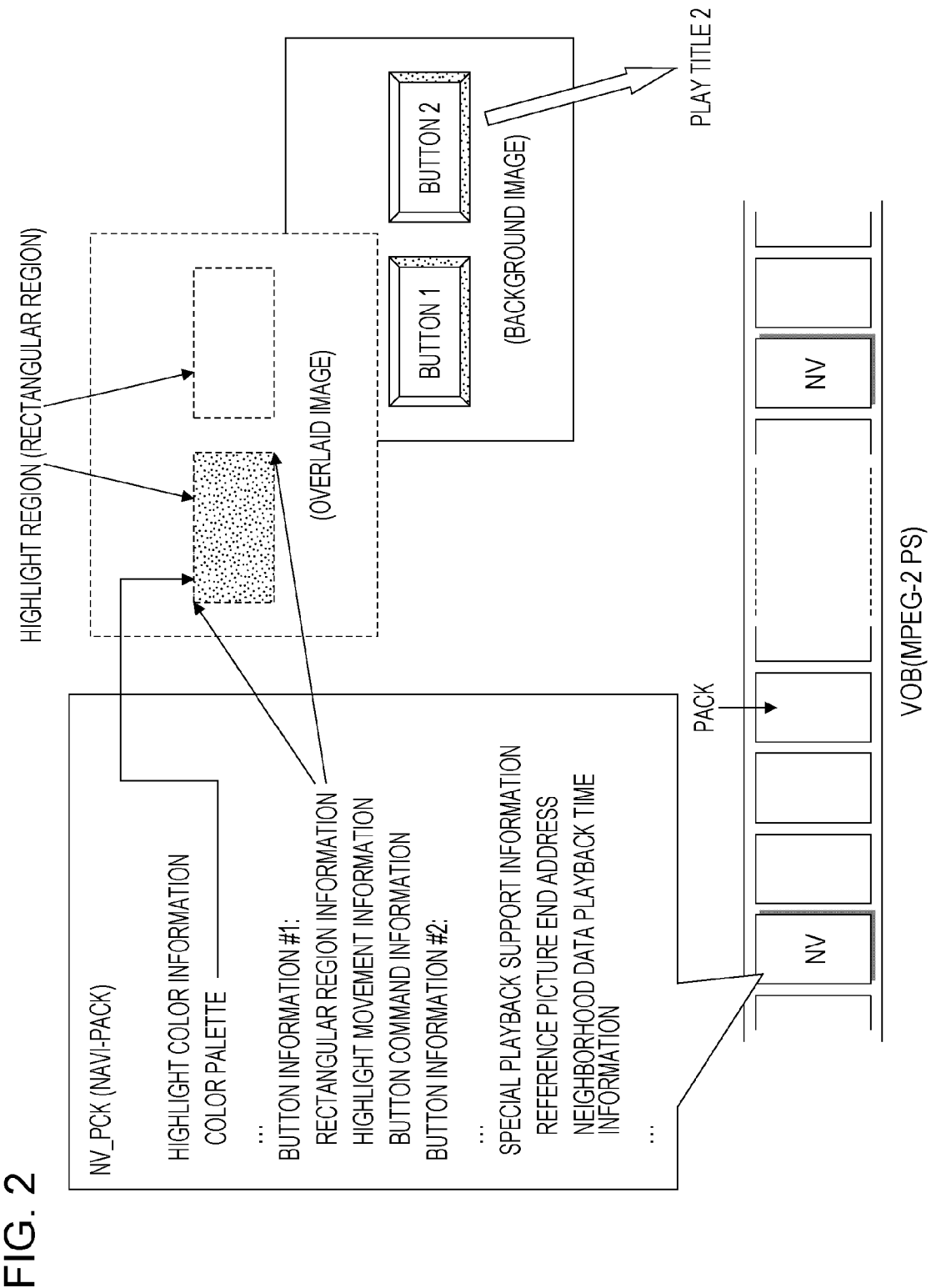
FIG. 2 is a schematic diagram for describing navigation information embedded in an MPEG stream, which is AV data.

FIG. 2 is an overview for describing navigation information embedded in an MPEG stream, which is AV data.

Interactivity, which is a feature of the SD-DVD, is realized not only by the navigation information recorded in the aforementioned "VIDEO_TS.IFO" and "VTS_01_0.IFO" and so forth. Several important sets of information are multiplexed in the VOB along with video and audio data, using a dedicated carrier called navigation packs (called navi-pack or NV_PCK).

A menu screen will be described here as a simple example of interactivity. Several buttons are shown on the menu screen, with processing to be executed defined for each button when that button is selected.

One button is selected on the menu screen (a translucent color is overlaid on the selected button in highlight that button, indicating to the user that button is in a selected state), and the user can move the button in the selected state to any of the buttons above or below, to the left or to the right, using arrow keys on a remote controller. Using the arrow keys of the remote controller to move the highlight to the button to be selected and executed, and okaying (pressing an OK key) executes the program of the corresponding command. Generally, playback of a corresponding title or chapter is executed by the command.

The upper left portion in FIG. 2 shows an overview of information stored in an NV_PCK. Highlight color information, information of individual buttons, and so forth, are included in the NV_PCK. Color palette information is described in the highlight color information, specifying the highlight translucent color to be displayed overlaid.

Described in the button information are rectangular region information which is the position information of each button, moving information from that button to other buttons (specification of destination buttons corresponding to each operation of the arrow keys by the user), and button command information (a command to be executed when that button is okayed).

The highlight on the menu screen is created as an overlaid image, as illustrated to the upper right portion in FIG. 2. The overlaid image is an object where rectangular region information of button information has been given color in color palette information. This overlaid image is composited with the background image illustrated at the right portion in FIG. 2, and displayed on the screen.

The menu screen of a DVD is realized as described above. The reason why part of the navigation data is embedded in the stream using an NV_PCK is as follows. That is, to realize without problem processing where synchronization timing readily becomes problematic, such as dynamically updating menu information synchronously with the stream, for example, displaying a menu screen for just five to ten minutes partway through playing a movie.

Another major reason is to improve user operability, such as to store information for supporting special playback in an NV_PCK, so that AV data can be decoded and played smoothly during non-normal playback, such as fast-forward and fast-rewind while playing the DVD.

Figure 3:
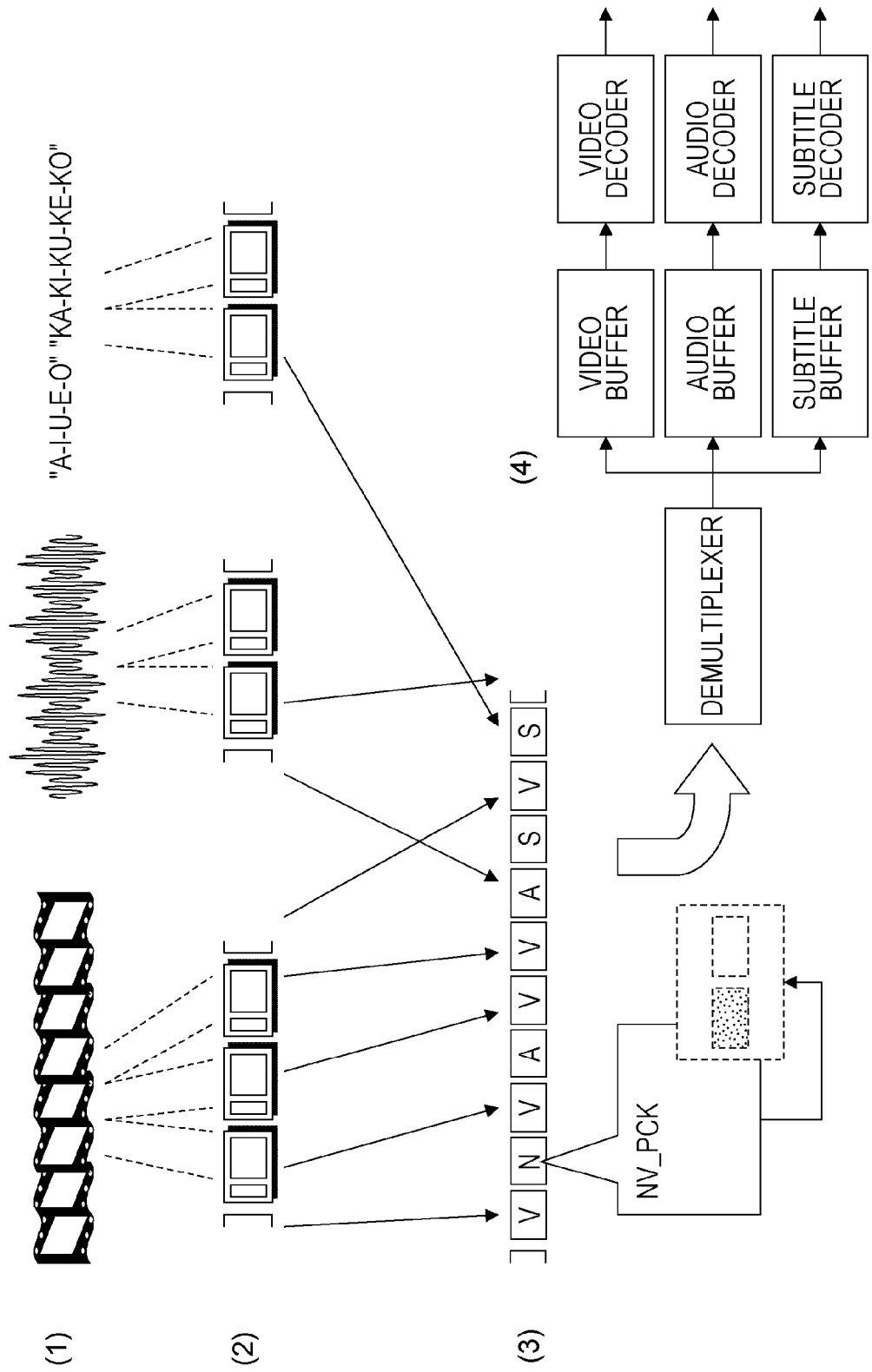
FIG. 3 is a schematic diagram illustrating a VOB structure in a DVD.

FIG. 3 is a schematic diagram illustrating the configuration of a VOB in a DVD. Data such as video, audio, and subtitles ((1) in FIG. 3) are packetized and packed according to the MPEG system (ISO/IEC13818-1) Standard ((2) in FIG. 3), and these are multiplexed to form a single MPEG program stream ((3) in FIG. 3), as illustrated in FIG. 3. The NV_PCKs including button commands for realizing interactivity are also multiplexed along with these, as described above.

A feature of multiplexing in the MPEG system is that the individual pixels of data that are multiplexed are in a bit string based on decoding order, but the bit string is not necessarily formed in playback order, that is to say decoding order, among the multiplexed data, i.e., among the video, audio, and subtitles.

This is due to a decoder model of the MPEG system stream ((4) in FIG. 3, generally referred to as System Target Decoder or STD) has decoder buffers corresponding to each elementary stream after demultiplexing, that temporarily stored the data until the decoding timing. These decoder buffers have different sizes according to each of the individual elementary streams, having 232 kB for video, 4 kB for audio, and 52 kB for subtitles. Accordingly, the data input timing to each decoder buffer differs among the individual elementary streams, so there is discrepancy between the order of forming the bit string as the MPEG system stream, and the timing of displaying (decoding). That is to say, the subtitle data multiplexed along with the video data is not necessarily decoded at the same timing. Technology relating to DVDs such as described above is described in Japanese Unexamined Patent Application Publication No. 9-282848.

Now, consideration had not been given to jump rules enabling continuous playback even if branching in multiple angles while playing the video or switching between recording layers or the like occurring. Time during jumping is time when data reading cannot be performed, so the bit stream consumed for playback of video during that time needs to be buffered beforehand. Accordingly, there is a problem that the size of memory for buffer and so forth cannot be designed in the player unless there is an assumption of a predetermined maximum jump time (and maximum bitrate of the stream).

Now, in a large-capacity recording media such as a Blu-ray (registered trademark) Disc (BD)), there is a possibility that extremely high-definition video information can be stored. For example, it is conceivable that 4K (video information having resolution of 3840×2160 pixels) or HDR (high-luminance video information commonly called High Dynamic Range) or the like can be stored in a BD.

It is also conceivable to store both HDR video and SDR video in a single BD, so that video can be played at a playback device not compatible with HDR. Now, HDR video includes video with higher luminance than SDR video. Accordingly, in a case of using the same subtitle information and so forth in SDR and HDR, there is a problem that the visibility of the subtitles and so forth will decrease in one of SDR and HDR.

Also, in a case of having shape material of subtitles or menus in duplicate for SDR and HDR when playing HDR video, there is the problem that disc capacity is wastefully consumed.

In light of the above studies, the Present Inventors studied the following improvement measures to solve the above problems.

According to a form of the present disclosure, in a recording medium is recorded a main video stream where a main video has been encoded, and a sub-video stream where a sub-video, that is to be superimposed on the main video and displayed, has been encoded. The sub-video stream includes bitmap data indicating a design of the sub-video and palette data specifying the display color of the design. The palette data includes first palette data for a first luminance dynamic range, and second palette data for a second luminance dynamic range that is broader than the first luminance dynamic range.

Accordingly, using different pallet data for the first luminance dynamic range and the second luminance dynamic range enables display of sub-video suitable for each luminance dynamic range. Thus, the visibility of the sub-video (e.g., subtitles) by the user can be improved.

For example, an arrangement may be made wherein the bitmap data includes first bitmap data for the first luminance dynamic range, and second bitmap data for the second luminance dynamic range, and wherein the sub-video stream is obtained by a plurality of types of the sub-video displayed superimposed on the main video being encoded, and includes a plurality of sets, each of which corresponds to one of the plurality of types of sub-video, each including a first sub-video stream including the first palette data and the first bitmap data of the corresponding sub-video, and a second sub-video stream including the second palette data and the second bitmap data of the corresponding sub-video.

Accordingly, the same type of sub-video is prepared for the first luminance dynamic range and the second luminance dynamic range, so the user can be provided with the same viewing experience when playing the first luminance dynamic range and the second luminance dynamic range.

For example, a difference value between a value of a first identifier given to a first sub-video stream included in a first set included in the plurality of sets, and a value of a second identifier given to a first sub-video stream included in a second set included in the plurality of sets, may be equal to a difference value between the value of a third identifier given to a second sub-video stream included in a first set, and a value of a fourth identifier given to a second sub-video stream included in the second set.

Accordingly, the user can be provided with the same viewing experience when playing the first luminance dynamic range and the second luminance dynamic range. Further, the processing content at the playback device and the like can be made to be the same at the time of playback of the first luminance dynamic range and the second luminance dynamic range, so the processing of the playback device can be simplified, and the functions and configuration of a conventional playback device that is only compatible with the first luminance dynamic range can be applied. Thus, the development costs of a playback device compatible with the second luminance dynamic range can be reduced.

For example, the design indicated by the first bitmap data and the second bitmap data included in the same set may the same.

For example, of the data included in the same set, all data may be the same other than the first palette data and the second palette data.

Also, according to a form of the present disclosure, a playback device includes: a readout unit that reads out a main video stream where a main video has been encoded, and a sub-video stream where a sub-video, that is to be superimposed on the main video and displayed, has been encoded, are recorded in a recording medium; and a playback unit that plays the main video stream and the sub-video stream that have been read out. The sub-video stream includes bitmap data indicating a design of the sub-video and palette data specifying the display color of the design. The palette data includes first palette data for a first luminance dynamic range, and second palette data for a second luminance dynamic range that is broader than the first luminance dynamic range.

Accordingly, using different pallet data for the first luminance dynamic range and the second luminance dynamic range enables display of sub-video suitable for each luminance dynamic range. Thus, the visibility of the sub-video (e.g., subtitles) by the user can be improved.

Also, according to a form of the present disclosure, in a playback method of a playback device that reads out from a recording medium and plays a video stream that is encoded video information, the playback device includes a first register storing first information indicating, out of a plurality of playback formats, a playback format corresponding to the playback device, a second register storing second information indicating, out of the plurality of playback formats, a playback format corresponding to a display device connected to the playback device, and a third register storing third information indicating, out of the plurality of playback formats, a playback format set by a user. The playback method includes playing the video stream using the playback format indicated by the third information, in a case where the first information and the second information indicate that there are a plurality of playback formats corresponding to both the playback device and the display device, out of the plurality of playback formats corresponding to both the playback device and the display device. Accordingly, the user can select a playback method as desired.

For example, the third information may indicate a degree of priority of the plurality of playback formats, and in the playing, the playback format of the plurality of playback formats corresponding to both the playback device and the display device of which the degree of priority indicated by the third information is the highest may be used to play the video stream.

For example, in a case where a playback format corresponding to both the playback device and the display device has been newly added by the first information or the second information being updated, notification may be performed to prompt the user to set a degree of priority for the playback format that has been newly added.

Accordingly, in a case where a usable playback format has been added in accordance with change in the usage environment of the user, a menu or the like setting the degree of priority of this playback format is automatically displayed. Accordingly, ease of user for the user can be improved.

Also, according to a form of the present disclosure, a playback device that reads out from a recording medium and plays a video stream that is encoded video information includes a first register storing first information indicating, out of a plurality of playback formats, a playback format corresponding to the playback device; a second register storing second information indicating, out of the plurality of playback formats, a playback format corresponding to a display device connected to the playback device; a third register storing third information indicating, out of the plurality of playback formats, a playback format set by a user; and a playback unit that plays the video stream using the playback format indicated by the third information, in a case where the first information and the second information indicate that there are a plurality of playback formats corresponding to both the playback device and the display device, out of the plurality of playback formats. Accordingly, the user can select a playback method according as desired.

Preferred embodiments to carry out the present disclosure will be described below with reference to the attached drawings.

It should be noted that the second embodiment is the closest to the disclosure of the present application, the basic configuration of the information recording medium and so forth in the second embedment will be described first by way of the first embodiment, to facilitate understanding.

First Embodiment

First, the basic structure and operations of a BD-ROM and a BD-ROM player that plays BD-ROMs will be described with reference to FIGS. 1 through 30.

Logical Data Structure on Disc

Figure 4:
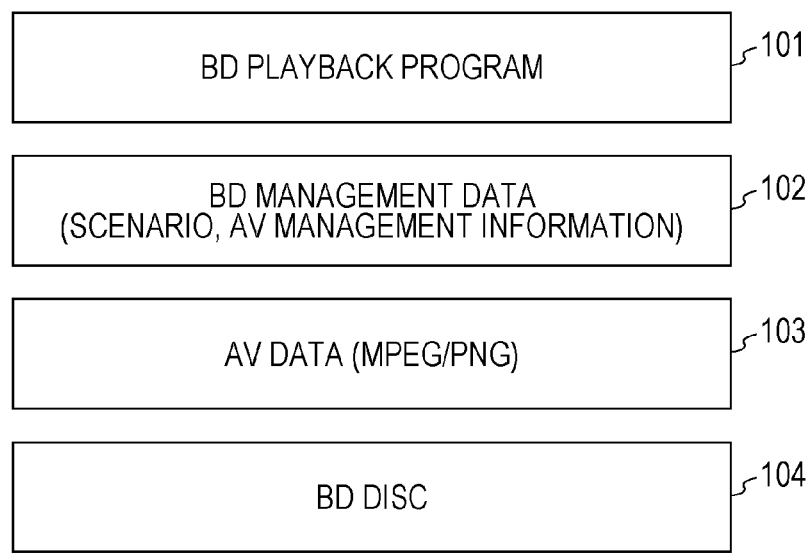
FIG. 4 is a diagram illustrating a data hierarchy of a BD-ROM.

FIG. 4 is a diagram illustrating data hierarchy on a BD-ROM. As illustrated in FIG. 4, there are recorded in a BD-ROM 104 that is a disc medium, AV data 103, BD management information 102 such as management information relating to the AV data, AV playback sequence, and so forth, and a BD playback program 101 that realizes interactivity.

Note that in the present embodiment, description of BD-ROM will be made primarily with regard to an AV application that plays AV contents such as movies, but a BD-ROM can be used as a recording medium for computer use, in the same way as with CR-ROMs and DVD-ROMs, as a matter of course.

Figure 5:
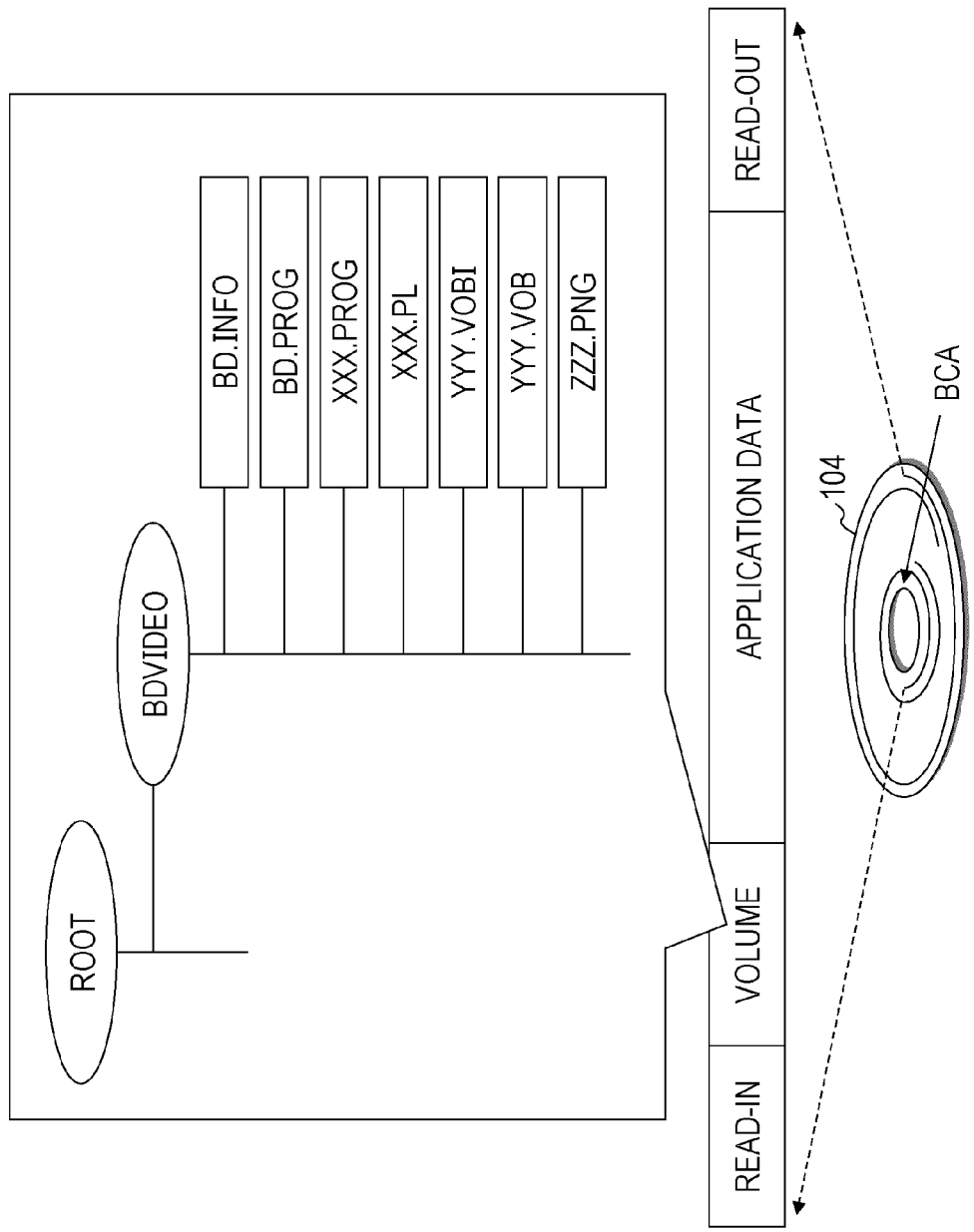
FIG. 5 is a diagram illustrating a structure of logical data recorded in a BD-ROM.

FIG. 5 is a diagram illustrating the structure of logical data recorded on the above BD-ROM 104. The BD-ROM 104 has a recording region in the form of a spiral from the inner perimeter thereof toward the outer perimeter, and has a logical address space where logical data can be recorded, between a read-in at the inner perimeter and a read-out at the outer perimeter, in the same way as with other optical discs, such as DVDs and CDs, for example.

On the inner side of the read-in there is a special region called a Burst Cutting Area (BCA), that can only be read out by the drive. This region is unreadable by applications, and accordingly is often used in copyright protection technology and so forth, for example.

Application data such as video data and the like is recorded the logical address space, with file system information (volume) at the beginning thereof. The file system is the arrangement for managing data stipulated by a standard such as UDF or ISO9660 or the like, as described above in the conventional art. Logical data recorded therein can be read out using the directory and file structure, in the same way as with a normal PC.

In the case of the present embodiment, the directory and file structure on the BD-ROM 104 has a BDVIDEO directory immediately below the root directory (ROOT). This directory is a directory in which data, such as AV data and management information handled by the BD-ROM (the BD playback program 101, BD management information 102, and AV data 103 illustrated in FIG. 4) is recorded. The following seven types of files are recorded beneath the BDVIDEO directory.

BD.INFO (fixed filename)

This is one of "BD management information", and is a file in which is recorded information relating to the entire BD-ROM. The BD-ROM player reads out this file first.

BD.PROG (fixed filename)

This is one of "BD playback programs", and is a file in which is recorded a program relating to the entire BD-ROM.

XXX.PL ("XXX" is variable, suffix "PL" is fixed)

This is one of "BD management information", and is a file in which is recorded playlist (Play List) information that records a scenario. Each playlist has one file.

XXX.PROG ("XXX" is variable, suffix "PROG" is fixed)

This is one of "BD playback programs", and is a file in which is recorded a program for each aforementioned playlist. The correlation to the playlist is identified by the file body name ("XXX" matches).

YYY.VOB ("YYY" is variable, suffix "VOB" is fixed)

This is one of "AV data", and is a file in which is recorded a VOB (the same as the VOB described in the conventional example). One VOB corresponds to one file.

YYY.VOBI ("YYY" is variable, suffix "VOBI" is fixed)

This is one of "BD management information", and is a file in which is recorded management information relating to the VOB which is AV data. The correlation to the VOB is identified by the file body name ("YYY" matches).

ZZZ.PNG ("ZZZ" is variable, suffix "PNG" is fixed)

This is one of "AV data", and is an image file in PNG (an image format standardized by the World Wide Web Consortium (W3C) and is pronounced "ping") which is image data for configuring subtitles and menu screens. One PNG image corresponds to one file.

Player Configuration

Figure 6:
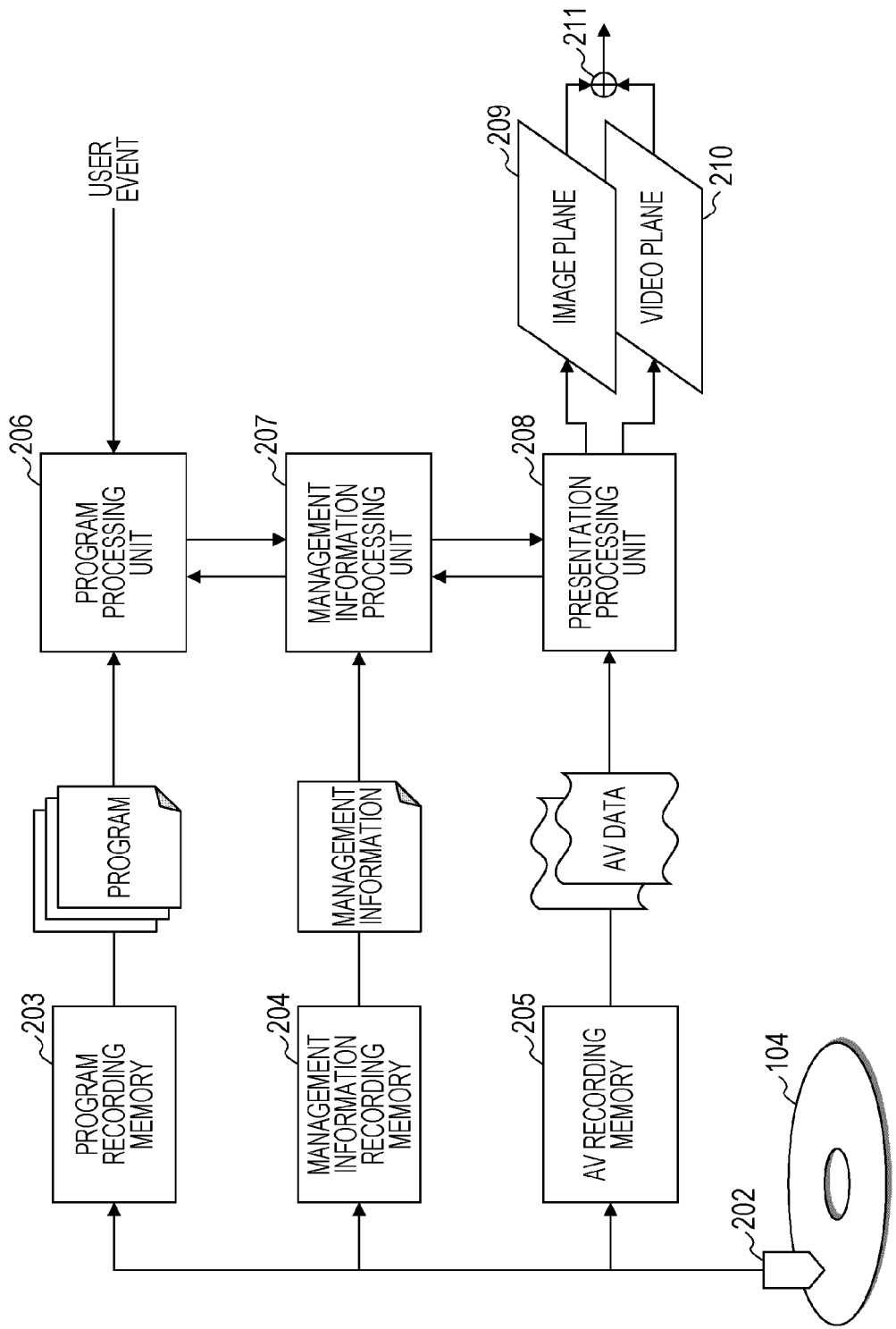
FIG. 6 is a diagram illustrating an overview of a basic configuration of a BD-ROM player that plays BD-ROMs.

Next, the configuration of a player that plays the BD-ROM 104 described above will be described with reference to FIGS. 6 and 7. FIG. 6 is a schematic diagram illustrating the basic configuration of a BD-ROM player that plays the BD-ROM 104.

The BD-ROM player illustrated in FIG. 6 reads out data on the BD-ROM 104 via an optical pickup 202. The data that is read out is stored in dedicated memory in accordance with the type of each data. The BD playback program ("BD.PROG" or "XXX.PROG" file) is recorded in program recording memory 203, the BD management information ("BD.INFO", "XXX.PL", or "YYY.VOBI" file) in management information recording memory 204, and AV data ("YYY.VOB" or "ZZZ.PNG" file) in AV recording memory 205, respectively.

The BD playback program recorded in the program recording memory 203 is processed by a program processing unit 206. The BD management information recorded in the management information recording memory 204 is processed by a management information processing unit 207. Also, the AV data recorded in the AV recording memory 205 is processed by a presentation processing unit 208.

The program processing unit 206 receives information of a playlist to be played from and event information such as the timing to execute a program from the management information processing unit 207, and performs processing of the program. The playlist to play can be dynamically changed at the program, and this can be realized by sending a play command of the playlist after changing to the management information processing unit 207.

The program processing unit 206 further accepts events from the user, such as requests from a remote controller that the user operates for example, and in a case where there is a program corresponding to the user event, executes the processing.

The management information processing unit 207 receives instructions from the program processing unit 206 and analyzes a playlist corresponding to that instruction and the management information of a VOB corresponding to that playlist. Further, playback instructions of AV data to be played are given to the presentation processing unit 208. The management information processing unit 207 also receives reference time information from the presentation processing unit 208, and performs stopping instruction of the AV data playback to the presentation processing unit 208 based on the time information. Further, an event is generated indicating the program executing timing as to the program processing unit 206.

The presentation processing unit 208 has decoders corresponding to each data of video, audio, and subtitles, and decodes and outputs AV data in accordance with instructions from the management information processing unit 207. The video data and subtitle data is drawn on respective dedicated planes after decoding.

Specifically, the video data is drawn on a video plane 210, and image data such as subtitle data is drawn on an image plane 209, further, compositing processing of the video drawn on the two planes is performed by a compositing processing unit 211 and output to a display device such as a TV or the like.

Figure 7:
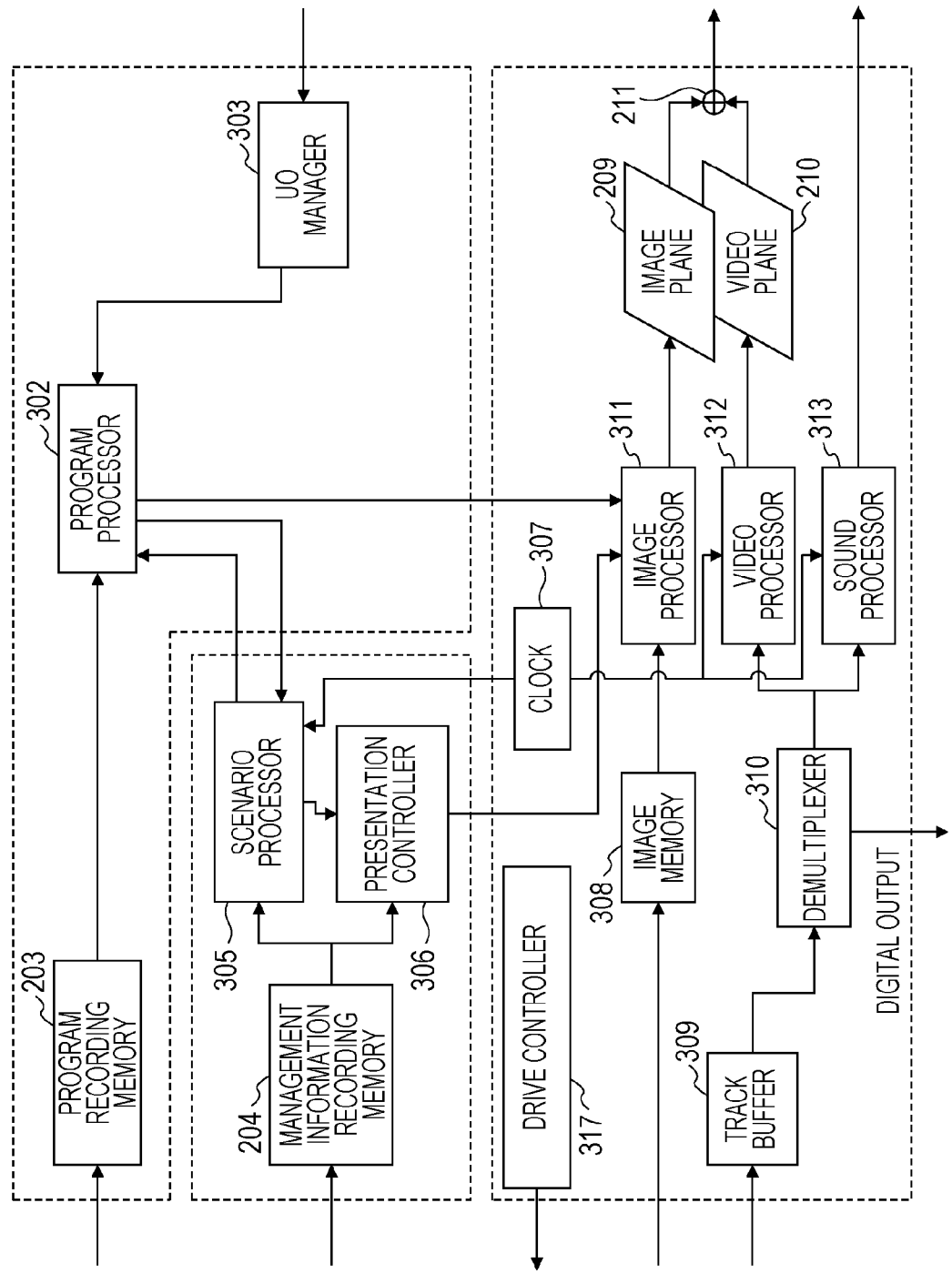
FIG. 7 is a block diagram where the configuration of the player illustrated in FIG. 6 is detailed.

The BD-ROM player has a configuration based on the data structure recorded in the BD-ROM 104 illustrated in FIG. 4, as illustrated in FIG. 6. FIG. 7 is a block diagram detailing the configuration of the player illustrated in FIG. 6. The correlation of the components illustrated in FIG. 6 and the components illustrated in FIG. 7 is as follows.

The AV recording memory 205 corresponds to image memory 308 and a track buffer 309. The program processing unit 206 corresponds to a program processor 302 and a UO (User Operation) manager 303. The management information processing unit 207 corresponds to a scenario processor 305 and a presentation controller 306. The presentation processing unit 208 corresponds to a clock 307, a demultiplexer 310, an image processor 311, a video processor 312, and a sound processor 313.

The VOB data (MPEG stream) read out from the BD-ROM 104 is recorded in the track buffer 309, and the image data (PNG) in the image memory 308, respectively.

The demultiplexer 310 extracts VOB data recorded in the track buffer 309, based on the time obtained from the clock 307. Further, video data included in the VOB data is sent to the video processor 312, and the audio data to the sound processor 313, respectively.

The video processor 312 and sound processor 313 each are configured including a decoder buffer and a decoder, as stipulated by the MPEG system standard. That is to say, the data of each of the video and audio sent from the demultiplexer 310 is temporarily recorded in the respective decoder buffers, and subjected to decoding processing at the respective decoders following the clock 307.

There are the following two processing methods for the PNG data recorded in the image memory 308. In a case where the PNG data is for subtitles, the decoding timing is instructed by the presentation controller 306. The scenario processor 305 first receives the time information from the clock 307, and instructs the presentation controller 306 to display or not display subtitles when the subtitle display time (starting and ending) arrives, so that appropriate subtitle display can be performed.

The image processor 311 which has received a decode/display instruction from the presentation controller 306 extracts the corresponding PNG data from the image memory 308, decodes, and draws on the image plane 209.

Also, in a case where the PNG data is for a menu screen, the decoding timing is instructed by the program processor 302. When the program processor 302 instructs decoding of the image is dependent on the BD program that the program processor 302 is processing, and accordingly is not always the same.

The image data and video data is drawn on the image plane 209 and video plane 210 after the respective decoding described in FIG. 6, and composited and output by the compositing processing unit 211.

The management information read out from the BD-ROM 104 (scenario and AV management information) is recorded in the management information recording memory 204, but the scenario information ("BD.INFO" and "XXX.PL") is read out and processed by the scenario processor 305. Also, the AV management information ("YYY.VOBI") is read out and processed by the presentation controller 306.

The scenario processor 305 analyzes the playlist information, instructs the presentation controller 306 of the VOB referenced by the playlist and the playback position thereof. The presentation controller 306 analyzes the management information ("YYY.VOBI") of the VOB to be handled, and instructs a drive controller 317 to read out the VOB to be handled.

The drive controller 317 follows the instructions of the presentation controller 306 to move the optical pickup 202, and read out the AV data to e handled. The AV data that has been read out is recorded in the image memory 308 or track buffer 309, as described earlier.

The scenario processor 305 monitors the time of the clock 307, and hands the event to the program processor 302 at the timing set in the management information.

The BD program recorded in the program recording memory 203 ("BD.PROG" or "XXX.PROG") is executed by the program processor 302. The program processor 302 processes a BD program in a case where an event has been sent from the scenario processor 305 or a case where an event has been sent from the UO manager 303.

In a case where a request has been sent from the user by a remote controller key, the UO manager 303 generates an event corresponding to this request, and sends to the program processor 302. Playback of a BD-ROM is performed by the operations of the components in this way.

Application Space

Figure 8:
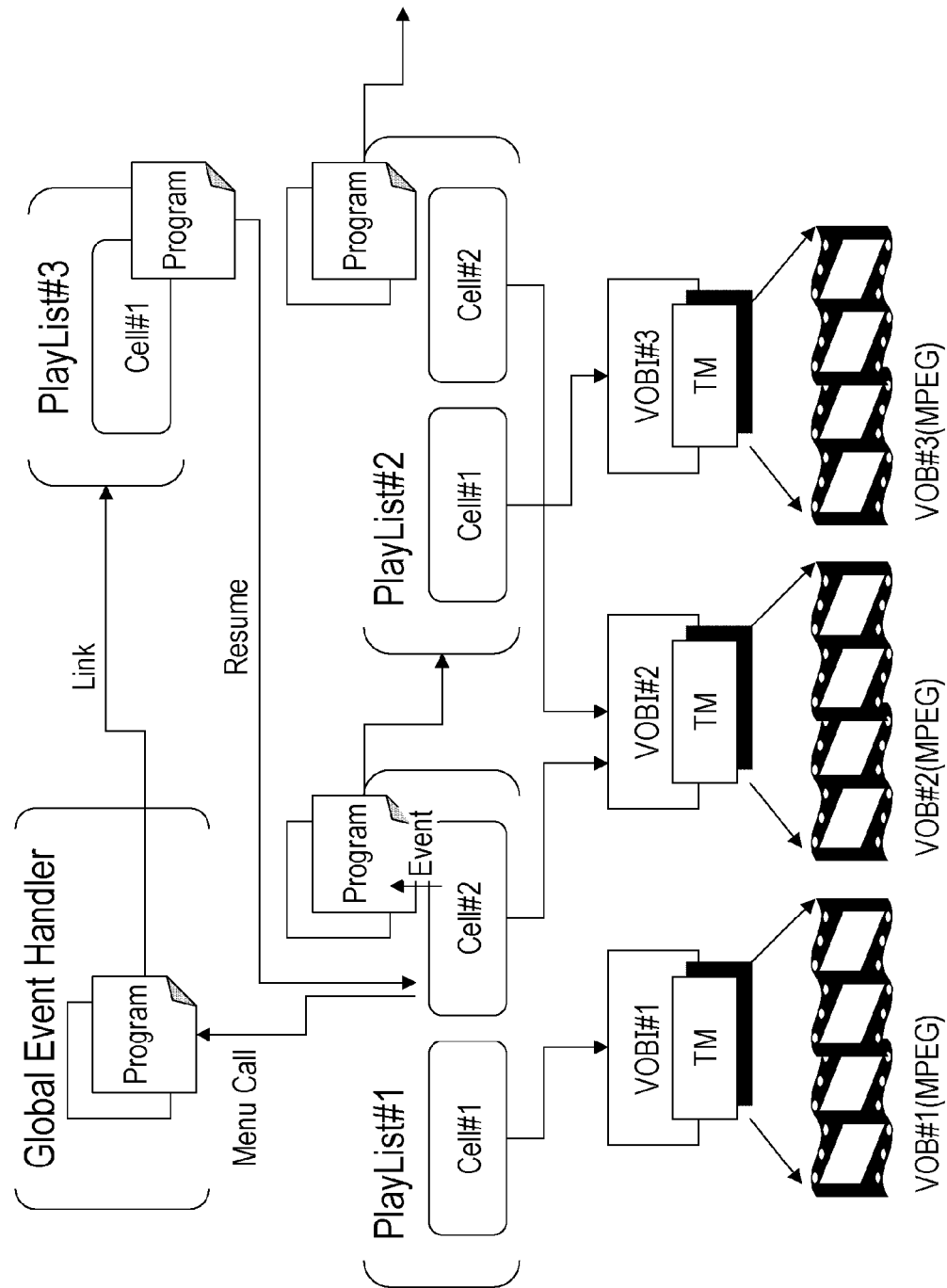
FIG. 8 is a diagram illustrating application space of a BD-ROM.

FIG. 8 is a diagram illustrating application space of a BD-ROM. In the application space of a BD-ROM, a playlist (PlayList) is one playback unit. A playlist has a static scenario that is made up of a playback sequence of cells (Cell), and a dynamic scenario described by a program.

As long as there is no dynamic scenario according to a program, the playlist is simply playing the individual cells in order, and playback of the playlist ends at the point that playback of all cells has ended. On the other hand, a program is capable of describing playback beyond the playlist, and dynamically changing the object of playback in accordion with user selections or the state of the player. A typical example is dynamic change of the object of playback made via the menus screen. In the case of a BD-ROM, a menu is a scenario played by user selection, i.e., one component of a function to dynamically select a playlist.

The term program as used here means an event handler executed by a time-based event or a user event. A time-based event is an event generated based on time information embedded in the playlist. An event sent from the scenario processor 305 to the program processor 302 as described in FIG. 7 corresponds to this. Upon a time-based event being issued, the program processor 302 process execution of an event handler correlated by ID.

As described earlier, a program to be executed may instruct playback of another playlist, and in this case, the playback of the playlist currently being played is canceled, and transitions to playback of the specified playlist.

A user event is an event generated by operations of remote controller keys by the user. There are two general types of user events. A first is an event of selecting a menu generated by operations of cursor keys ("up", "down", "left", and "right" keys) and an "OK" key that the remote controller has.

The event handler corresponding to the event of menu selection is only valid for restricted time within the playlist. That is to say, validity periods are set for each of the event handles, as playlist information. The program processor 302 searches for a valid event handler when an "up", "down", "left", "right", or "OK" key of the remote controller has been pressed, and in a case where there is a valid event handler, the event handler is executed. Otherwise, the event of menu selection is ignored.

The second user event is an event for calling up a menu screen generated by operation of a "menu" key. Upon a menu screen call-up event being generated, a global event handler is called.

A global event handler is an event handler that is not dependent on any playlist, and is constantly valid. Using this function enables a DVD menu call to be implemented. Implementing a menu call enables audio and subtitle menus and so forth to be called up during playback of a title, and to execute playback of the title from the paused point, after the audio or subtitles has been changed.

A cell (Cell), which is a unit making up a static scenario in the playlist, is a reference to all or part of a playback section of a VOB (MPEG stream). A cell has information of starting and ending time of the playback section within the VOB. VOB management information (VOBI), that is paired with each VOB, has a time map (Time Map or TM) therein, and can find the readout start address and end address for the playback and end time of the VOB within the VOB (i.e., within the object file "YYY.VOB") described by this time map. Details of the time map will be described later with reference to FIG. 14.

Details of VOB

Figure 9:
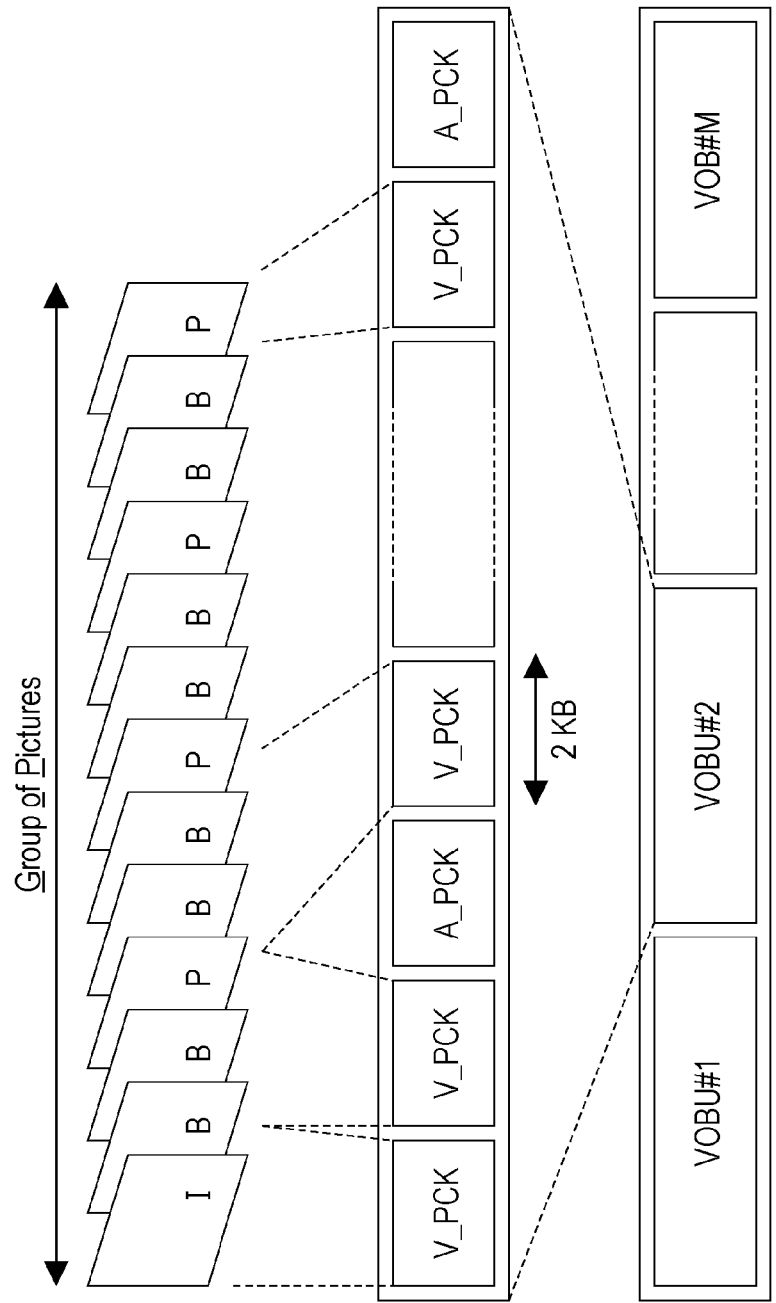
FIG. 9 is a diagram illustrating the configuration of an MPEG stream (VOB)

FIG. 9 is a diagram illustrating the configuration of an MPEG stream (VOB) used in the present embodiment. As illustrated in FIG. 9, a VOB is made up of multiple Video Object Units (VOBU). A VOBU is a unit based on a Group Of Pictures (GOP) in a MPEG video stream, and is one playback unit in a multiplexed stream including audio data.

A VOBU has playback time of 0.4 seconds to 1.0 seconds, and normally has playback time of 0.5 seconds. This is due to the MPEG GOP structure normally being 15 frames/second (in the case of NTSC).

A VOBU has a video pack (V_PCK) that is video data and an audio pack (A_PCK) that is audio data therein. Each pack is configured of 1 sector, and in the case of the present embodiment is configured in 2 kB units.

Figure 10:
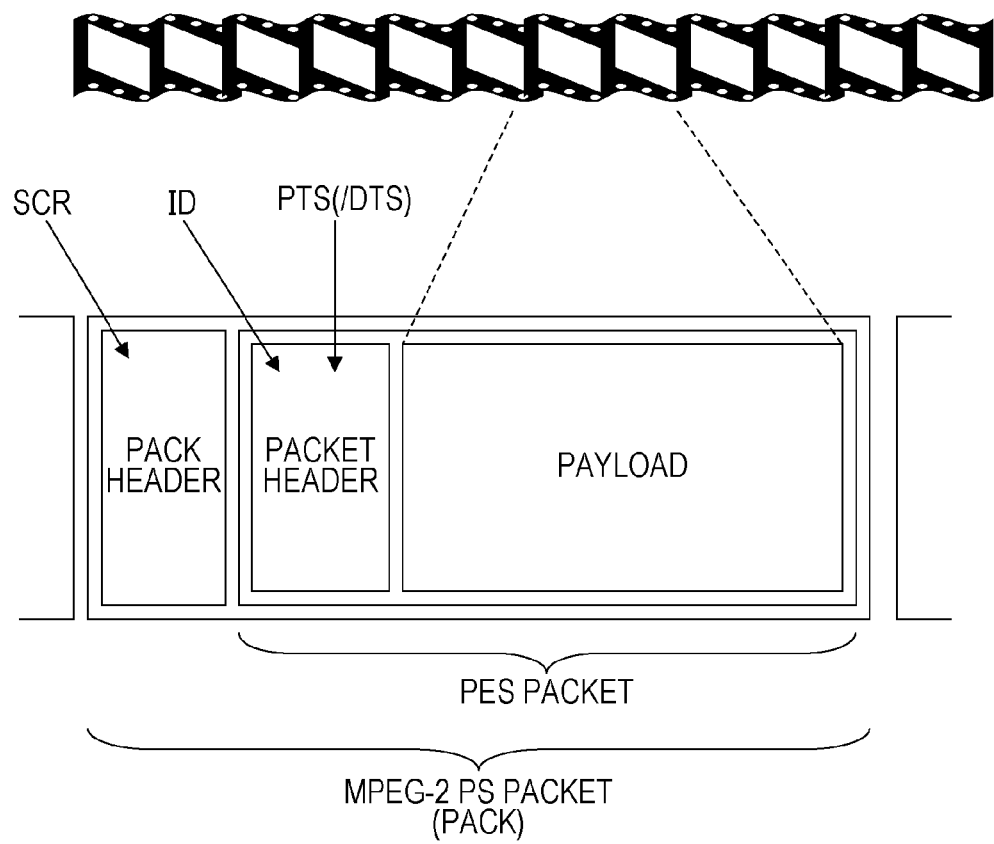
FIG. 10 is a diagram illustrating the configuration of packs in an MPEG stream.

FIG. 10 is a diagram illustrating the configuration of a pack in an MPEG stream. Elementary data such as video data and audio data are sequentially input from the beginning of a data storage region in a packet, called a payload, as illustrated in FIG. 10. A packet header is attached to a payload, making up one packet.

Recorded in the packet header is an ID (stream_id) for identifying which stream the data stored the payload belongs to, whether video data or audio data, and in a case there are multiple streams worth of video data or audio data, which stream the data belongs to, and a Decode Time Stamp (DTS) and Presentation Time Stamp (PTS) that are timestamps for the decoding and displaying time information of this payload.

Not all packet headers necessarily have a DTS and PTS recorded; rules for recording are stipulated in MPEG. Details of the rules are laid forth in the MPEG system (ISO/IEC13818-1) Standard, and accordingly will be omitted here.

A header (pack header) is further added to the packet, thereby making up a pack. The pack header has recorded therein a System Clock Reference (SCR) that is a timestamp indicating when this pack passes through the demultiplexer 310 and is to be input to decoder buffers of the individual elementary streams.

Interleaved Recording of VOB

Figure 11:
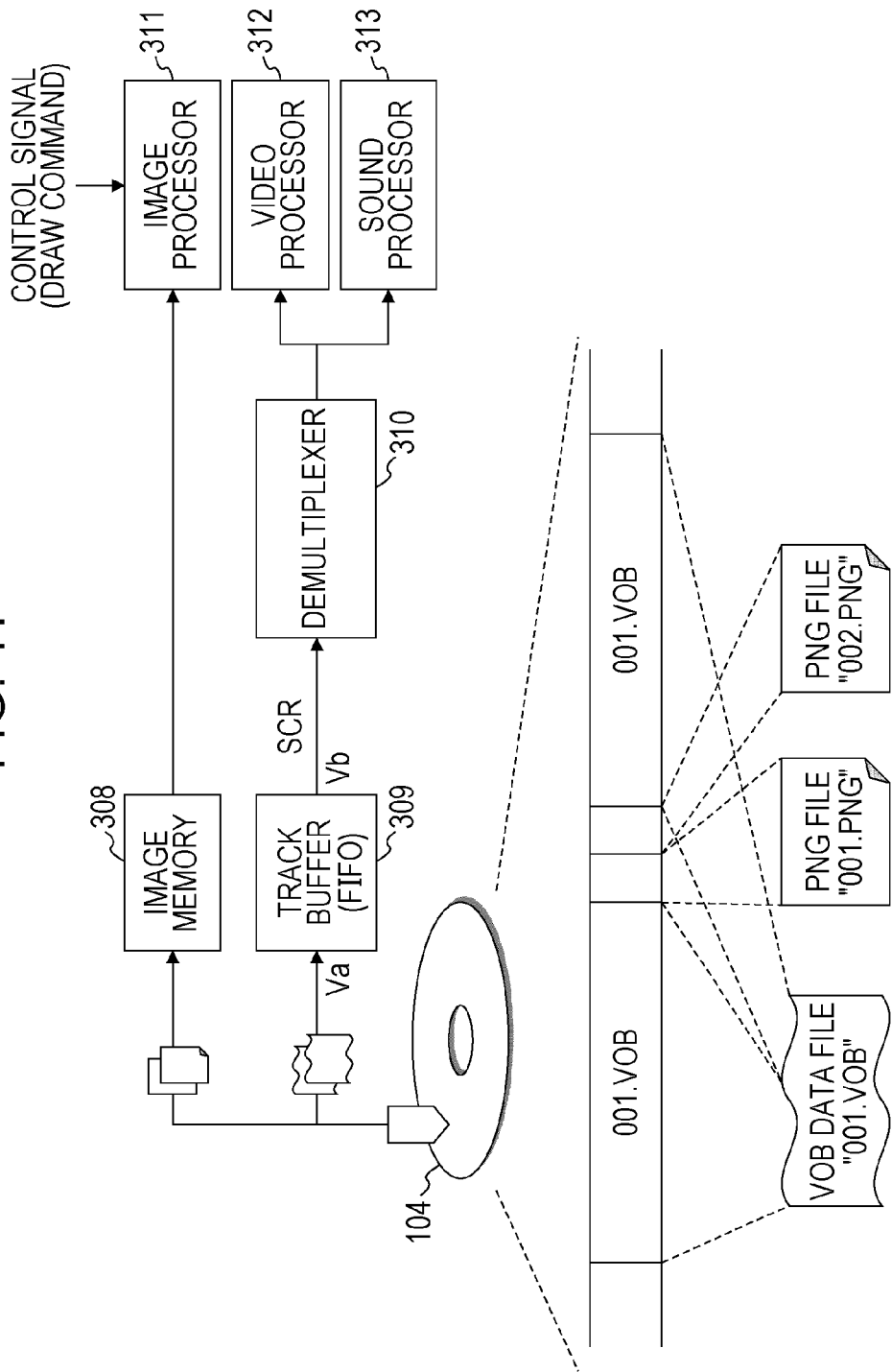
FIG. 11 is a diagram for describing the relationship between AV data and player configuration.

Interleaved recorded of VOB files will be described with reference to FIGS. 11 and 12. FIG. 11 is a diagram for describing the relationship between the AV data and the configuration of a BD-ROM player.

The drawing at the upper tier in FIG. 11 is part of the player configuration diagram described above with reference to FIG. 7. The data in the BD-ROM is passes through the optical pickup 202 and is input to the track buffer 309 if a VOB, i.e., an MPEG stream, and input to the image memory 308 if a PNG, i.e., image data as illustrated in FIG. 11.

The track buffer 309 is a First-In First-Out (FIFO), with input VOB data being sent to the demultiplexer 310 in the order in which it was input. At this time, the individual packs are extracted from the track buffer 309 according to the aforementioned SCR, and data is delivered to the video processor 312 or sound processor 313 via the demultiplexer 310.

On the other hand, In a case of image data, which image to draw is instructed by the presentation controller 306 (see FIG. 7). The image data used for drawing is deleted from the image memory 308 at the same time if image data for subtitles, but is retained in the image memory 308 if image data for a menu. This is because drawing of the menu is dependent on user operations, so there is the possibility that the same image will be drawn multiple times.

The drawing at the lower tier in FIG. 11 is a diagram illustrating interleaved recording of a VOB file and PNG files on the BD-ROM. Generally, in the case of a CD-ROM or DVD-ROM for example, AV data that is a series of continuous playing units is recorded continuously. As long as the data is recorded continuously, all the drive has to do is to sequentially read out the data and deliver it to the player side.

However, in a case where the AV data to be continuously play is fragmented and dispersed across the disc, seek operations are interposed between the individual continuous sections, and data readout stops during this time. That is to say, supply of data may stop.

In the same way, recording of a VOB file in a continuous region is desirable for BD-ROMs as well, but there is data such as subtitle data for example, that is to be played synchronously with the video data in the VOB, so the subtitle data needs to be read out from the BD-ROM in one way or another.

One way of reading out subtitle data is to read out all subtitle image data (PNG file) before starting playback of the VOB. However in this case, a great amount of memory is necessary to use for temporary recording, so this is not realistic. Accordingly, method where a VOB file is divided into several blocks, and the VOB file and image are subjected to interleaved recording is employed with the present embodiment.

The lower tier in FIG. 11 is a diagram for describing interleaved recording. By suitably performing interleaved placement of the VOB file and image data, image data can be stored in the image memory 308 at a necessary timing, without the great amount of temporary recording memory described above. However, while the image data is being read out, readout of VOB data stops, as a matter of course.

Figure 12:
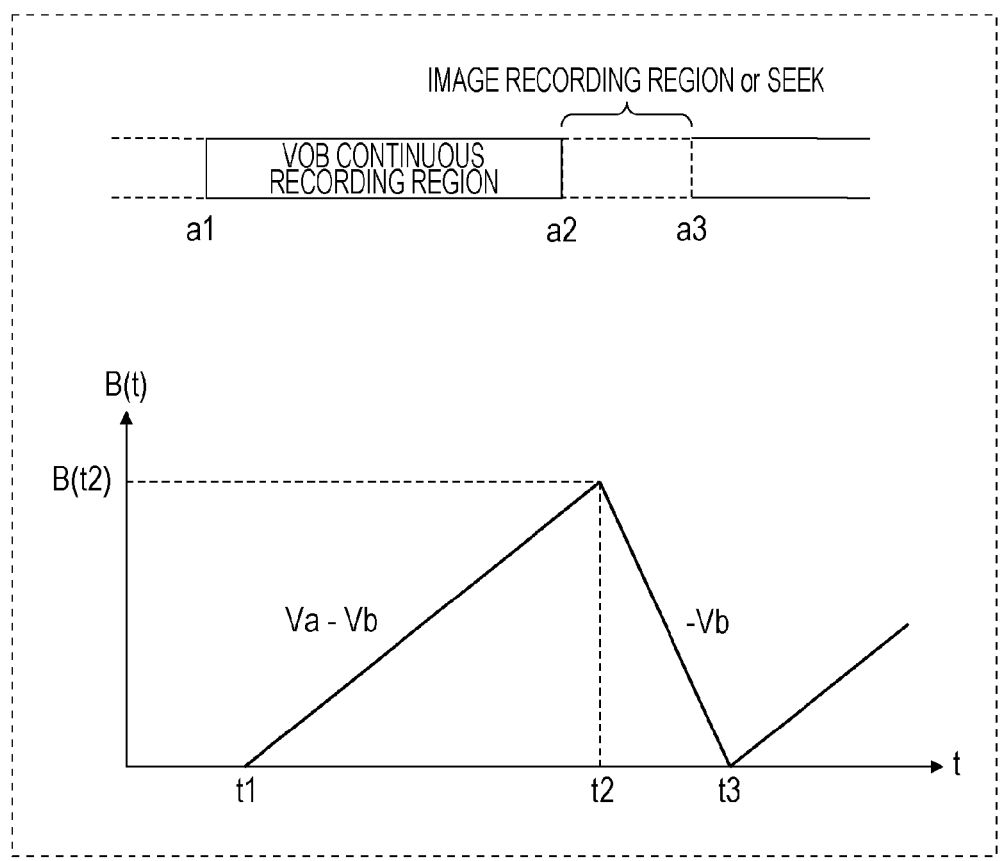
FIG. 12 is a diagram for describing a VOB data continuous supply model using a track buffer.

FIG. 12 is a diagram for describing a VOB data continuous supply model using the track buffer 309, to solve the above problem in interleaved recording. As described earlier, VOB data is temporarily stored in the track buffer 309. Setting the data input rate to the track buffer 309 to be higher than the data output rate from the track buffer 309 means that the amount of data sorted in the track buffer 309 continues to increase, as long as data is being read out from the BD-ROM.

Now, the input rate to the track buffer 309 is denoted by Va, and the output rate from the track buffer 309 is denoted by Vb. One continuous recording region of the VOB continues from logical address "a1" to "a2" as illustrated at the upper tier in FIG. 12. From "a2" to "a3" is a section where image data is recorded, so VOB data cannot be read out.

The drawing at the lower tier in FIG. 12 is a diagram illustrating the stored amount in the track buffer 309. The horizontal axis represents time, and the vertical axis represents the amount of data sorted inside the track buffer 309. The time "t1" indicates the time at which readout of the continuous recording region of the VOB "a1" has started.

After this time, data will be accumulated in the track buffer 309 at a rate of Va−Vb. It is needless to say that this is the difference in the input/output rates of the track buffer 309. Time "t2" is the time to read in data at "a2", and is the end point of one continuous recording region.

That is to say, the amount of data in the track buffer 309 increases at the rate of Va−Vb from "t1" to "t2", and the data accumulation amount B(t2) at the time "t2" can be calculated by the following Expression (1).

$$B(t2)=(Va-Vb) \times (t2-t1) \qquad \text{Expression (1)}$$

Thereafter, image data continues until the address "a3" on the BD-ROM, so input to the track buffer 309 is 0, and the amount of data within the track buffer 309 decreases at an output rate "−Vb". This reduction in data amount continues until the readout position "a3", i.e., until the time "t3".

What is important here is that once the data amount stored in the track buffer 309 before time "t3" reaches 0, there is no more VOB data to supply to the decoder, so playback of the VOB will stop. However, in a case where the is data remaining in the track buffer 309 at time "t3", this means that playback of the VOB can be continued without stopping.

The conditions for the VOB playback to be continuously performed without stopping can be expressed by the following Expression (2).

$$B(t2) \geq -Vb \times (t3-t2) \qquad \text{Expression (2)}$$

That is to say, the array of image data should be decided so as to satisfy Expression (2).

Navigation Data Structure

Figure 13:
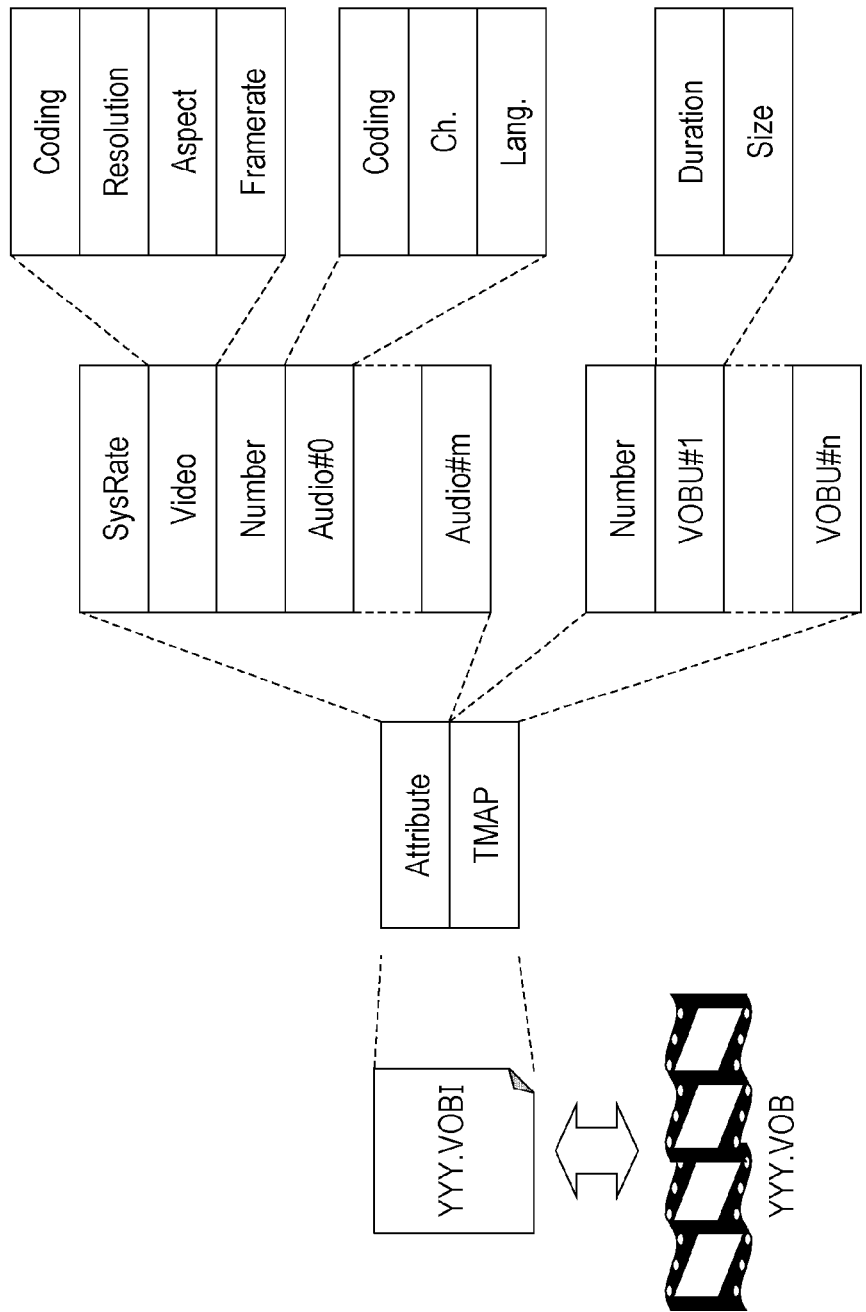
FIG. 13 is a diagram illustrating the internal structure of a VOB management information file.

The structure of navigation data (BD management information) recorded in the BD-ROM will be described with reference to FIGS. 13 through 19. FIG. 13 is a diagram illustrating the internal structure of a VOB management information file ("YYY.VOBI").

The VOB management information has stream attribute information (Attribute) and a time map (TMAP) of this VOB. The stream attribute information is of a configuration having video attributes (Video) and audio attributes (Audio #0 through Audio # m) individually. Particularly, in the case of an audio stream, the VOB can have multiple audio streams at the same time, so the number of data fields of the audio attributes is identified by the number of audio streams (Number).

The following is an example of fields that the video attributes (Video) have, and values which each can have.
Compression format (Coding):
MPEG1
MPEG2
MPEG4
Resolution (Resolution):
1920×1080
1280×720
720×480
720×565

Aspect ratio (Aspect):
4:3
16:9
Frame rate (Framerate):
60
59.94
50
29.97
24

The following are example of fields that the audio attributes (Audio) have, and values which each can have.
Compression format (Coding):
AC3
MPEG1
MPEG2
LPCM
Number of channels (Ch):
1 to 8
Language attributes (Language):
JPN, ENG, . . .

The time map (TMAP) is a table having information for each VOBU, and holds the number of VOBUs (Number) that the VOB has, and each VOBU information (VOBU #1 through VOBU # n). Each VOBU information has a playtime length (Duration) of the VOBU and data size (Size) of the VOBU.

Figure 14:
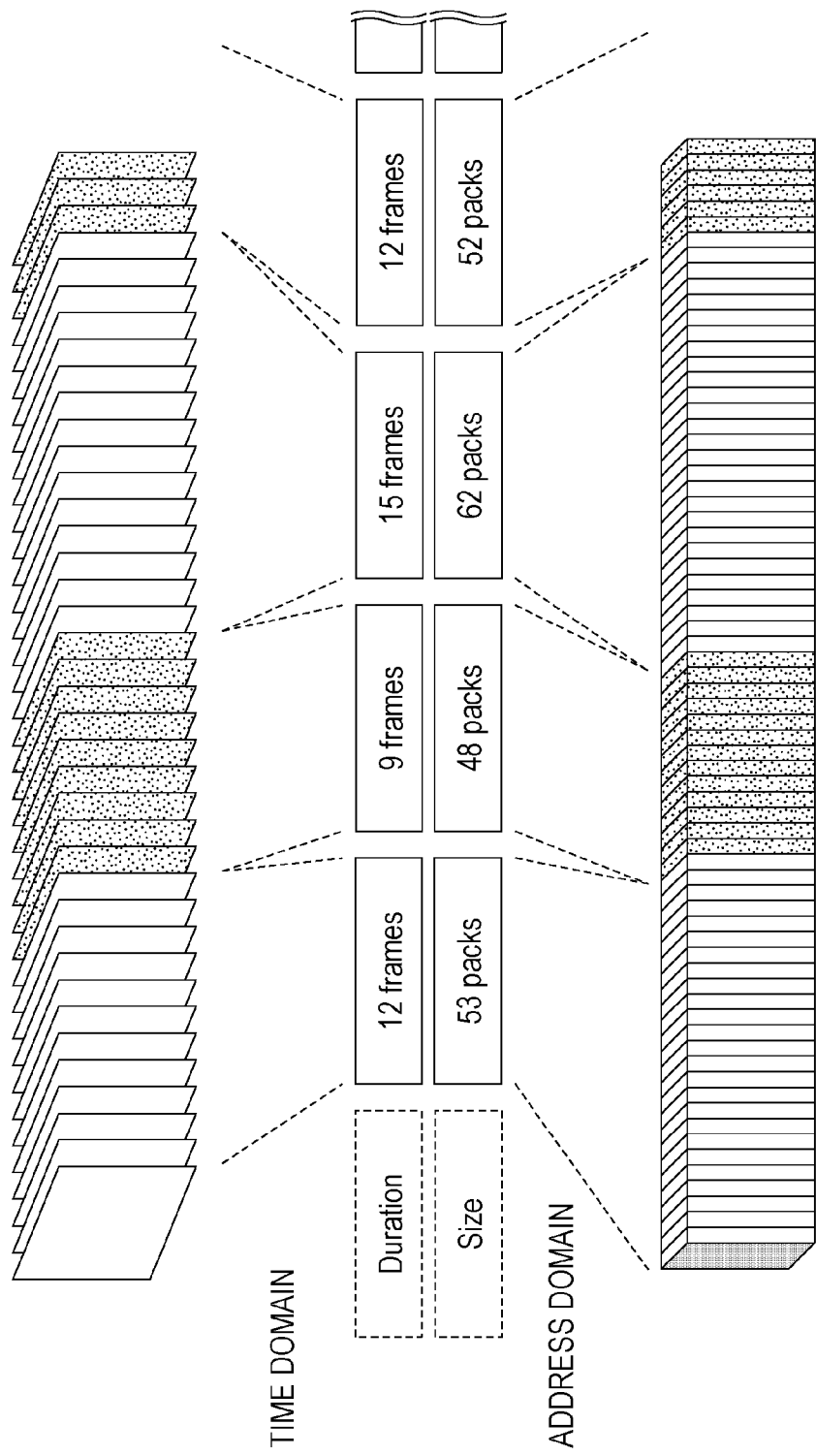
FIG. 14 is a diagram for describing the details of VOBU information.

FIG. 14 is a diagram for describing the details of VOBU information. It is widely known that the MPEG stream has aspects regarding two physical amounts, a temporal aspect and a data-size aspect. For example, Audio Code number 3 (AC3) that is an audio compression standard performs compression at a fixed bitrate, so the relationship between time and address can be obtained by a primary expression.

However, in the case of MPEG video data, each frame has a fixed display time such as 1/29.97 seconds in the case of NTSC for example, but the data size of each frame after compression will vary greatly depending on the picture properties and the picture type used in compression, which are the so-called I/P/B pictures. Accordingly, it is impossible to expression the relationship between time and address by a common expression in the case of MPEG vide.

As a matter of course, it is impossible to expression the relationship between time and data by a common expression, with regard to an MPEG stream where MPEG video data has been multiplexed, i.e., a VOB, as well. Instead, the relationship between time and address within the VOB is associated by a time map (TMAP). A table which has the number of frames in each VOBU and the number of packs in the VOBU as entries is the time map (TMAP), as illustrated in FIG. 14.

Figure 15:
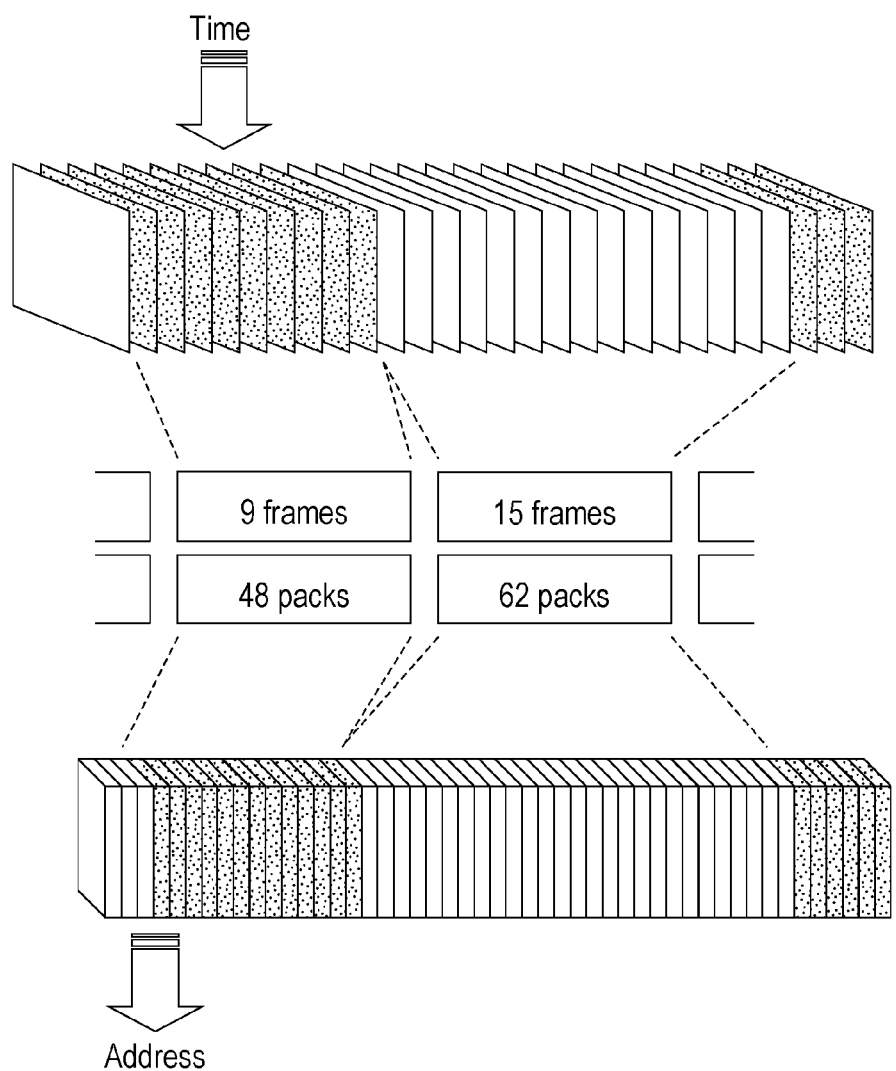
FIG. 15 is a diagram for describing an address information acquisition method using a time map.

How to use a time map (TMAP) will be described with reference to FIG. 15. FIG. 15 is a diagram for describing an address acquisition method using a time map.

In a case where time information (Time) is provided, as illustrated in FIG. 15, first, to which VOBU that time belongs is searched for. Specifically, the number of frames is added for each VOBU in the time map, and the VOBU where the sum of the number of frames exceeds or matches the value obtained by converting this time into the number of frames is the VOBU that corresponds to this time.

Next, the size for each VOBU in the time map are added up to the VOBU immediately preceding this VOBU, and that values is the beginning address (Address) of the pack to be read out to play the frame including the time that has been given. Accordingly, an address corresponding to given time information can be obtained in an MPEG stream.

Figure 16:
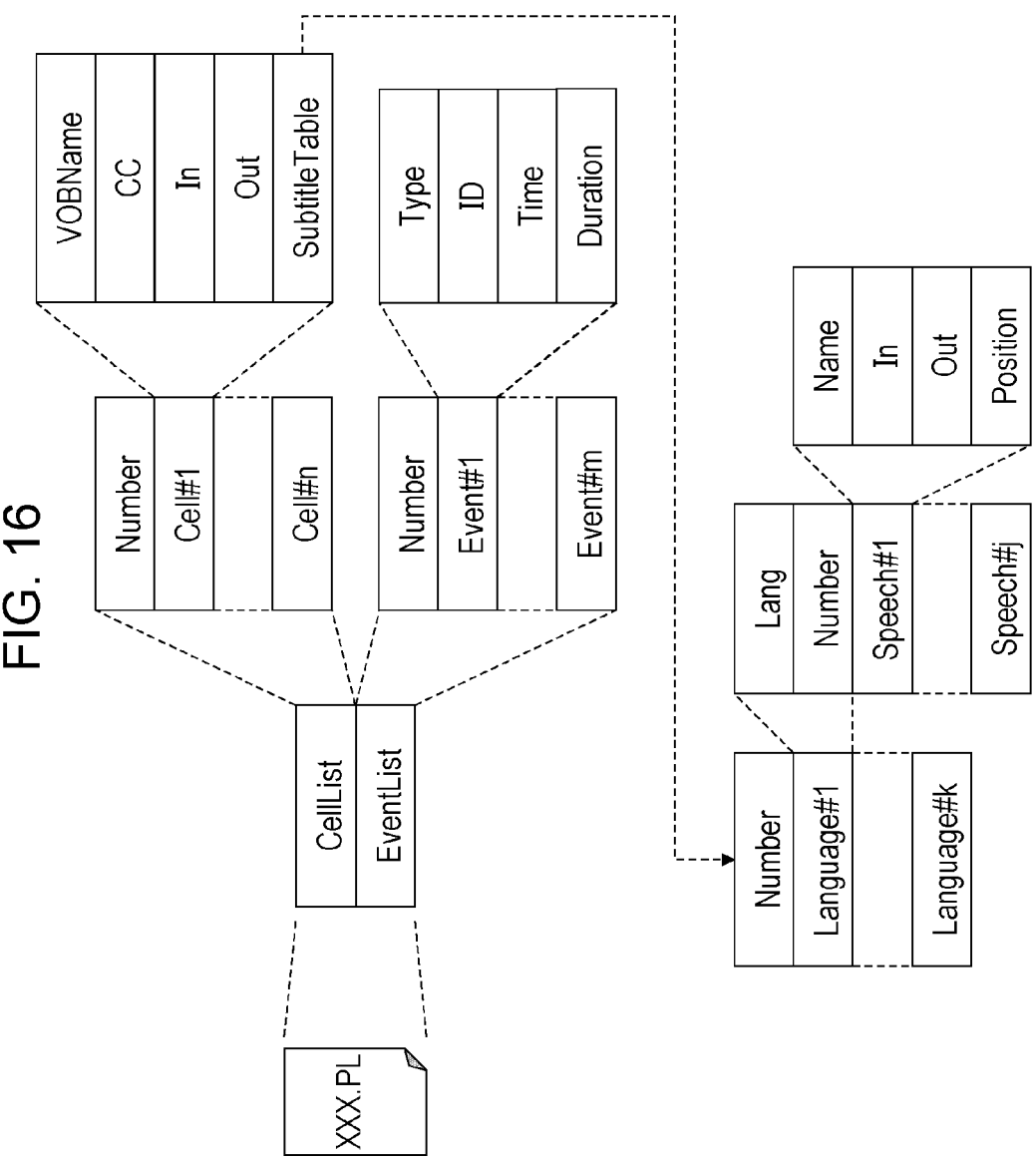
FIG. 16 is a diagram illustrating the configuration of a playlist.

Next, the internal structure of the playlist ("XXX.PL") will be described with reference to FIG. 16. FIG. 16 is a diagram illustrating the configuration of a playlist.

A playlist is made up of a cell list (CellList) and event list (EventList). A cell list (CellList) is information indicating the playback cell sequence within the playlist, and cells are played in the order of description in this list. The content of a cell list (CellList) is the number of cells (Number) and information of each cell (Cell #1 through Cell # n).

The information of each cell (Cell #1 through Cell # n) has the VOB filename (VOBName), the valid section start time (In) and valid section end time (Out) in this VOB, and a subtitle table (SubtitleTable).

The valid section start time (In) and valid section end time (Out) are each expressed by frame No. within this VOB, and the address for VOB data necessary for playback can be obtained by using the above-described time map (TMAP).

The subtitle table (SubtitleTable) is a table having subtitle information that is synchronously played with this VOB. The subtitles may have multiple languages, in the same way as with the audio. The subtitle table (SubtitleTable) is made up of the number of languages (Number) and a subsequent table for each language (Language #1 through Language # k).

The table for each language (Language #1 through Language # k) is made up of language information (Language), the number of pieces of subtitle information of the subtitles to be displayed (Number) The subtitle information of the subtitles to be displayed (Speech #1 through Speech # j). Each subtitle information (Speech #1 through Speech # j) is made up of a corresponding image data filename (Name), subtitle display start time (In) and subtitle display end time (Out), and subtitle display position (Position).

The event list (EventList) is a table defining events occurring within this playlist. The event list is made up of the number of events (Number), and following this the individual events (Event #1 through Event # m), each event (Event #1 through Event # m) being made up of event type (Type), event ID (ID), event generation time (Time), and valid period (Duration).

Figure 17:
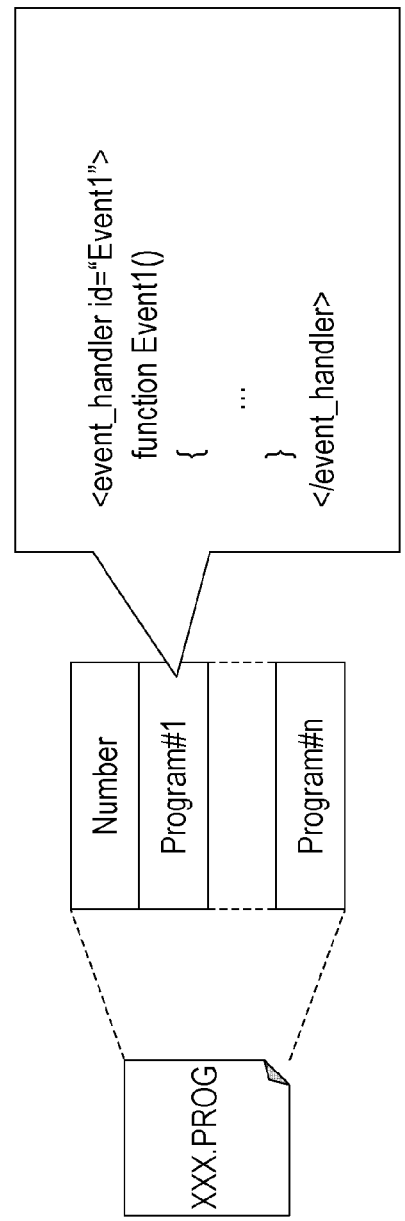
FIG. 17 is a diagram illustrating the configuration of an event handler table.

FIG. 17 is a diagram illustrating the configuration of an event handler table ("XXX.PROG") that has an event handler (time-based events, and user events for menu selection), for each playlist.

The event handler table contains the number of event handlers/programs that are defined (Number), and individual event handlers/programs (Program #1 through Program # n).

The description within each of the event handlers/programs (Program #1 through Program # n) contains a definition of the start the event handler (an <event_handler> tag) and an event handler ID (event_handler id) that is paired with the aforementioned event ID. Following this, the program is described between brackets "{" and "}" after "function".

Figure 18:
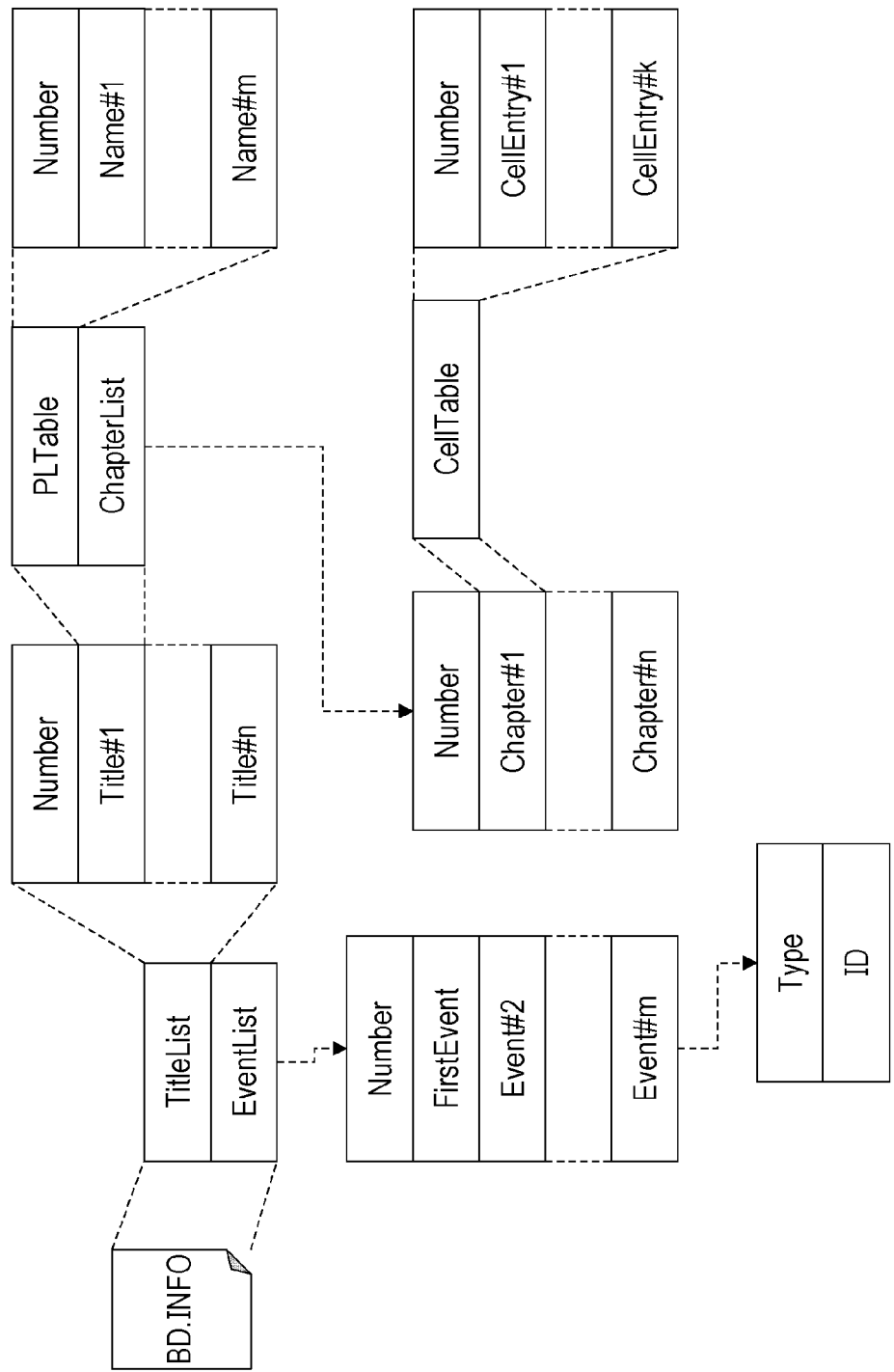
FIG. 18 is a diagram illustrating the configuration of BD.INFO which is overall BD-ROM information.

Next, the information relating to the entire BD-ROM ("BD.INFO") will be described with reference to FIG. 18. FIG. 18 is a diagram illustrating the configuration of BD.INFO which is overall BD-ROM information.

The overall BD-ROM information is made up of a title list (TitleList) and event list (EventList) for global events. The title list (TitleList) is made up of the number of titles in the disc (Number), and subsequently each title information (Title #1 through Title # n).

Each title information (Title #1 through Title # n) includes a playlist table (PLTable) and a chapter list within the title (ChapterList). The playlist table (PLTable) includes the number of playlist in the title (Number) and the playlist names (Name), i.e., the filenames of the playlists.

The chapter list (ChapterList) is made up of the number of chapters included in this title (Number), and each chapter information (Chapter #1 through Chapter # n). Each chapter information (Chapter #1 through Chapter # n) has a table of cells that this chapter includes (CellTable), the cell table (CellTable) being made up of the number of cells (Number) and entry information of each cell (CellEntry #1 through CellEntry # k). Cell entry information (CellEntry #1 through CellEntry # k) is described as the playlist name containing this cell and the cell No. within the playlist.

The event list (EventList) has the number of global events (Number) and information of each global event (Event #1 through Event # m). What is noteworthy here is that the global event that is defined first is called a first event (FirstEvent), and is the event that is executed first when the BD-ROM is inserted into the player. Each global event information (Event #1 through Event # m) has only the event type (Type) and ID of the event (ID).

Figure 19:
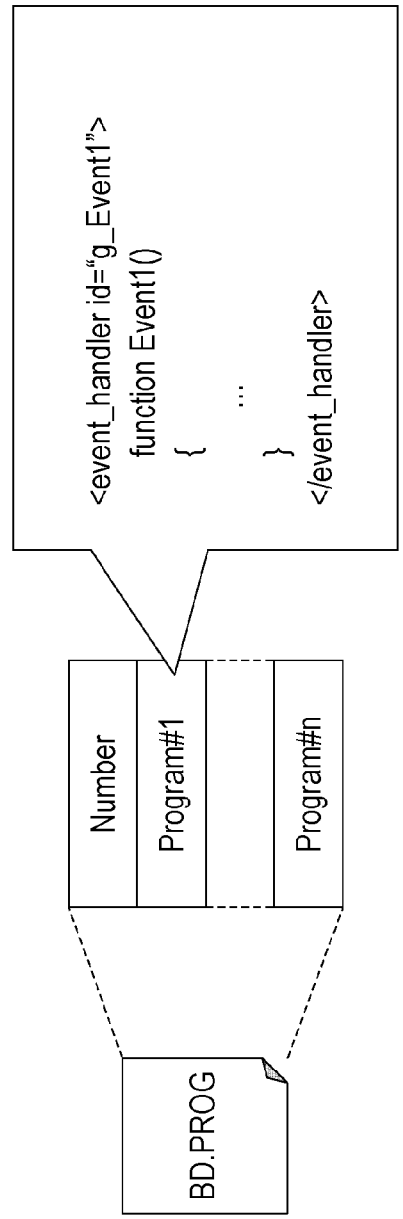
FIG. 19 is a diagram illustrating the structure of a global event handler table.

FIG. 19 is a diagram illustrating the structure of the global event handler table ("BD.PROG"). This table is the same in content as the event handler table described in FIG. 17, so description thereof will be omitted.

Mechanism of Event Occurrence

Figure 20:
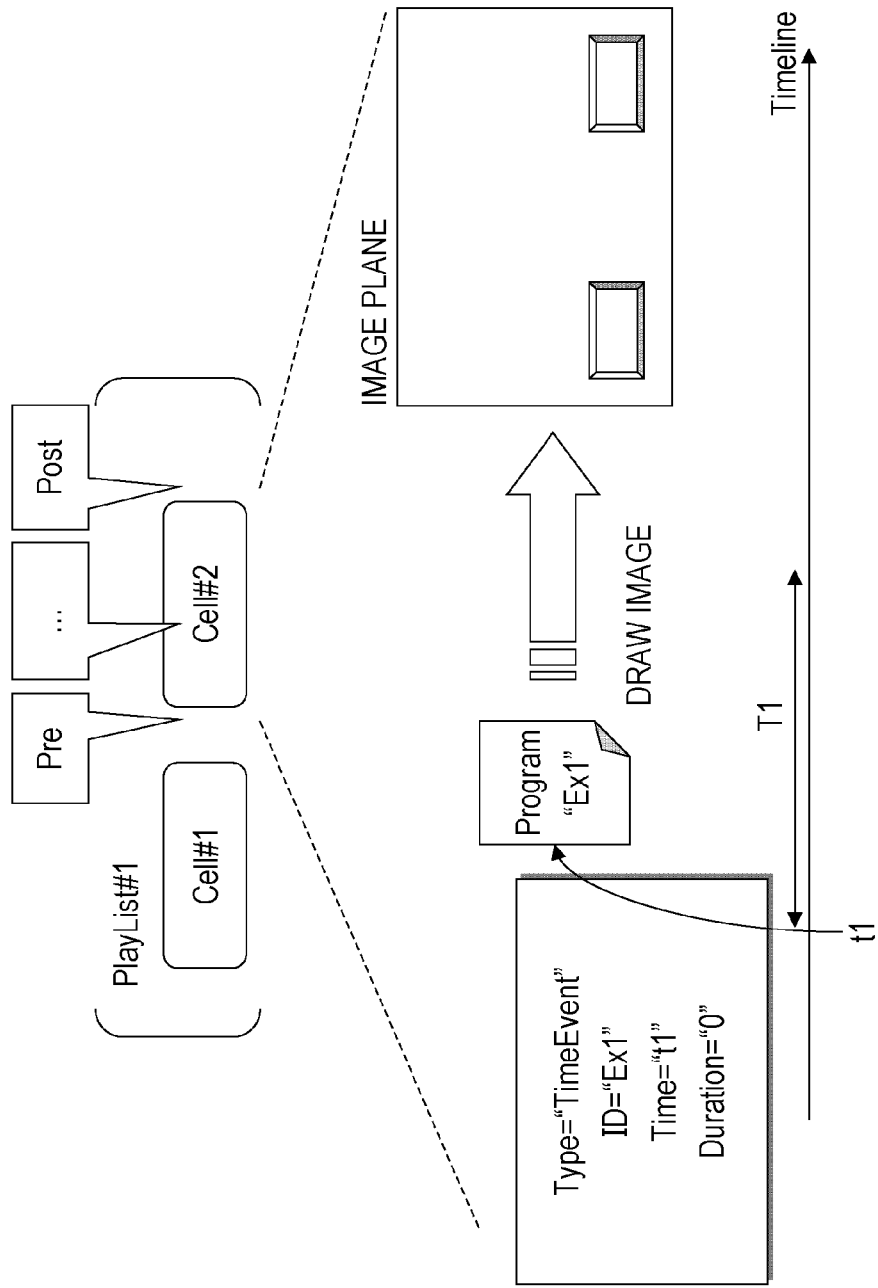
FIG. 20 is a diagram illustrating an example of a time event.

The mechanism of event occurrence will be described with reference to FIGS. 20 through 22. FIG. 20 is a diagram illustrating an example of a time event. As described above, a time event is defined by the event list (EventList) in the playlist ("XXX.PL"). In a case of an event defined as a time event, i.e., event type (Type) is "TimeEvent", at the point of the event generation time ("t1"), a time event having the ID "Ex1" is output from the scenario processor 305 to the program processor 302.

The program processor 302 searches for the handler that has the event ID "Ex1", and executes the relevant event handler. For example, in the case of the present embodiment, a two-button image can be drawn, or the like.

Figure 21:
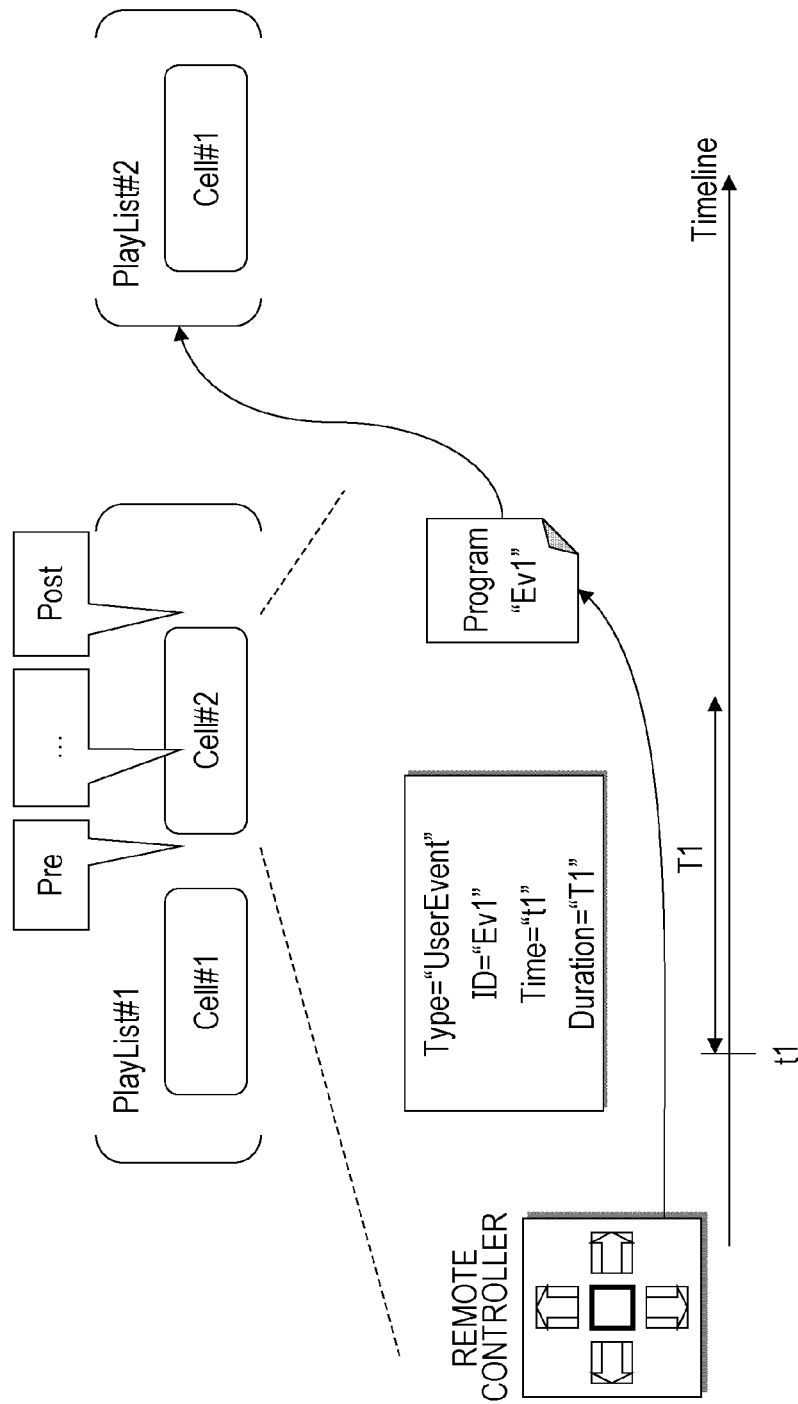
FIG. 21 is a diagram illustrating an example of a user event due to a user having operated a menu.

FIG. 21 is a diagram illustrating an example of a user event due to a user having operated a menu. As described above, a user event due to menu operations is also defined by the event list (EventList) in the playlist ("XXX.PL").

In the case of an event defined as a user event, i.e., in a case where the event type (type) is "UserEvent", this user event is ready at the point that of reaching the event generation time ("t1"). At this time, the event itself is not generated yet. This event is in a ready state during the period ("T1") described in the valid period information (Duration).

When a remote controller key "up", "down", "left", or "right", has been pressed by the user, or when the "OK" key has been pressed, first, a UO event is generated by the UO manager 303 and output to the program processor 302, as illustrated in FIG. 21.

The program processor 302 hands a UO event to the scenario processor 305, and upon receiving the UO event, the scenario processor 305 searches for whether or not a valid user event exists. In a case where there is a relevant user event as the result of the search, the scenario processor 305 generates a user event, and outputs to the program processor 302.

The program processor 302 searches for an event handler having the event ID, in the case of the example illustrated in FIG. 21 for example, "Ev1", and executes the relevant event handler. In the case of this example, playback of playlist #2 is started.

The generated user event does not include information regarding which remote controller key has been pressed by the user. The information of the remote controller key that has been selected is notified to the program processor 302 by the UO event, and is recorded and held in a register that the virtual player has. The program of the event handler can check the value of this register and execute branching processing.

Figure 22:
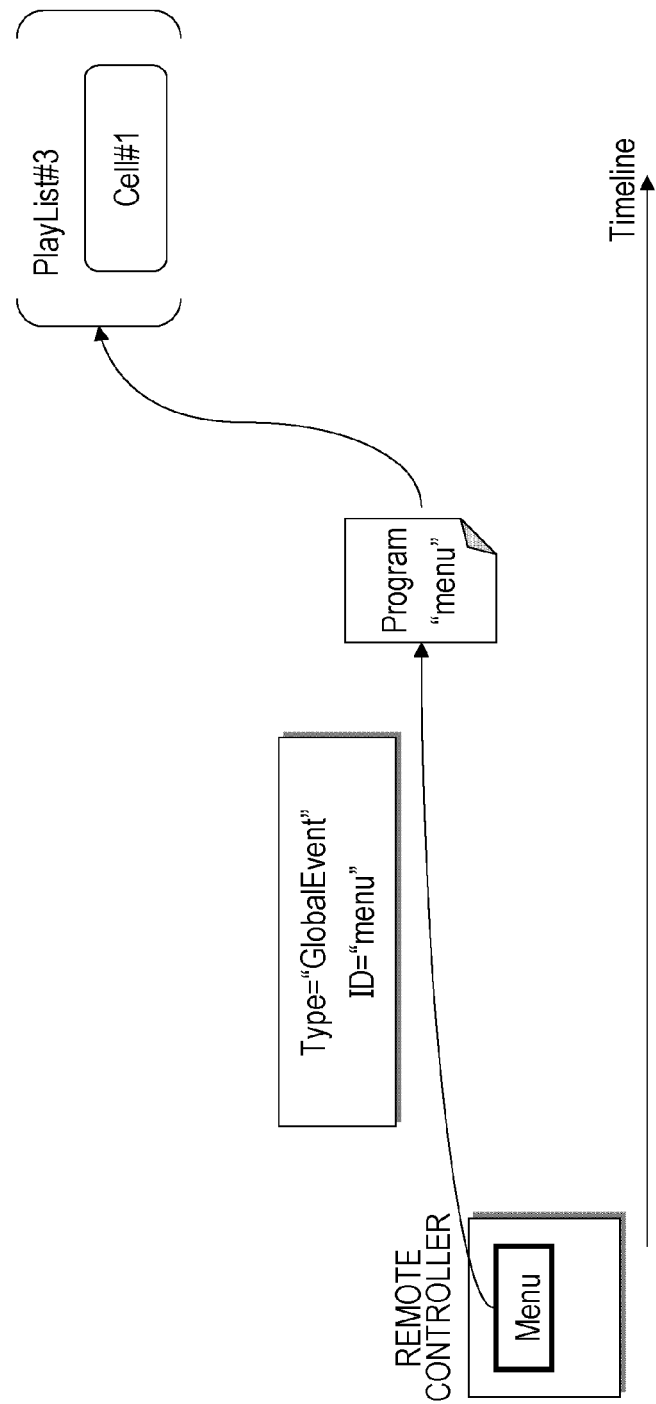
FIG. 22 is a diagram illustrating an example of a global event.

FIG. 22 is a diagram illustrating an example of a global event. As described earlier, a global event is defined in the event list (EventList) in the overall BD-ROM information ("BD.INFO"). An event defined as a global event, i.e., an event of which the event type (Type) is "GlobalEvent", is generated only in a case where the user has operated a remote controller key.

In a case where the user has pressed the menu key, first, a UO event is generated by the UO manager 303 and output to the program processor 302. The program processor 302 hands the UO event to the scenario processor 305.

The scenario processor 305 generates the relevant global event, and sends it to the program processor 302. The program processor 302 searches for an event handler having the event ID "menu", and executes this event handler. For example, in the case of the example illustrated in FIG. 22, playback of playlist #3 is started.

In the present embodiment, this is referred to simply as menu key, but there may be multiple menu keys such as on the remote controller of a player that plays DVDs. Defining an ID corresponding to each menu key enables appropriate processing to be performed as to each menu key.

Virtual Player Machine

FIG. 23 is a diagram for describing the functional configuration of the program processor 302. The functional configuration of the program processor 302 will be described with reference to FIG. 23.

The program processor 302 is a processing module that has a virtual player machine inside. A virtual player machine is a function model defined as a BD-ROM, and is not dependent on the implementation of each BD-ROM player. That is to say, this guarantees that the same function can be executed in every BD-ROM player.

A virtual player machine has two major functions; programming functions and player variables. The player variables are stored and held in a register.

The programming functions are based on Java (registered trademark) Script, and the following three functions are defined as BD-ROM-unique functions. Link function: Stops the current playback, and starts playback from specified playlist, cell, and time.

Link (PL #, Cell #, time)
        PL #: playlist name
        Cell #: cell No.
        Time: time in cell to start playback PNG drawing function: Draws specified PNG data on image plane 209.

Draw (File, X, Y)
        File: PNG filename
        X: X coordinate position
        Y: Y coordinate position Image plane clear function: Clears specified region of image plane 209.

Clear (X, Y, W, H)
        X: X coordinate position
        Y: Y coordinate position
        W: width in X direction
        H: width in Y direction The player variables include system parameters (SPRM) indicating setting values and so forth of the player, and general parameters (GPRM) usable in general uses.

FIG. 24 is a diagram illustrating a list of system parameters (SPRM).

SPRM(0): Language code
    SPRM(1): Audio stream No.
    SPRM(2): Subtitle stream No.
    SPRM(3): Angle No.
    SPRM(4): Title No.
    SPRM(5): Chapter No.
    SPRM(6): Program No.
    SPRM(7): Cell No.
    SPRM(8): Selected key information
    SPRM(9): Navigation timer
    SPRM(10): playback time information
    SPRM(11): Mixing mode for karaoke
    SPRM(12): Country information for parental
    SPRM(13): Parental level
    SPRM(14): Player setting value (video)
    SPRM(15): Player setting value (audio)
    SPRM(16): Language code for audio stream
    SPRM(17): Language code for audio stream (extended)
    SPRM(18): Language code for subtitle stream
    SPRM(19): Language code for subtitle stream (extended)
    SPRM(20): Player region code
    SPRM(21): reserved
    SPRM(22): reserved
    SPRM(23): Playback state
    SPRM(24): reserved
    SPRM(25): reserved
    SPRM(26): reserved
    SPRM(27): reserved
    SPRM(28): reserved
    SPRM(29): reserved
    SPRM(30): reserved
    SPRM(31): reserved Note that in the present embodiment, the programming functions of the virtual player have been described as being based on Java (registered trademark) Script, Other programming functions may be used, such as B-Shell used in UNIX (registered trademark) OS or the like, Perl Script, and so forth, instead of Java (registered trademark) Script. In other words, the programming language in the present disclosure is not restricted to Java (registered trademark) Script.

Example of Program

Figure 25:
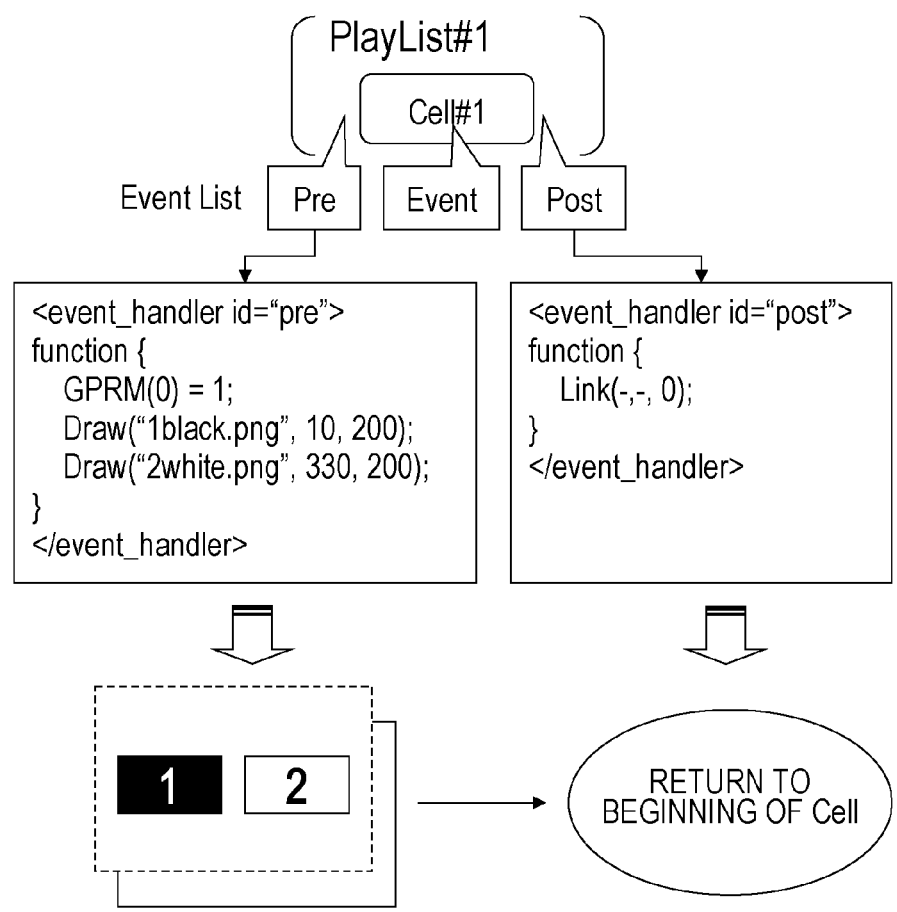
FIG. 25 is a diagram illustrating an example of a program in an event handler according to control of a menu screen having two selection buttons.
Figure 26:
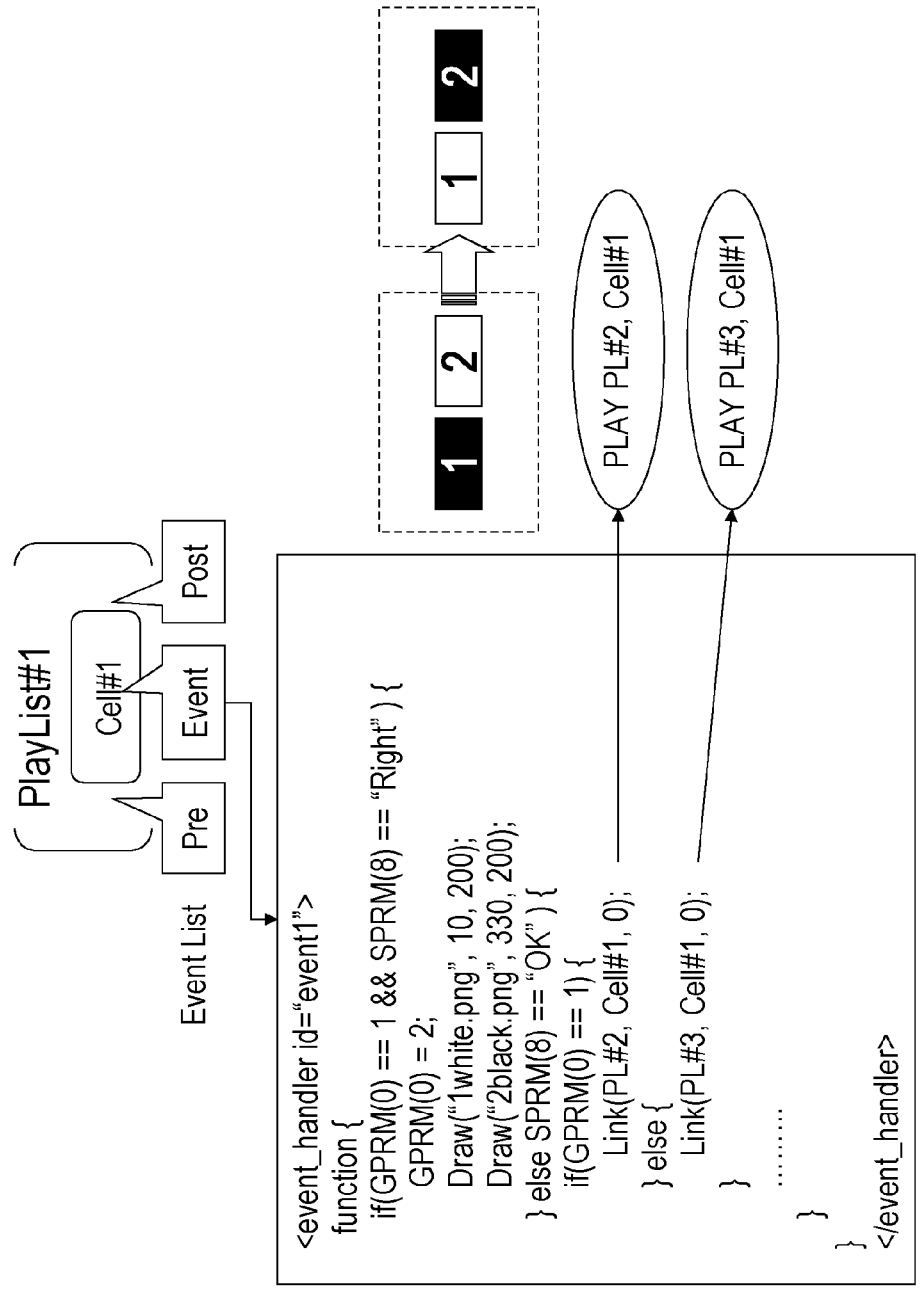
FIG. 26 is a diagram illustrating an example of a program in an event handler relating to a menu selection user event.

FIGS. 25 and 26 are diagrams illustrating an example of a program in the event handler. FIG. 25 is a diagram illustrating an example of a program in an event handler according to control of a menu screen having two selection buttons.

The program to the left side in FIG. 25 is executed using a time event at the beginning of cell (PlayList #1.Cell #1). "1" is set to GPRM(0) here first, which is one of the general parameters. GPRM(0) is used in this program to identify a button that is selected. A state where the button [1] situated on the left side has been selected is held as the initial state.

Next, drawing of a PNG is performed for each of button [1] and button [2] using "Draw", which is a drawing function. The button [1] is drawn as a PNG image "1black.png" with coordinates (10, 200) as the origin (upper left end). The button [2] is drawn as a PNG image "2white.png" with coordinates (330, 200) as the origin (upper left end).

At the end of this cell, the program to the right side in FIG. 25 is executed using a time event. A Link function is used here to instruct playing again from the beginning of this cell.

FIG. 26 is a diagram illustrating an example of a program in an event handler according to a user event for selection of a menu. In a case where any one of the remote controller keys of the "left" key, "right" key, or "OK" key has been pressed, the corresponding program is written in the event handler. In a case where the user has pressed a remote controller key, a user event is generated as described with reference to FIG. 21, and the event handler illustrated in FIG. 26 is activated.

The following branching processing is performed by this event handler, using the value of GPRM(0) identifying the selected button, and SPRM(8) identifying the selected remote controller key.

Condition 1) Case where button [1] is selected, and the selected key is "right" key GPRM(0) is reset to 2, and the button in the selected state is changed to the button [2] at the right.

The images of each of button [1] and button [2] are rewritten.

Condition 2) Case where the selected key is "OK" key, and button [1] is selected Playback of playlist #2 is started.

Condition 3) Case where the selected key is "OK" key, and button [2] is selected Playback of playlist #3 is started.

The program illustrated in FIG. 26 is interpreted and executed as described above.

Player Processing Flow

Figure 27:
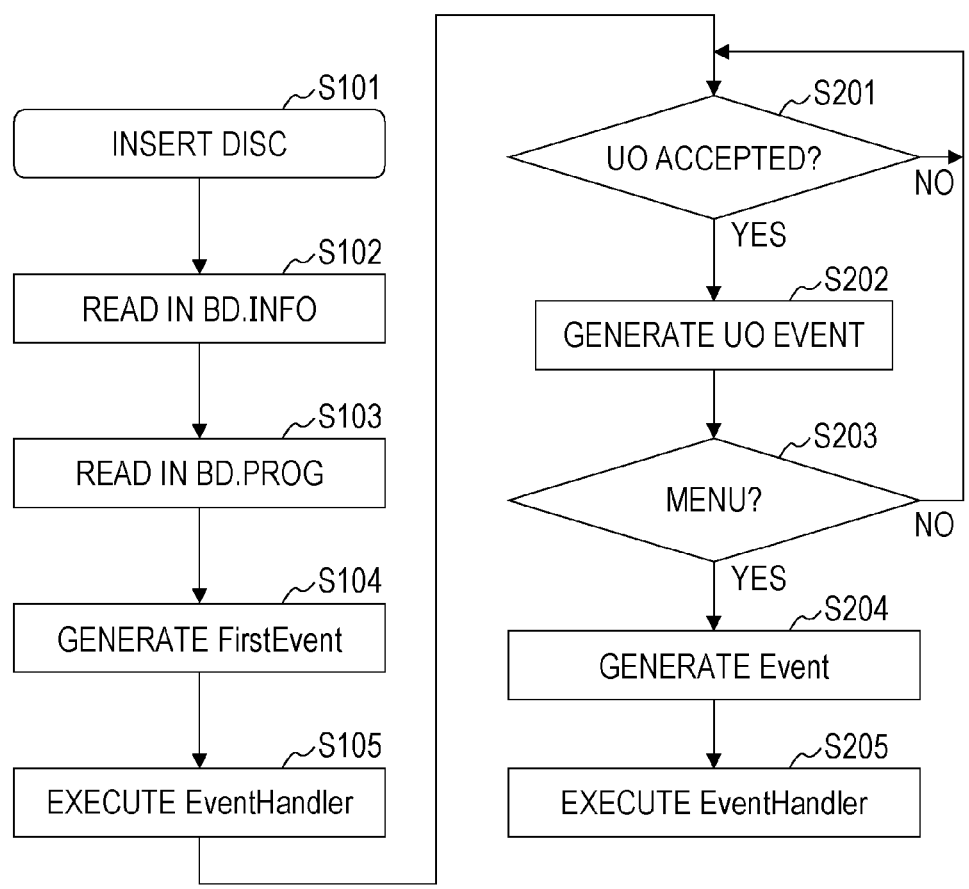
FIG. 27 is a flowchart illustrating the flow of basic processing for playback of AV data in a BD-ROM player.

The flow of processing at the player will be described with reference to FIGS. 27 through 30. FIG. 27 is a flowchart illustrating the basic flow of playback of AV data in a BD-ROM player.

Upon a BD-ROM being inserted (S101), the BD-ROM player reads in and analyzes "BD.INFO" (S102), and reads in "BD.PROG" (S103). "BD.INFO" and "BD.PROG" are both temporarily stored in the management information recording memory 204, and analyzed by the scenario processor 305.

Next, the scenario processor 305 generates the first event, in accordance with the first event (FirstEvent) information in the "BD.INFO" file (S104). The generated first event is received by the program processor 302, which executes the event handler corresponding to this event (S105).

It is expected that the event handler corresponding to the first event will have recorded therein information specifying a playlist to play first. If no playlist to play first is instructed, the player has nothing to play, and simply awaits a user event to accept (No in S201).

Upon receiving a remote controller operation from the user (Yes in S201), the UO manager 303 generates a UO event for the program processor 302 (S202).

The program processor 302 determines whether or not the UO event is due to the menu key (S203), and in the case of the menu key (Yes in S203), hands the UO event to the scenario processor 305, and the scenario processor 305 generates a user event (S204). The program processor 302 executes the event handler corresponding to the generated user event (S205).

Figure 28:
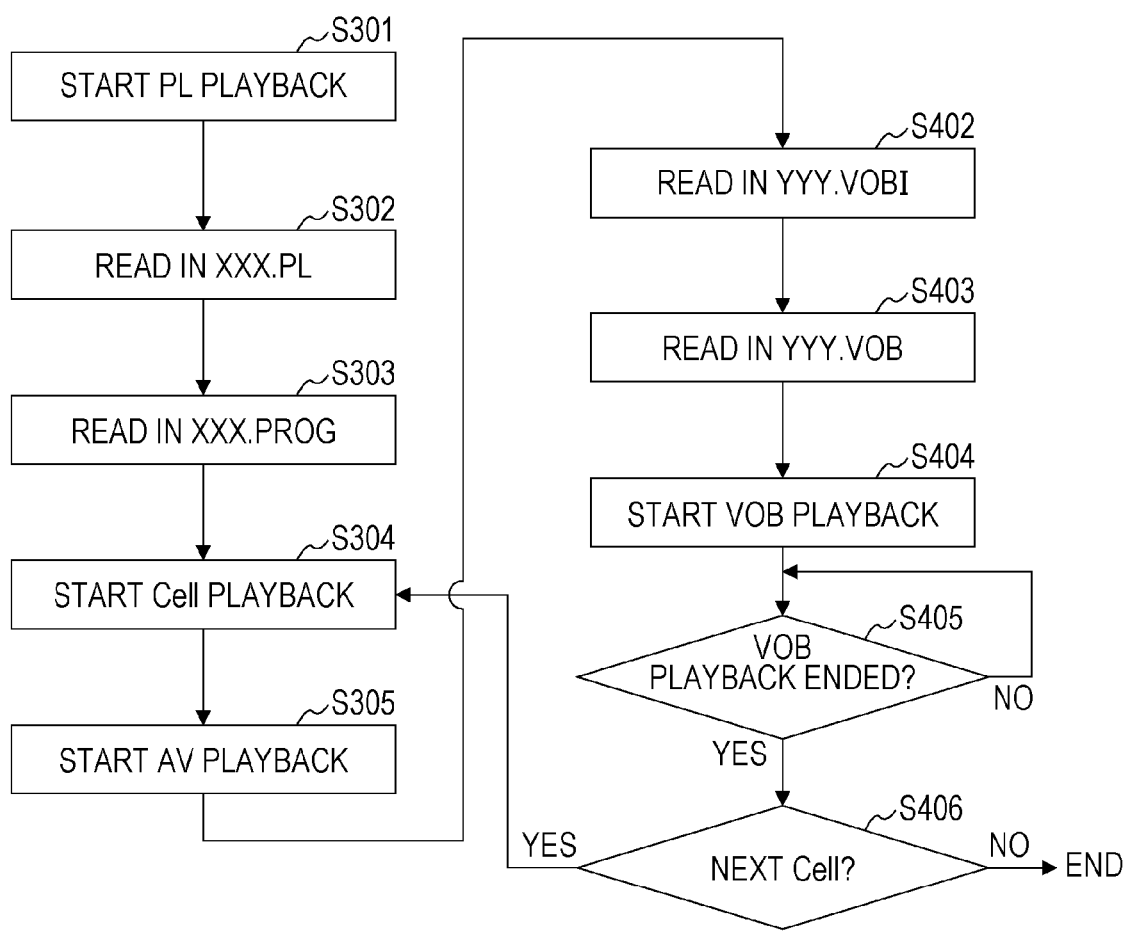
FIG. 28 is a flowchart illustrating the flow of processing in a BD-ROM player from starting to play a playlist until ending playing of the VOB.

FIG. 28 is a flowchart illustrating the flow of processing in a BD-ROM player from starting to play a playlist until ending the VOB. As described earlier, playback of a playlist is started by the first event handler or global event handler (S301). The scenario processor 305 reads in and analyzes the playlist "XXX.PL" as necessary information to play a playlist that is the object of playback (S302), and reads in the program information "XXX.PROG" corresponding to the playlist (S303).

Next, the scenario processor 305 starts playback of the cell, based on the cell information registered in the playlist (S304). Cell playback means that a request is issued from the scenario processor to the presentation controller 306, and the presentation controller 306 starts AV data playback (S305).

Once playback of AV data is started, the presentation controller 306 reads in the VOB information file "YYY.VOBI" corresponding to the cell being played (S402) and analyzes it. The presentation controller 306 identifies the VOBU for which to start playback and the address thereof, using the time map, and instructs the drive controller 317 of the readout address. The drive controller 317 reads out the relevant VOB data "YYY.VOB" (S403).

The VOB data that has been read out is sent to the decoder, and playback is started (S404). VOB playback is continued until the playback section of this VOB ends (S405), and upon ending, if there is a next cell (Yes in S406), transitions to playback of Cell (S304). In a case where there is no next cell (No in S406), the processing relating to playback ends.

FIGS. 29A and 29B are flowcharts illustrating the flow of event processing from after having started AV data playback. FIG. 29A is a flowchart illustrating the flow of processing relating to a time event in a BD-ROM player.

Note that the BD-ROM player is an event-driven player model. When playback of a playlist is started, the time event related, user event related, and subtitle display related event processing processes are each activated, and event processing is executed in parallel.

When playback of the playlist is started at the BD-ROM player (S501), confirmation is made that playlist playback has not ended (No in S502), and the scenario processor 305 confirms whether the time event generation time has arrived (S503).

In a case where the time event generation time has arrived (Yes in S503), the scenario processor 305 generates a time event (S504). The program processor 302 receives the time event, and executes the event handler (S505).

In a case where the time event generation time has not arrived (No in S503), and in a case where execution of the event handler has ended, the processing after confirmation of end of the playlist playback (S502) is repeated.

In a case where confirmation is made that the playlist playback has ended (Yes in S502), the time event related processing is force-quit.

FIG. 29B is a flowchart illustrating the flow of processing relating to a user event in a BD-ROM player. When playback of the playlist is started at the BD-ROM player (S601), confirmation is made that playlist playback has not ended (No in S602), and the UO manager 303 confirms whether a UO has been accepted.

In a case where there has been a UO accepted (Yes in S603), the UO manager 303 generates a UO event (S604). The program processor 302 accepts the UO event, and confirms whether the UO event is a menu call or not.

In the case of a menu call (Yes in S605), the program processor 302 causes the scenario processor 305 to generate an event (S607), and the program processor 302 executes the event handler (S608).

On the other hand, in a case where determination is made that the UO event is not a menu call (No in S605), this means that the UO event is an event due to a cursor key or the "OK" key. In this case, the scenario processor 305 determines whether or not the current time is within the valid period of the user event. If within the valid period (Yes in S606) the scenario processor 305 generates a user event (S607), and the program processor 302 executes the relevant event handler (S608).

In a case where there is no UO accepted (No in S603), the current time is not within the valid period of the user event (No in S606), or the execution of the event handler has ended, the processing following confirmation of the end of the playlist playback (S602) is repeated.

Upon confirmation of the end of the playlist playback (Yes in S602), the user event related processing is force-quit.

Figure 30:
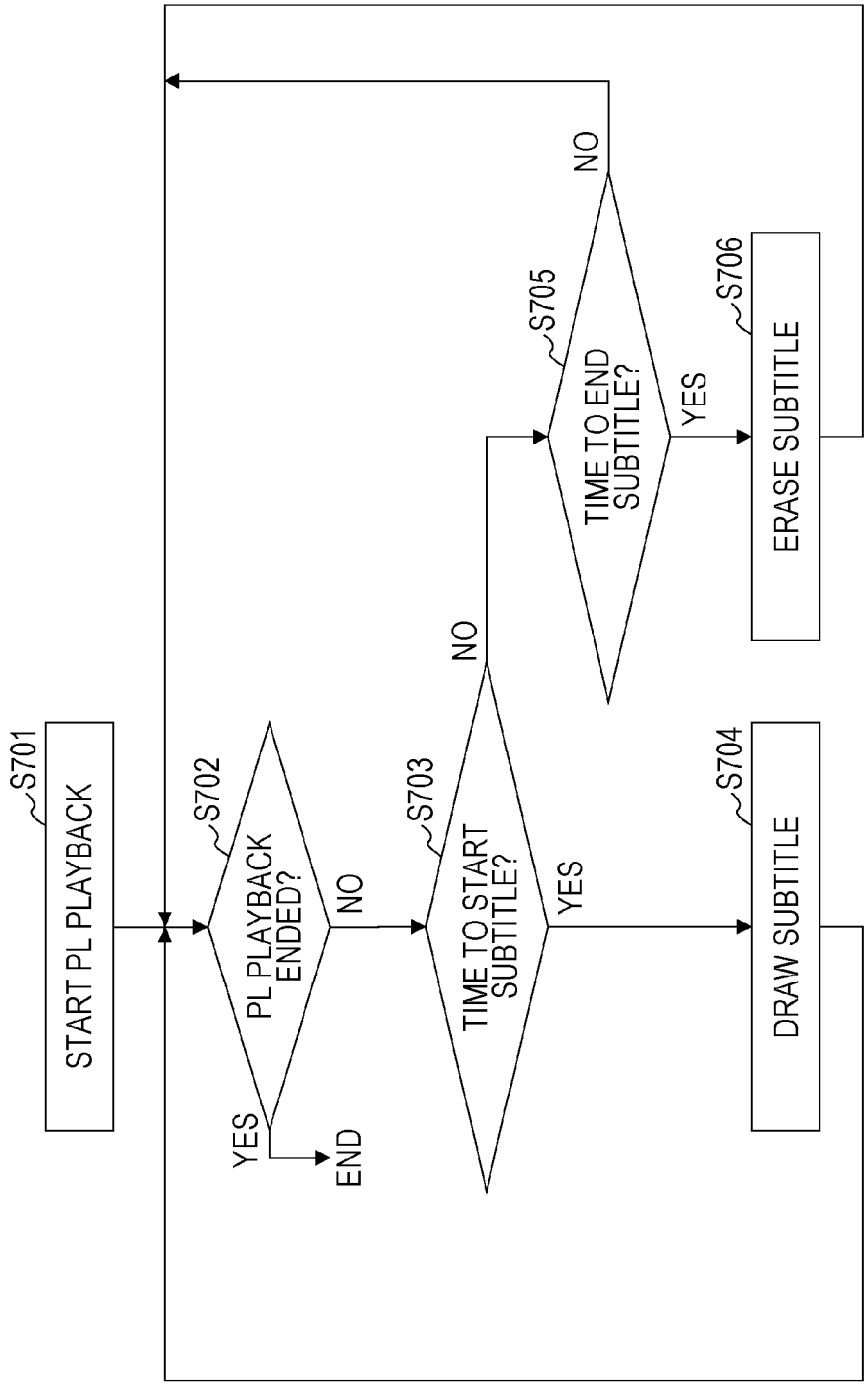
FIG. 30 is a flowchart illustrating the flow of processing subtitle data in a BD-ROM player.

FIG. 30 is a flowchart illustrating the flow of processing of subtitle data in the BD-ROM player. When playback of the playlist is started at the BD-ROM player (S701), confirmation is made that playlist playback has not ended (No in S702), and the scenario processor 305 confirms whether the subtitle display start time has arrived or not. In a case where the subtitle display start time has arrived (Yes in S703), the scenario processor 305 instructs the presentation controller 306 to draw the subtitle, and the presentation controller 306 instructs the image processor 311 to draw the subtitle. The image processor 311 follows the instruction to draw the subtitle on the image plane 209 (S704).

Also, in a case where the subtitle display start time has not arrived (No in S703), confirmation is made whether the subtitle display end time has arrived. In a case where the subtitle display end time has arrived (Yes in S705), the presentation controller 306 instructs the image processor 311 to erase the subtitle.

The image processor 311 erases the subtitle that has been drawn from the image plane 209, in accordance with the instruction (S706).

In a case where the subtitle drawing by the image processor 311 (S704) has ended, a case where erasing of the subtitle by the image processor 311 (S706) has ended, and a case where determination is made that the subtitle display end time has not arrived (No in S705), the processing following configuration of end of the playlist playback (S702) is repeated.

Also, upon confirmation of the end of the playlist playback (Yes in S702), the subtitle related processing is force-quit.

According to the above operations, the BD-ROM player performs basic processing relating to BD-ROM playback based on user instructions or the BD management information recorded in the BD-ROM, and so forth.

Second Embodiment

Next, a second embodiment will be described. Description will be made regarding recording and playing high-luminance (HDR) video information with a BD. Note that the basic content of the technology is based on the first embodiment, so description will primarily be made regarding points of difference as to the first embodiment.

Figure 31:
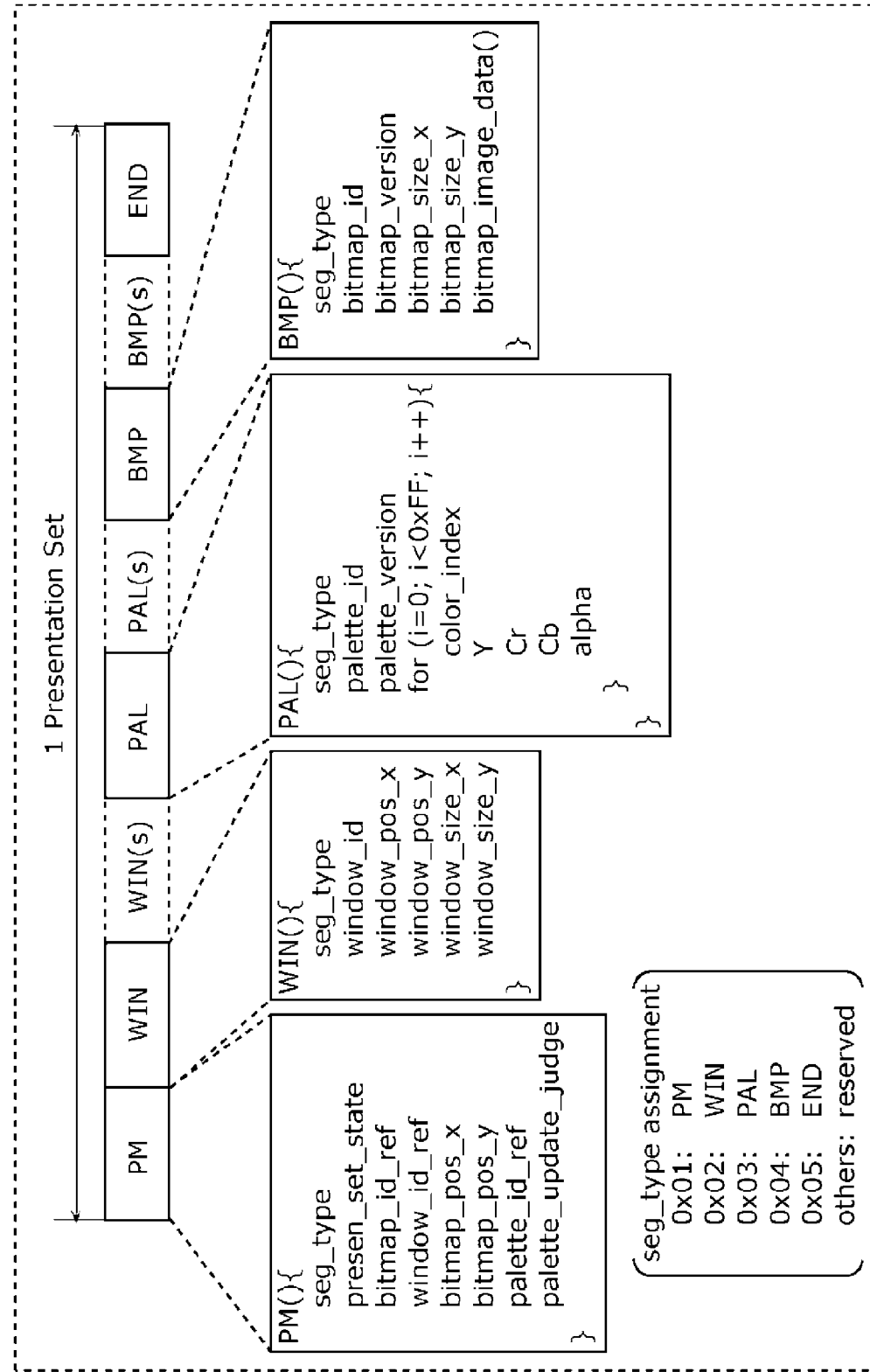
FIG. 31 is a diagram illustrating the structure of a subtitle stream.

FIG. 31 illustrates the structure of a subtitle video stream making up one display unit. A subtitle video stream of one display unit is called a Presentation Set, and has a structure starting with Presentation Manager (PM) data and ending with END. Each data segment will be described below.

PM is a data segment that is always situated at the start of each Presentation Set in a subtitle video stream, and includes the following data fields.

seg_type represents the type of the segment. In a case where seg_type=0x01 as illustrated in FIG. 31, this means that the data segment in which it is included is a PM.

presen_set_state indicates whether the Presentation Set is a type including all data necessary for subtitle display, as one display unit of the subtitles, or is a type storing just partial update data, such as only changing the display color.

bitmap_id_ref indicates the bitmap identification information (bitmap_id) of the subtitle video that this Presentation Set displays.

window_id_ref indicates display region identification information (window_id) that this Presentation Set uses.

bitmap_pos_x and bitmap_pos_y indicate the position of the upper-left coordinates of the bitmap specified by bitmap_id_ref.

palette_id_ref indicates the identification information (palette_id) of the display color index color table that this Presentation Set uses.

palette_update_judge indicates whether or not this Presentation Set is a Presentation Set of a type that only updates the display color index color table. In a case where palette_update_judge=1, the display region and bitmap themselves are the same as the immediately previous Presentation Set, and only the display color index color table changes. Accordingly, display control of designs where the color gradually changes, such as in karaoke, can be realized without resending the bitmap that has a large data size.

WIN (WINdow) is a data segment situated immediately after PM, and a plurality thereof may be arrayed. WIN is a data segment instructing a display region used by the Presentation Set, and includes the following data fields.

seg_type=0x02 indicates that this data segment is a WIN.

window_id is information for identifying the display region specified by this WIN.

window_pos_x and window_pos_y indicate the upper-left coordinate values of this display region. The window_size_x and window_size_y indicate the size of the display region in the horizontal direction (x) and vertical direction (y), in pixel increments.

Note that the reason why the display region is sectioned in this way is to narrow down the display region so as to speed up the refresh rate even under conditions where the decoder transmission band is limited.

PAL (PALette) is a data segment situated immediately after WIN, and a plurality thereof may be arrayed. PAL is a data segment storing display colors (index colors) used by the Presentation Set, and includes the following data fields.

seg_type=0x03 indicates that this data segment is a PAL.

palette_id is information for identifying this display color index color table.

palette_version indicates a version (whether or not there has been an update) of PALs having the same palette_id. This palette_version can be used to update only palette_version while palette_id is fixed, in a Presentation Set where only the display color index color table is updated (palette_update_judge=1).

color_index indicates the color index No. (e.g., from 0 to 255).

Y, Cr, Cb, and alpha indicate color information that the relevant color index No. (color_index) actually means. This color information is stored as each of Y (luminance information), Cr/Cb (color-difference information), and alpha (transparency information). This identifies the color corresponding to the index color No. (color_index) specified by BMP( ). A maximum of 255 colors are registered in this color index by loop processing.

BMP (BitMaP) is a data segment situated immediately after PAL, and a plurality thereof may be arrayed. For example, in a case where multiple subtitle videos are displayed at the same time, multiple WINs, PALs, and BMPs will be arrayed. BMP stores the bitmap information of the subtitle video that the Presentation Set stores.

seg_type=0x04 indicates that this data segment is a BMP.

bitmap_id is identification information of this bitmap video information.

bitmap_version indicates a version (whether updated or not) of this bitmap.

bitmap_size_x and bitmap_size_y describe the size of this bitmap in the x and y directions when rendered, in pixel increments.

bitmap_image_data( ) stores data compression-coded data of this bitmap video.

Thus, a Presentation Set, which is one subtitle display unit, is an elementary stream for forming data segments of information necessary for one subtitle display or subtitle update, and transferring. A subtitle stream is an array of multiple Presentation Sets to update a subtitle.

Figure 32:
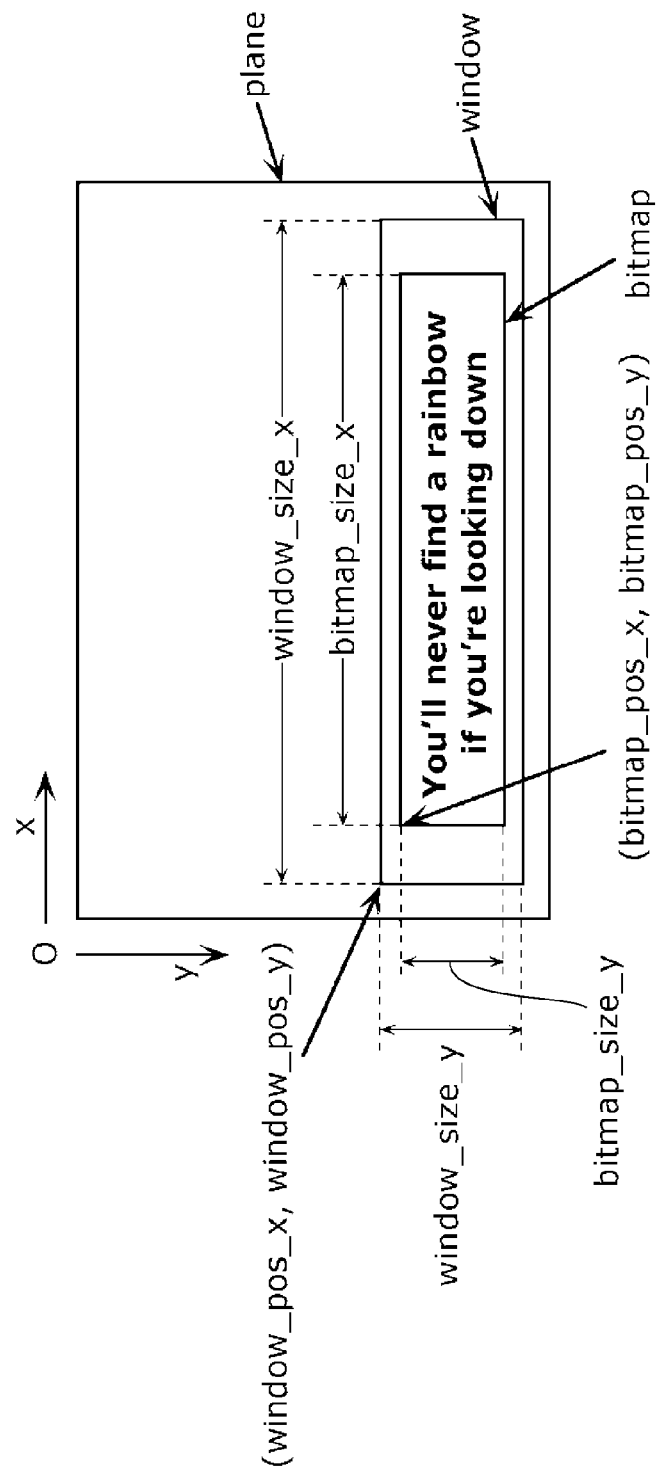
FIG. 32 is a diagram illustrating the relationship between parameters used for display control of subtitles.

FIG. 32 is a diagram illustrating the positional relationship when displaying subtitles described in FIG. 31.

A plane in which the subtitle is displayed has the upper left as the origin, with x and y coordinate axes extending to the right and downwards, respectively. The display region (WIN) is placed within this plane, and a bitmap image (BMP) is placed within the display region.

Figure 33A:
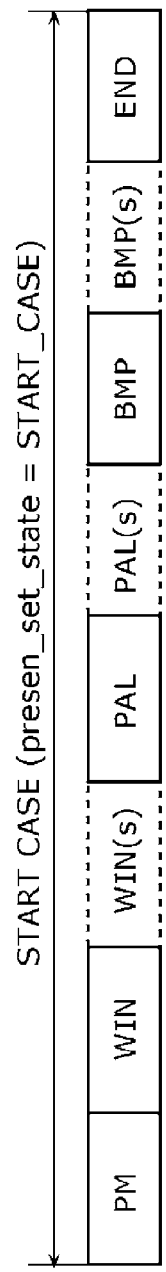
FIG. 33A is a diagram illustrating a type of subtitle stream structure.
Figure 33B:
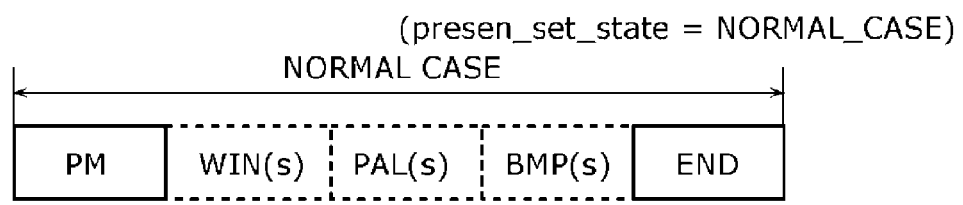
FIG. 33B is a diagram illustrating a type of subtitle stream structure.

FIGS. 33A and 33B are diagrams for describing presen_set_state. The Presentation Set of the subtitle stream includes a START CASE type that includes all necessary data so that display can be started from the Presentation Set, and a NORMAL CASE type for updating just part of the information of the current subtitle display. The START CASE type and NORMAL CASE type are identified by the value of the presen_set_state.

Immediately after a playback start position and seamless connection point, the START CASE type is used, and otherwise the NORMAL CASE type is used, thereby enabling subtitle video to be transmitted while efficiently suppressing data amount.

Figure 34:
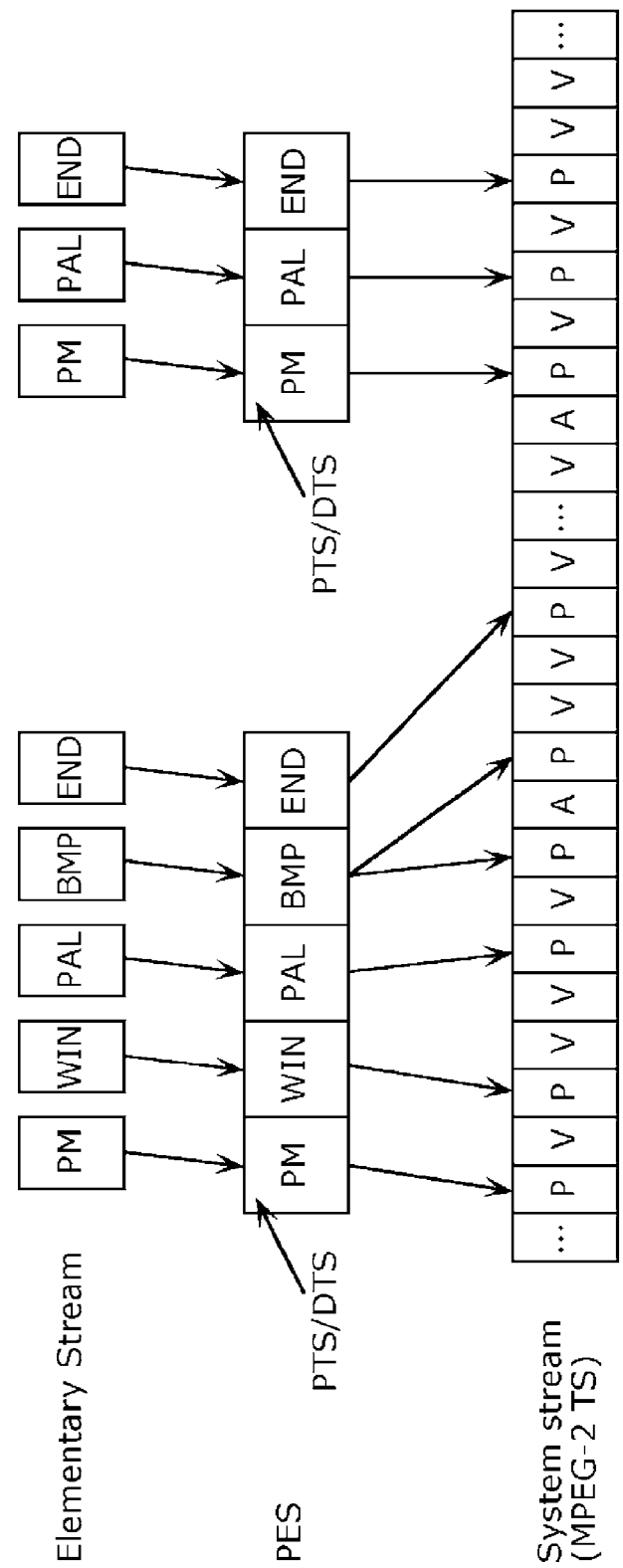
FIG. 34 is a diagram for describing a multiplexed structure of subtitles onto a system stream.

FIG. 34 is a diagram for describing forming a system stream of a subtitle stream. The Presentation Set is coded as a subtitle elementary stream (upper tier). This subtitle elementary stream is packetized into Packetized Elementary Stream (PES) packets every data segment (middle tier). The PES packets are multiplexed along with other elementary streams in a system stream such as a MPEG-2 transport stream (lower tier).

The multiplexing format is not restricted to MPEG-2 TS, and may be MPEG-2 PS, MP4, or the like. Also, PTS and DTS, which are timing information, are given to the PES. Accordingly, the system decoder can decode the subtitles at a desired timing, and can display the obtained subtitles synchronously with the video.

Although subtitles for standard luminance video (SDR) has been described so far, a subtitle stream compatible with superimposing onto video for high luminance video (HDR) will be described hereinafter.

Figure 35:
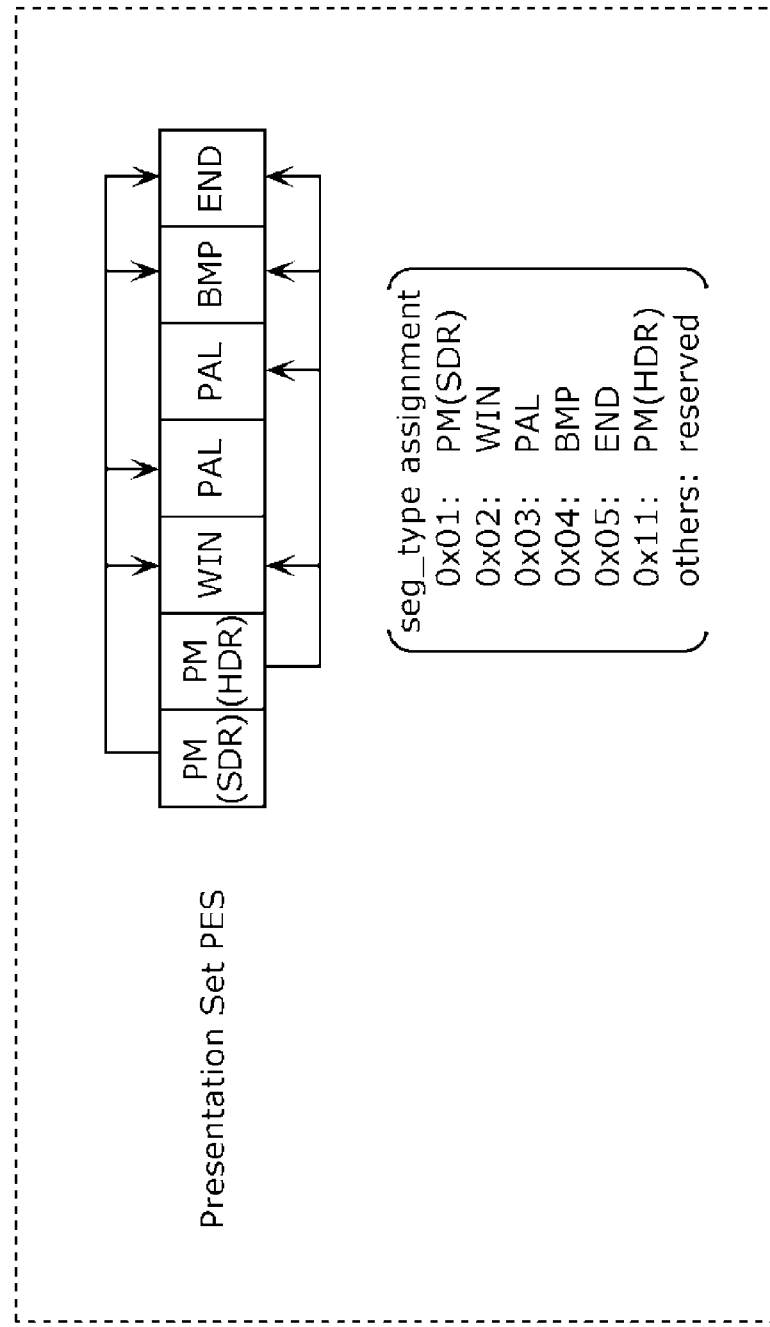
FIG. 35 is a diagram illustrating a subtitle stream corresponding to both SDR and HDR.

FIG. 35 is a diagram illustrating one Presentation Set in a subtitle stream compatible with both SDR and HDR. This subtitle stream has a feature that a total of two PMs are disposed as PMs used for playback control of the Presentation Set, which are a PM for SDR and a PM for HDR that is disposed immediately after.

That is to say, in a case where the Presentation Set is compatible with video for HDR, the Presentation Set includes the PM (HDR) for HDR output. This PM (HDR) is situated after the PM (SDR) for SDR.

The PM (SDR) for normal luminesce video (SDR) is the same as described above, and the PM (HDR) for high luminance video (HDR) has the same data structure and semantics as the PM (SDR).

PM (SDR) is identified by the same seg_type=0x01 as before, but PM (HDR) is identified by a new value unused heretofore, by seg_type=0xl 1 for example.

The PTS and DTS of PES packets in the PM (SDR) and the PTS and DTS of PES packets in the PM (HDR) are the same values.

The PM (HDR) references the WIN, PAL, and BMP, in the same way as with the PM (SDR). Only the values of seg_type and palette_id_ref in the data field of the PM (HDR) differ from the PM (SDR), an all other data field values are the same as the PM (SDR).

Specifically, palette_id_ref in the PM (SDR) indicates the palette_id to be specified when superimposing on SDR video, while palette_id_ref in the PM (HDR) immediately following after the PM (SDR) indicates the palette_id to be specified when superimposing on HDR video.

In a case of decoding SDR video, the playback device decodes the Presentation Set using the PM (SDR). In a case of decoding HDR video, the playback device decodes the Presentation Set using the PM (HDR).

Thus, the Presentation Set compatible with both SDR and HDR that is illustrated in FIG. 35 shares the BMP that has the large data amount, and specifies the index colors that can be specified by the Presentation Set using the palette_id_ref of the PM (SDR) and the palette_id_ref of the PM (HDR). Accordingly, the index color can be specified according to the intent of the producer, in accordance with the attribute (SDR or HDR) of the video being played.

The playback device can select which of PM (SDR) and PM (HDR) to use. That is to say, the playback device only has to select one of seg_type=0x01 and 0x11. Thus, a subtitle processing unit compatible with both SDR and HDR can be designed and developed without changing other subtitle display control processing.

This is also advantageous from the perspective of disc production, in that the data structure can be shared, and a single bitmap image (BMP) and be shared between HDR and SDR with only an extremely small increase in data amount.

Figure 36:
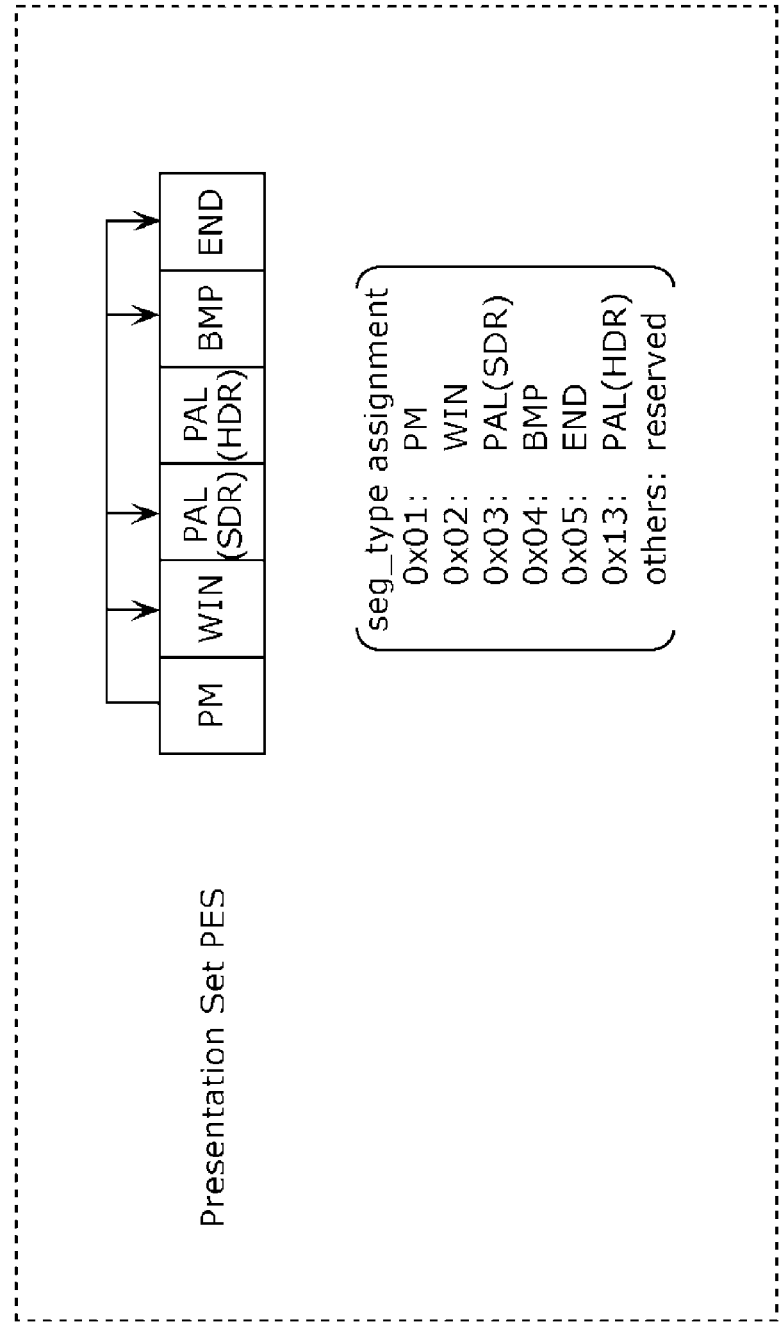
FIG. 36 is a diagram illustrating a subtitle stream corresponding to both SDR and HDR.

The following is a description of another example of a subtitle stream compatible with both SDR and HDR. FIG. 36 is a diagram illustrating one Presentation Set of a subtitle stream compatible with both SDR and HDR. This subtitle stream has a feature that a pair of a PAL for SDR and a PAL for HDR that is disposed immediately after is placed within the PAL placement string, as PALs storing the display color index color table of the Presentation Set.

That is to say, in a case where the Presentation Set is compatible with video for HDR, the Presentation Set includes the PAL (HDR) for HDR output. The PM (HDR) for HDR and the PM (SDR) for SDR also form a pair for output of SDR and HDR, respectively. The paired PAL (SDR) and PAL (HDR) may be consecutively coded, so that the pair relationship is clear.

The PAL (SDR) for normal luminesce video (SDR) is the same as described above, and the PAL (HDR) for high luminance video (HDR) has the same data structure and semantics as the PAL (SDR).

PAL (SDR) is identified by the same seg_type=0x03 as before, but PAL (HDR) is identified by a new value unused heretofore, by seg_type=0x13 for example.

The PAL (HDR) and the paired PAL (SDR) have the same palette_id value and the same palette_version value, and are encoded to have the same PTS value in the PES packet hierarchical level.

The PAL (SDR) indicates the display color index color table to be used when superimposing on SDR video, while the PAL (HDR) following immediately after indicates the display color index color to be used when superimposing on HDR video.

In a case of decoding SDR video, the playback device decodes the Presentation Set using the PAL (SDR) specified by the palette_id value and palette_version value. In a case of decoding HDR video, the playback device decodes the Presentation Set using the PAL (HDR) specified by the palette_id value and palette_version value.

Thus, the Presentation Set compatible with both SDR and HDR that is illustrated in FIG. 36 has the pair of PAL (SDR) and PAL (HDR) as index colors that can be specified in this Presentation Set, while sharing the BMP that has the large data amount. Accordingly, the index color can be specified according to the intent of the producer, in accordance with the attribute (SDR or HDR) of the video being played.

The playback device can select which of PAL (SDR) and PAL (HDR) to use. That is to say, the playback device only has to select one of seg_type=0x03 and 0x13. Thus, a subtitle processing unit compatible with both SDR and HDR can be designed and developed without changing other subtitle display control processing. This is also advantageous from the perspective of disc production, in that the data structure can be shared, and a single bitmap image (BMP) and be shared between HDR and SDR with only an extremely small increase in data amount.

Figure 37:
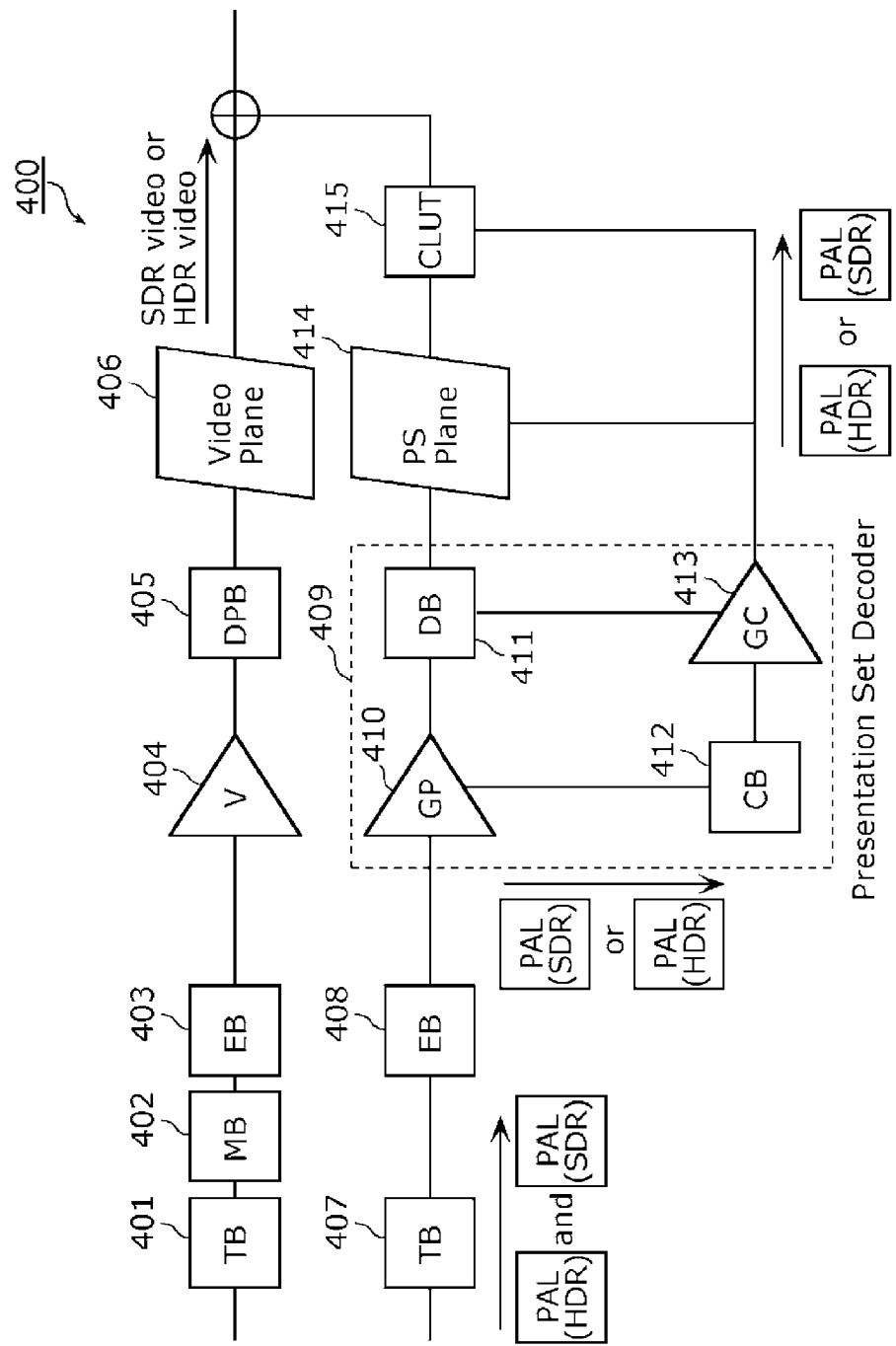
FIG. 37 is a diagram illustrating a system decoder model that decodes video and subtitles.

The following is a description of a system decoder model according to the present embodiment. FIG. 37 is a diagram illustrating a system decoder model 400 that decodes a video stream and subtitle stream.

The video stream goes through a transport stream buffer 401 (TB), multiplexing buffer 402 (MB), and elementary stream buffer 403 (EB), is decoded by a video decoder 404 (V), passes through a decoded picture buffer 405 (DPB), and is rendered at a video plane 406. If the video stream is SDR, an SDR video is drawn on the video plane 406, and if the video stream is HDR, and HDR video is drawn on the video plane 406.

An SDR video stream and HDR video stream can be identified by whether or not there is metadata such as a user unregistered SEI message or the like in the video stream, if the video stream is MPEG-4 AVC or HEVC.

For example, in the case of an SDR video stream, luminance information up to 100 nits in the BT.709 color space is coded and no metadata is stored, but in the case of an HDR video stream, brighter luminance information up to 1000 nits in the broader BT.2020 color space is coded and tone mapping parameters of largest and smallest luminance value and luminance change are stored in a user unregistered SEI message as metadata.

The lower tier in FIG. 37 illustrates a decoder of the subtitle stream in the case in FIG. 36. The subtitle stream transferred from the transport stream buffer 407 (TB) to the elementary stream buffer 408 (EB) is input to a presentation set decoder 409. This subtitle stream includes both display color index color tables (PAL (HDR) and PAL (SDR)) for HDR and SDR.

The presentation set decoder 409 includes a graphics processor 410 (GP), a coding buffer 411 (DB), a composition buffer 412 (CB), and a graphics controller 413 (GC).

The PAL (HDR) and PAL (SDR) are processed at the time of the PTS in the respective PES packets in the graphics processor 410 (GP), and only the necessary one is stored in the composition buffer 412 (CB).

Which of the PAL (HDR) and PAL (SDR) is necessary can be determined based on which of SDR and HDR the video being decoded is. For example, whether the video is SDR or HDR may be determined from whether or not there is a user unregistered SEI message. Alternatively, type information indicating whether the video stream is SDR or HDR may be described in a database such as PlayList (.PL) or stream attribute information (.VOBI) (e.g., adding SDR/HDR identification information to the Video in FIG. 13), with determination of whether the attribute of the video stream is SDR or HDR being made based on this type information. Alternatively, PAL (SDR) and PAL (HDR) may be used separately according to whether the final output video of the player is SDR or HDR.

The subtitle video decoded by the graphics processor 410 is drawn on a PS plane 414 via the coding buffer 411 (DB). The display color index color table stored in the composition buffer 412 is sent to a color table application unit 415 (CLUT) by the graphics controller 413 (GC). The color table application unit 415 colors the subtitle video using this display color index color table.

Although an example has been described above regarding a subtitle stream, the same technique can be applied to a menu video stream as well.

Figure 38:
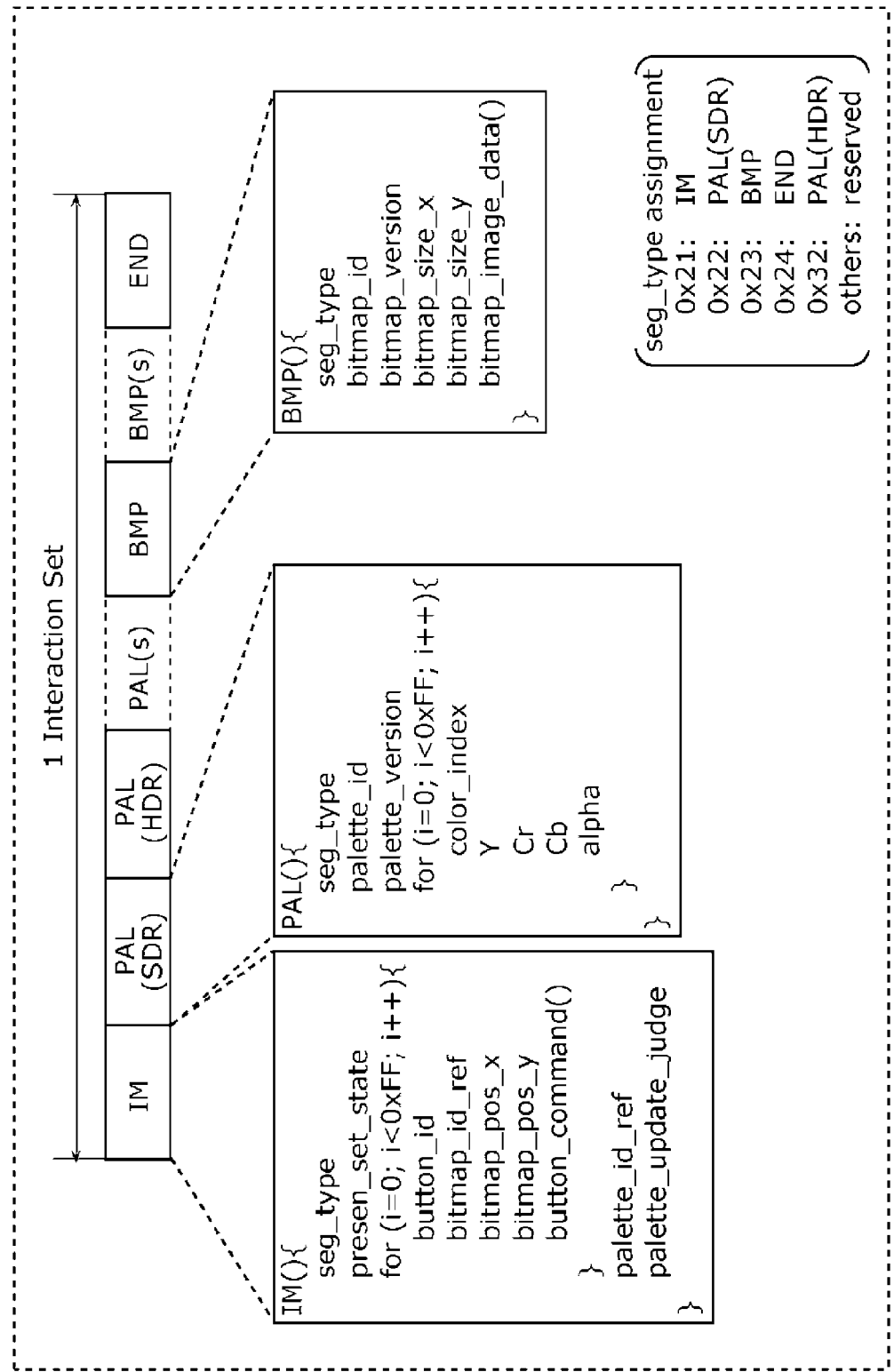
FIG. 38 is a diagram illustrating the structure of a stream configuring a menu.

FIG. 38 is a diagram illustrating a menu video stream compatible with both SDR and HDR. A case will be described where PAL (SDR) and PAL (HDR) are used, in the same way as with the subtitle stream illustrated in FIG. 37.

An IM (Interaction Manager) includes button identification information (button_id), bitmap image (bitmap_id_ref), display position (bitmap_pos_x and bitmap_pos_y), and command (button_command( )).

PAL (PALette) is of the same structure as in the subtitle stream. PAL (SDR) is assigned seg_type=0x22, and PAL (HDR) seg_type=0x32, respectively. BMP (BitMaP) is of the same structure as in the subtitle stream.

Giving separate identification Nos. to the SDR display color index color table (PAL (SDR)) and HDR display color index color table (PAL (HDR)) for the menu video stream in the same way as with the subtitle video stream enables efficient extension. Note that the above description is but an example, and that one skilled in the art will be capable of various applications.

As described above, the recording medium according to the present embodiment has recorded therein a main video stream where a main video has been encoded, and a sub-video stream where a sub-video to be displayed superimposed on the main video has been encoded. Examples of sub-video here include subtitles and menus.

A sub-video stream includes bitmap data (BMP) indicating a design of the sub-video, and palette data (PAL) instructing a display color of the design indicated by the bitmap data. The palette data (PAL) includes a first palette data (PAL (SDR)) for a first luminance dynamic range (SDR) and a second palette data (PAL (HDR)) for a second luminance dynamic range (HDR) that is broader than the first luminance dynamic range.

For example, the main video stream includes a first main video stream of the first luminance dynamic range (SDR) and a second main video stream of the second luminance dynamic range (HDR). The first palette data (PAL (SDR)) is used in the case that the first main video stream is to be played, and the second palette data (PAL (HDR)) is used in the case that the second main video stream is to be played.

Only luminance values within the first luminance dynamic range (SDR) are used for the first palette data. That is to say, luminance values outside of the first luminance dynamic range (SDR) in the second luminance dynamic range (HDR) (high luminesce values) are not included in the first palette data.

Only luminance values within the second luminance dynamic range (HDR) are used for the second palette data. Note that luminance values outside of the first luminance dynamic range (SDR) (high luminesce values) do not necessarily have to be included in the second palette data. That is to say, it is sufficient for the second palette data to be sub-video palette data used when the second main video stream (HDR video stream) is played. The second main video stream includes video of higher luminesce values than the first main video stream. Accordingly, in a case of using subtitles of the same color shade and luminance, the subtitles superimposed on the second main video stream may become difficult to visualize. In contrast, using the second palette data that has different color shade or luminance from the first palette data allows subtitles of a color shade or luminance suitable for the second main video stream to be displayed, so user visibility of the subtitles can be improved.

Different palate data is thus used for each of the first luminance dynamic range (SDR) and the second luminance dynamic range (HDR), whereby user visibility of subtitles can be improved. The bitmap data may be shared between the first luminance dynamic range (SDR) and second luminance dynamic range (HDR).

Accordingly, subtitles or menu graphics to be superimposed on the first main video (SDR) and second main video (HDR) can be recorded without squeezing disc capacity. The playback device can change just the index color table of display colors in accordance with the video on which superimposing is to be performed, thereby easily obtaining subtitles and menu graphics for the first luminance dynamic range (SDR) and the second luminance dynamic range (HDR), while reflecting the intent of the producer.

Third Embodiment

A case will be described in a third embodiment where a subtitle stream (PG stream) and a menu video stream (IG stream) are stored in a BD. Many current TVs do not have functions to receive HDR video signals. Accordingly, content producers need to record an SDR video stream in the disc, in addition to an HDR stream, in order for video to be played on such TVs as well.

In this case, the content producer can use one of the following two methods. The first method is to prepare two independent system streams (e.g., MPEG-2 TS) to play HDR and SDR. The second method is to prepare a single system stream (e.g., MPEG-2 TS) to play HDR and SDR. Hereinafter, the single system stream in the second method will be referred to as a dual stream.

In the present embodiment, the set of the PG stream and IG stream for HDR and the PG stream and IG stream for SDR are made to have the same content other than a Color Look Up Table (CLUT), so that the user can experience the same state when playing HDR and when playing SDR from the dual stream. The content here means the start and end timing of display, the content displayed, language, and so forth.

Specifically, by making the same the PID values of the set of PG stream for HDR and PG stream for SDR, and the registration order in the BD database files (PlayList and Clip Information file), the set of PG stream for HDR and PG stream for SDR is more readily comprehended. This is the same for IG streams.

Figure 39:
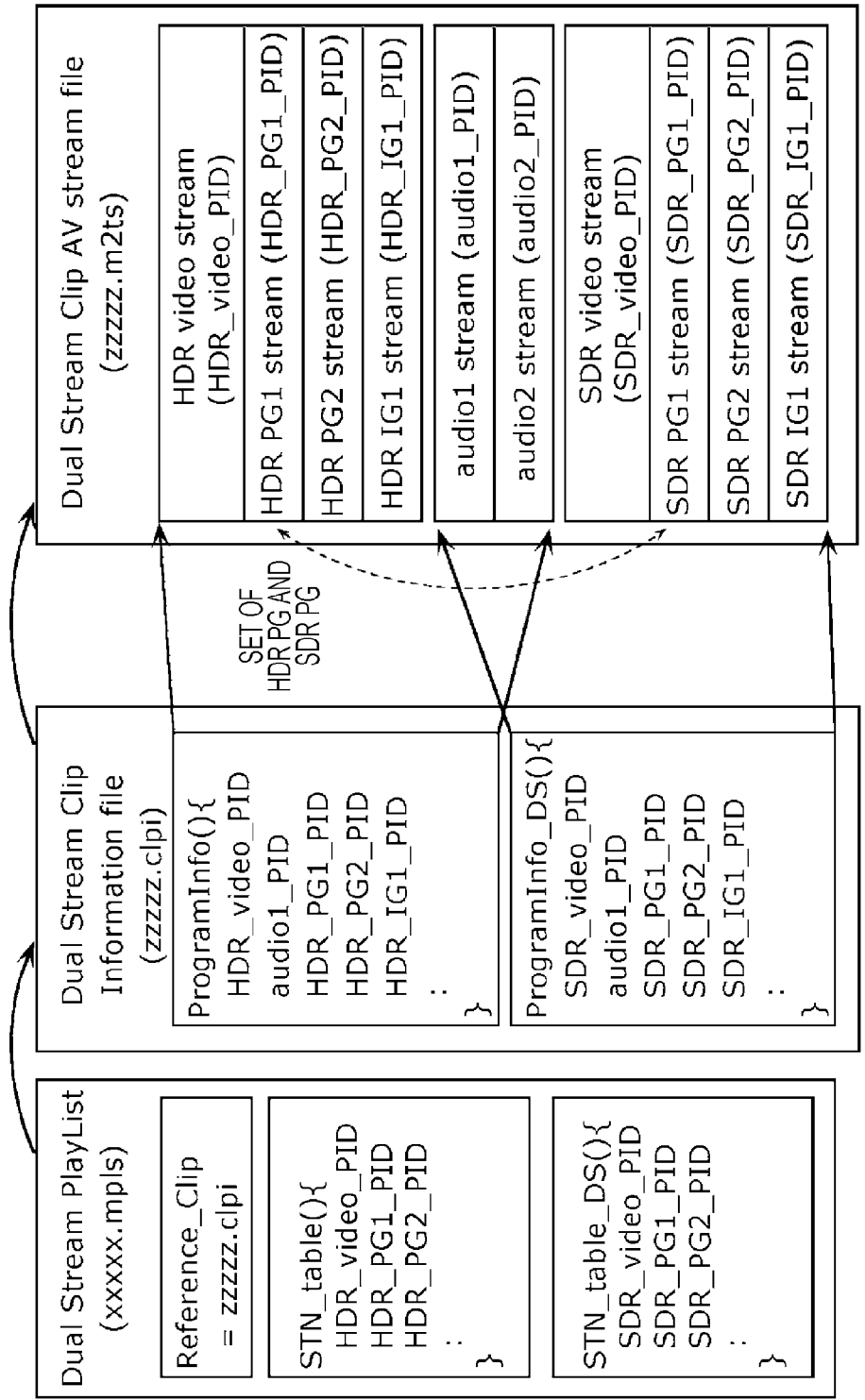
FIG. 39 is a diagram for describing a PG stream and IG stream in a dual stream.

FIG. 39 is a diagram for describing PG streams and IG streams in a dual stream according to the present embodiment. A dual stream playlist (Dual Stream PlayList) includes an STN_table( ) data block that defines PG streams and IG streams for HDR, and an STN_table_DS( ) data block that defines PG streams and IG streams for SDR.

A dual stream clip information file (Dual Stream clip Information file) includes a ProgramInfo( ) data block that defines PG streams and IG streams for HDR, and a ProgramInfo_DS( ) data block that defines PG streams and IG streams for SDR.

Thus, the registered content (Registration) of the elementary stream for HDR playback is described in the STN_table( ) and programInfo( ). The registered content (Registration) of the elementary stream for SDR playback is described in the STN_table_DS( ) and programInfo_DS( ).

A dual stream clip AV stream file (Dual Stream Clip AV stream file) includes an HDR video stream (HDR video stream), an HDR PG1 stream (HDR PG1 stream), an HDR PG2 stream (HDR PG2 stream), an HDR IG1 stream (HDR IG1 stream), an SDR video stream (SDR video stream), an SDR PG1 stream (SDR PG1 stream), an SDR PG2 stream (HDR PG2 stream), an SDR IG1 stream (HDR IG1 stream), an audio 1 stream (audio1 stream), and an audio 2 stream (audio2 stream).

The HDR video stream, HDR PG1 stream, HDR PG2 stream, and HDR IG1 stream, are streams for HDR. The HDR video stream includes main video information for HDR, the HDR PG1 stream and HDR PG2 stream include subtitle information for HDR, and the HDR IG1 stream includes menu information for HDR.

The SDR video stream, SDR PG1 stream, SDR PG2 stream, and SDR IG1 stream, are streams for SDR. The SDR video stream includes main video information for SDR, the SDR PG1 stream and SDR PG2 stream include subtitle information for SDR, and the SDR IG1 stream includes menu information for SDR.

Now, the HDR PG1 stream and the SDR PG1 stream make up a set, the HDR PG2 stream and the SDR PG2 stream make up a set, and the HDR IG1 stream and the SDR IG1 stream make up a set. The two streams included in a set represent the same content, and are the same stream except for palette data (PDS (Palette Definition Segment)), which will be described later. Note that the PDS is data the same as the above-described PAL. Each PG stream includes a plurality of information the same as the Presentation set illustrated in FIG. 31.

For example, the HDR PG1 stream and SDR PG1 stream are Japanese subtitles, and the HDR PG2 stream and SDR PG2 stream are English subtitles. The audio 1 stream and audio 2 stream include audio information, and are shared by HDR and SDR. For example, the audio 1 stream is English audio, and the audio 2 stream is Japanese audio.

As described above, a dual stream includes video streams, subtitle streams, and menu streams, individually for HDR and SDR. A dual stream also includes audio streams to be shared by HDR and SDR.

Although FIG. 39 illustrates an example where two types of subtitles, one type of menu graphics, and two types of audio are stored, the numbers of subtitles, menu graphics, and audio, may be optional.

Also, subtitle streams and menu streams of the same content for HDR and SDR form a pair in the present embodiment. In other words, a subtitle and menu that exists for SDR also exists for HDR without exception, and a subtitle and menu that exists for HDR also exists for SDR without exception. For example, in a case where three types of subtitles, that are Japanese subtitles, English subtitles, and French subtitles, exist as subtitles for SDR, the three types of subtitles, that are Japanese subtitles, English subtitles, and French subtitles, will exist as subtitles for HDR, without exception. In other words, a situation where different subtitles or menus exists between HDR and SDR is forbidden.

Providing this sort of restriction enables the user to be provided with the same viewing/listening experience when playing SDR and when playing HDR. Rules are set in the present embodiment regarding the values of PIDs given to the streams, to identify the above-described sets. This will be described below in detail.

FIG. 40 is a diagram illustrating PIDs used in each of the streams. As illustrated in FIG. 40, the PID value of an HDR PG stream defined by a dual stream clip is one of HDR_PG_PID1 through HDR_PG_PID32, and the PID value of an SDR PG stream is one of SDR_PG_PID1 through SDR_PG_PID32.

The PG streams for HDR and PG streams for SDR that form a set in a dual stream clip are set to the same ascension order in the PD range. For example, a PG stream for HDR of which the PID is HDR_PG_PID1+X and a PG stream for SDR of which the PID is SDR_PG_PID1+X form a set.

These rules are the same with regard to IG streams as well. That is to say, in a case where an HDR PG1 stream and an SDR PG1 stream are a set, the relationship of PID values is as follows.

$$(HDR\_PG1\_PID)-(HDR\_PG\_PID1)= (SDR\_PG1\_PID)-(SDR\_PG\_PID1)$$

That is to say, the PG stream for HDR to which the first PID (HDR_PG_PID1) of the multiple PIDs assigned to the PG stream for HDR (HDR_PG_PID1 through HDR_PG_PID32), and the PG stream for SDR to which the first PID (SDR_PG_PID1) of the multiple PIDs assigned to the PG stream for SDR (SDR_PG_PID1 through SDR_PG_PID32), form a set. The PG stream for HDR to which the second PID (HDR_PG_PID2) of the multiple PIDs assigned to the PG stream for HDR, and the PG stream for SDR to which the second PID (SDR_PG_PID2) of the multiple PIDs assigned to the PG stream for SDR, form a set.

In the same way, in a case where an HDR IG1 stream and an SDR IG1 stream are a set, the relationship of PID values is as follows.

$$(HDR\_IG1\_PID)-(HDR\_IG\_PID1)= (SDR\_IG1\_PID)-(SDR\_IG\_PID1)$$

Also, a set of a PG stream and IG stream for HDR and a PG stream and IG stream for SDR are exactly the same except for palette_entry( ) in the PDS (Palette Definition Segment). Accordingly, the user can experience the same playing results when playing HDR and when playing SDR, so there is no confusion.

FIG. 41 is a diagram illustrating the configuration of the PDS. The palette_entry( ) is a data block defining the CLUT (color look-up table) for this PDS.

The PDS includes a palette_entry, and is included in each of the PG streams and IG streams. The meanings of the segments included in a PDS are the same as the meanings of the segments included in the PAL illustrated in FIG. 31. The meanings of the segment_descriptor( ), palette_id, palette_version_number, palette_entry_id, Y, Cr, Cb, and transparent_alpha illustrated in FIG. 41 are the same as the respective meanings of the seg_type, palette_id, palette_version, color_index, Y, Cr, Cb, and alpha, illustrated in FIG. 31.

The PG streams and IG streams for SDR include a palette_entry( ) data block used for SDR playback. The PG streams and IG streams for HDR include a palette_entry( ) data block used for HDR playback.

As described above, the recording medium according to the present embodiment has recorded therein a main video stream where a main video has been encoded, and a sub-video stream where a sub-video to be displayed superimposed on the main video has been encoded. Examples of sub-video here include subtitles and menus.

A sub-video stream includes bitmap data (BMP) indicating a design of the sub-video, and palette data (PDS) instructing a display color of the design. The palette data (PDS) includes a first palette data (e.g., a PDS within an SDR PG1 stream) a first luminance dynamic range, and a second palette data (e.g., a PDS within an HDR PG1 stream) for a second luminance dynamic range (HDR) that is broader than the first luminance dynamic range.

For example, the main video stream includes a first main video stream (SDR video stream) of the first luminance dynamic range (SDR) and a second main video stream (HDR video stream) of the second luminance dynamic range (HDR). The first palette data is used in the case that the first main video stream is to be played, and the second palette data is used in the case that the second main video stream is to be played.

Thus, using different palette data for the first luminance dynamic range (SDR) and the second luminance dynamic range (HDR) enables user visibility of subtitles to be improved.

Further, the bitmap data includes first bitmap data for the first luminance dynamic range (SDR) (e.g., BMP in the SDR PG1 stream) and second bitmap data for the second luminance dynamic range (HDR) (e.g., BMP in the HDR PG1 stream).

The sub-video stream includes multiple sets each of which corresponds to one of multiple types of sub-videos (e.g., different languages, or subtitles or menus of different contents), obtained by encoding multiple types of sub-videos displayed superimposed on the main video. Each includes multiple sets including a first sub-video stream (e.g., SDR PG1 stream) including first palette data and first bitmap data of a corresponding sub-video and a second sub-video stream (e.g., HDR PT1 stream) including second palette data and second bitmap data of a corresponding sub-video (set of SDR PG1 stream and HDR PG1 stream, and set of SDR PG2 stream and HDR PG2 stream). Each set includes a first sub-video stream where the sub-video corresponding to this set has been encoded (e.g., the SDR PG1 stream), and a second sub-video stream where the sub-video corresponding to this set has been encoded (e.g., the HDR PG1 stream).

Accordingly, the same type of sub-video is prepared for the first luminance dynamic range (SDR) and the second luminance dynamic range (HDR), so the user can be provided with the same viewing/listening experience when playing the first luminance dynamic range (SDR) and the second luminance dynamic range (HDR).

Also, the difference value between the value of a first identifier (SDR_PG1_PID) given to the first sub-video stream (e.g., SDR PG1 stream) included in a first set included in the multiple sets, and the value of a second identifier (SDR_PG2_PID) given to a first sub-video stream (e.g., SDR PG2 stream) included in a second set included in the multiple sets, is equal to the difference value between the value of a third identifier (HDR_PG1_PID) given to the second sub-video stream (e.g., HDR PG1 stream) included in the first set, and the value of a fourth identifier (HDR_PG2_PID) given to a second sub-video stream (e.g., HDR PG2 stream) included in the second set.

Also, the difference value between the stream registration order in a database (e.g., STN_table_DS( )) of the first sub-video stream (e.g., SDR PG1 stream) included in the first set included in the multiple sets, and the stream registration order in a database (e.g., STN_table_DS( )) of the first sub-video stream (e.g., SDR PG2 stream) included in the second set included in the multiple sets, is the same as the difference value between the stream registration order in a database (e.g., STN_table( )) of the second sub-video stream (e.g., HDR PG1 stream) included in the first set, and the stream registration order in a database (e.g., STN_table( )) of the second sub-video stream (e.g., HDR PG2 stream) included in the second set.

Accordingly, multiple types of sub-videos are switched in the same order when playing in the first luminance dynamic range (SDR) and in the second luminance dynamic range (HDR). For example, at the time of the user switching the order of the types of subtitles by remote controller button operations, the order of the types of subtitles to be switched can be made to be the same. Accordingly, the user can be provided with the same viewing experience when playing in the first luminance dynamic range (SDR) and in the second luminance dynamic range (HDR).

Further, the contents of processing by the playback device and so forth can be made to be the same in the first luminance dynamic range (SDR) and in the second luminance dynamic range (HDR), so the processing of the playback device can be simplified, and the functions and configuration of a conventional playback device that is only compatible with the first luminance dynamic range (SDR) can be applied. Thus, the development costs of a playback device compatible with the second luminance dynamic range (HDR) can be reduced.

Also, the design indicated by the first bitmap data and the second bitmap data included in the same set may the same.

Also, of the data included in the same set, all data may be the same other than the first palette data and the second palette data.

Also, the present disclosure may be realized as a playback device or playback method of reading out and executing data from the above-described recording medium. That is to say, the playback device according to the present embodiment includes: a readout unit that reads out a main video stream where a main video has been encoded, and a sub-video stream where a sub-video, that is to be superimposed on the main video and displayed, has been encoded; and a playback unit that plays the main video stream and the sub-video stream that have been read out. The sub-video stream includes bitmap data indicating a design of the sub-video and palette data specifying the display color of the design. The palette data includes first palette data for a first luminance dynamic range, and second palette data for a second luminance dynamic range that is broader than the first luminance dynamic range.

Fourth Embodiment

In a fourth embodiment, the playback device selects the HDR format to use from multiple HDR formats, using degree of priority set by the user and functions of the display device and playback device, that are set in PSRs. Specifically, playback operations of a BD player compatible with multiple playback formats (types) of HDR video streams will be described below. In the present embodiment, HDR video signals are automatically selected by guidance of the content producer or guidance of the end user, based on the HDR content format, and the HDR formats that the playback device (BD player or the like) and the display device (TV or the like) are compatible with.

Now, the BD player has multiple PSRs (Player Setting Registers) inside. The multiple PSRs are accessible from the navigation program written in the disc. Note that HDMV navigation and BD-J exist as this navigation. The multiple PSRs include a PSR indicating decoding functions of the playback device and functions of the display device. The content producer can comprehend the AV device of the end user by confirming this PSR, and select which content to reproduce.

PSRs will be described next. A PSR25 indicates HDR compatibility functions of the playback device (player). In a case where the playback device has functions of playing a type A HDR video stream, a b1 (bit 1) of the PSR25 is set to 1b, and otherwise to 0b. In a case where the playback device has functions of playing a type B HDR video stream, a b2 (bit 2) of the PSR25 is set to 1 b, and otherwise to 0b. In a case where the playback device has functions of playing a type C HDR video stream, a b3 (bit 3) of the PSR25 is set to 1b, and otherwise to 0b.

A PSR26 indicates HDR compatibility functions of the display device (display) connected to the playback device. In a case where the display device is compatible with input of type A HDR video signals, a b1 (bit 1) of the PSR26 is set to 1b, and otherwise to 0b. In a case where the display device is compatible with input of type B HDR video signals, a b2 (bit 2) of the PSR26 is set to 1 b, and otherwise to 0b. In a case where the display device is compatible with input of type C HDR video signals, a b3 (bit 3) of the PSR26 is set to 1 b, and otherwise to 0b.

The degree of preference of the user as to each of the multiple HDR technologies is set in a PSR27. A value set in b3 through b0 (bit 3 through bit 0) of the PSR27 indicates the degree of preference of the user as to type A HDR technology. A value set in b7 through b4 (bit 7 through bit 4) of the PSR27 indicates the of preference of the user as to type B HDR technology. A value set in b11 through b8 (bit 11 through bit 8) of the PSR27 indicates the degree of preference of the user as to type C HDR technology. For example, the larger each value set in the PSR27 is, this indicates that the higher the user preference as to the relevant HDR technology is (degree of priority is high).

Next, description will be made regarding a method of selecting one video stream from multiple HDR streams that the AV device of the user is capable of playing.

The playback device confirms the compatibility functions of the playback device (PSR25) and the compatibility functions of the display device (PSR26), and in a case where there are two or more HDR technologies that both the playback device and display device are compatible with, the HDR technology of the two or more HDR technologies of which the value set in the PSR27 is larger is selected.

Also, the following two options may be provided for the BD producer, with regarding to such PSR setting and selecting methods.

(1) The stream includes redundant data, and the content producer (content supplier) selects the HDR technology to use (selection method A).
(2) The stream does not include redundant data, and the user selects the HDR technology to user (selection method C).

Selection Method A

Figure 42:
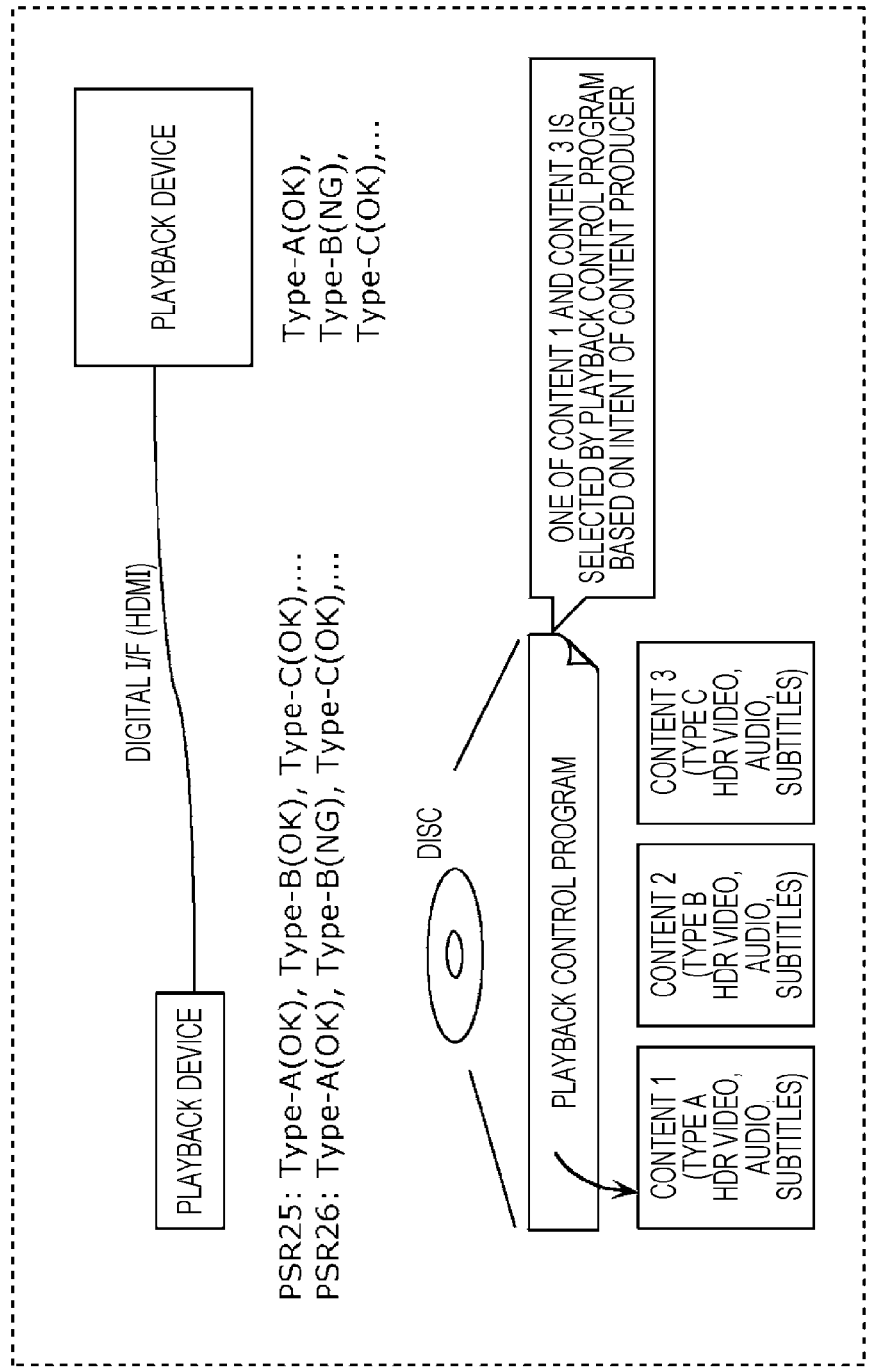
FIG. 42 is a diagram for describing a selection method A.

In the selection method A, the stream includes redundant data, and the content producer selects the HDR technology to use. FIG. 42 is a diagram for describing the selection method A.

First, the playback device confirms the PSR25 and PSR26 (step 1). Next, the playback device selects (a) an HDR technology that a playback device indicated by the PSR25 supports, that also is (b) an HDR technology that a display device indicated by the PSR26 supports, as a candidate (step 2).

In the example illustrated in FIG. 42, the playback device is compatible with type A, type B, and type C, while the display device is compatible with type A and type C but not with type B. Recorded in the disc is content 1 (type A), content 2 (type B), and content 3 (type C). Each content includes the HDR video stream, audio stream, and subtitle stream, of the corresponding type.

In this example, the HDR technology that the playback device and display device both are compatible with is type A and type C, so content 1 (type A) and content 3 (type C) are selected as candidates.

Next, the playback device selects one content from all candidates selected in step 2, and plays the selected content (step 3). In the example illustrated in FIG. 42, one of the content 1 and content 3 is selected based on the intent of the content producer, written in the playback program. Note that a PlayContent(n) command plays a Content # n.

In this case, the intent of the content producer, regarding which HDR technology is most preferable, is reflected in the AV playback environment of the user. Redundant audio and subtitle data is also recorded in the disc.

Selection Method B

Figure 43:
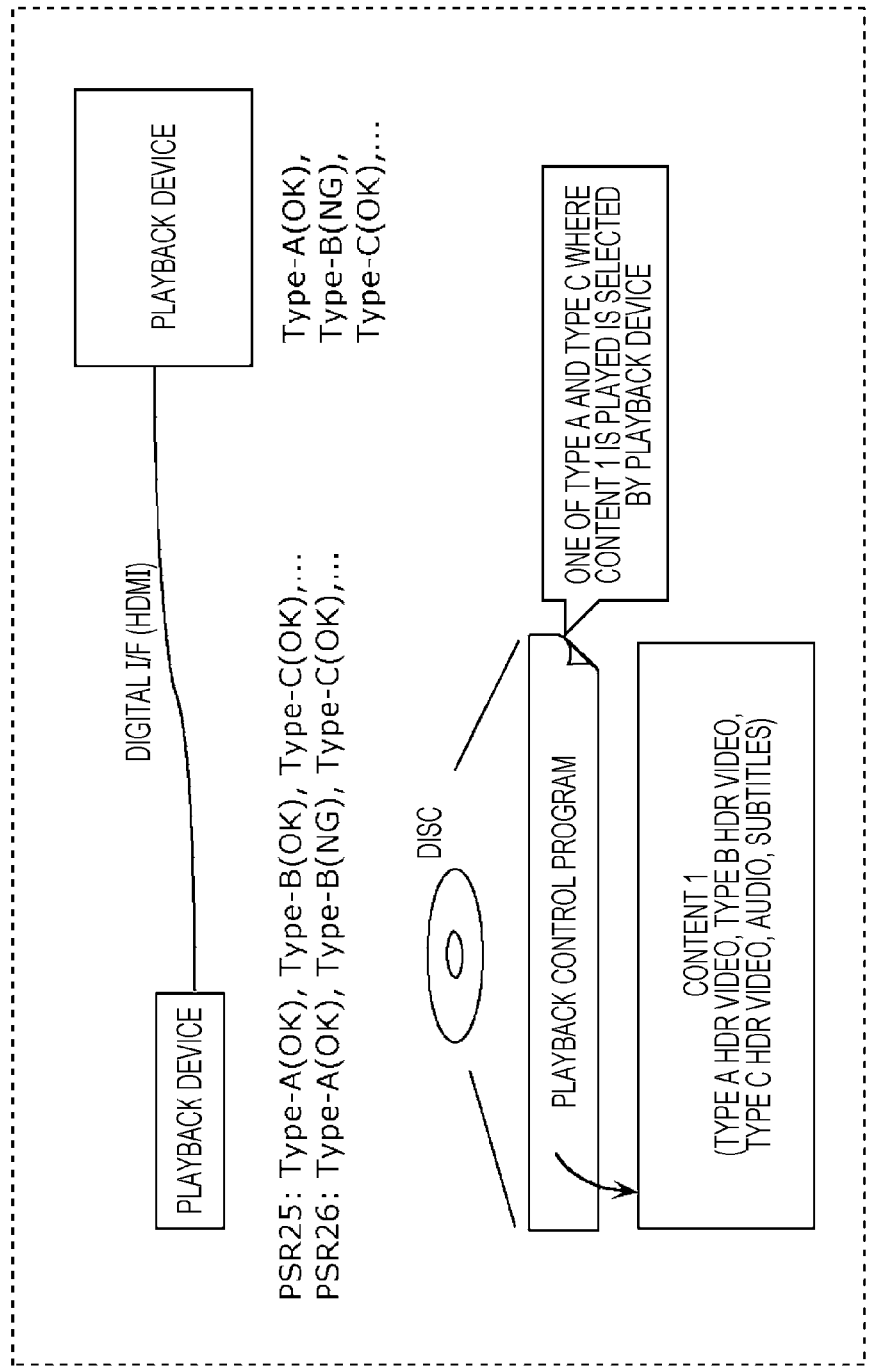
FIG. 43 is a diagram for describing a selection method B.

In the selection method B, the stream does not include redundant data, and the playback device selects the HDR technology to use. FIG. 43 is a diagram for describing the selection method B.

First, the playback device confirms the PSR25 and PSR26 (step 1). Next, the playback device selects (a) an HDR technology that a playback device indicated by the PSR25 supports, that also is (b) an HDR technology that a display device indicated by the PSR26 supports, as a candidate (step 2).

In the example illustrated in FIG. 43, the playback device is compatible with type A, type B, and type C, while the display device is compatible with type A and type C but not with type B. Recorded in the disc is content 1 (type A, type B, and type C). The content 1 includes the type A HDR video stream, type B HDR video stream, type C HDR video stream, audio stream, and subtitle stream. That is to say, the audio stream and subtitle stream are used in common with type A, type B, and type C.

In this example, the HDR technology that the playback device and display device both are compatible with is type A and type C, so type A and type C are selected as candidates.

Next, the playback device selects content 1 (step 3). Only content 1 is recorded in the disc here, so no selection of the video stream by PlayContent( ) is performed. Accordingly, the implementation at the playback device depends on which video stream has been selected. For example, at the time of playing the content 1, the playback device displays an interface of the like to prompt the user to select one of type A and type C, and plays the HDR video stream of the HDR technology (type) selected by user operations.

As described above, the disc has no redundant audio and subtitle data recorded. Also, the playback device decides which HDR video stream to play in accordance with the AV playing environment of the user (neither the content producer nor the user makes this decision).

Selection Method C

Figure 44:
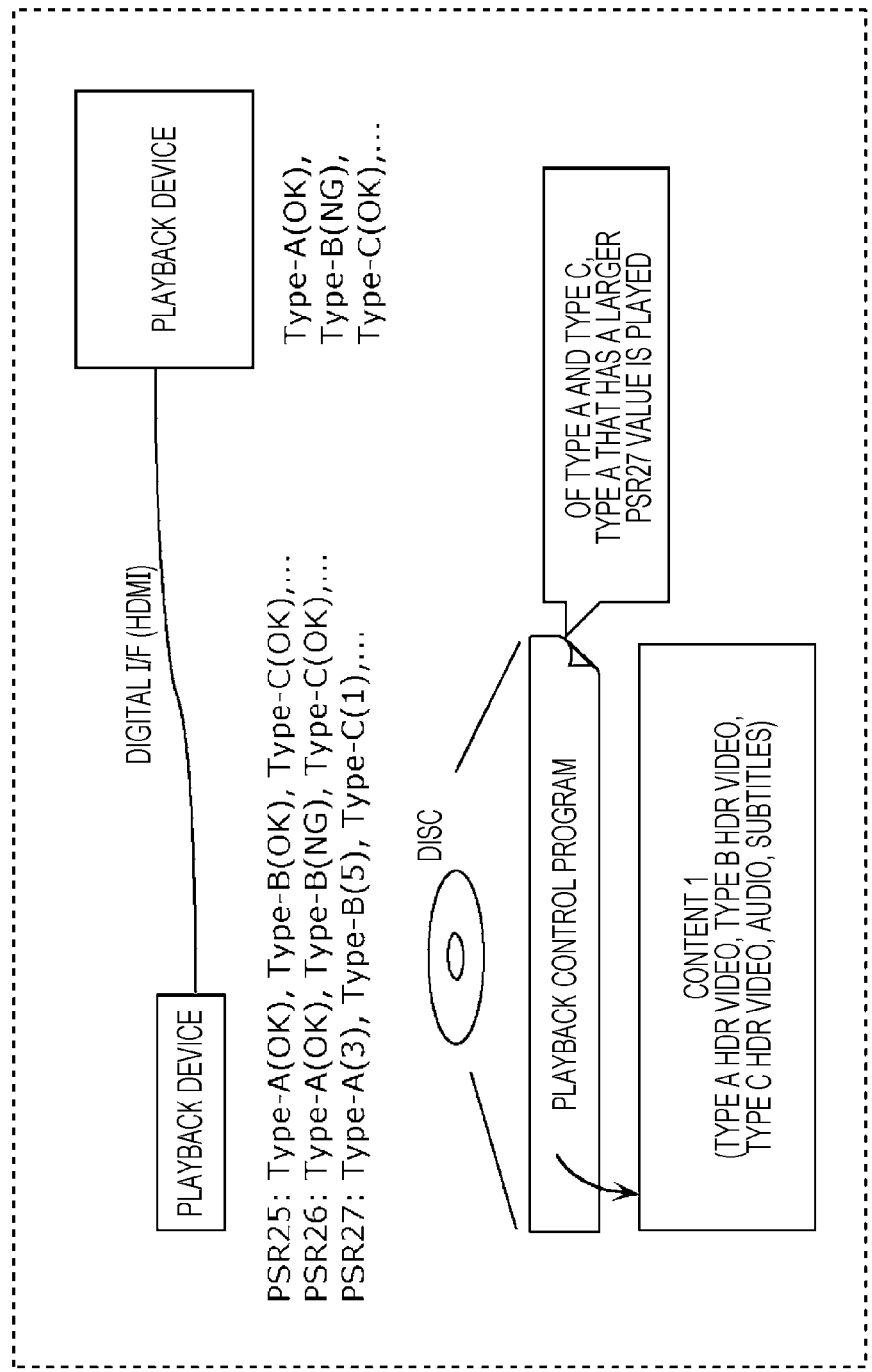
FIG. 44 is a diagram for describing a selection method C.

In the selection method C, the stream does not include redundant data, and the user selects the HDR technology to use. FIG. 44 is a diagram for describing the selection method C.

First, the playback device confirms the PSR25 and PSR26 (step 1). Next, the playback device selects (a) an HDR technology that a playback device indicated by the PSR25 supports, that also is (b) an HDR technology that a display device indicated by the PSR26 supports, as a candidate (step 2).

In the example illustrated in FIG. 44, the playback device is compatible with type A, type B, and type C, while the display device is compatible with type A and type C but not with type B. Recorded in the disc is content 1 (type A, type B, and type C). The content 1 includes the type A HDR video stream, type B HDR video stream, type C HDR video stream, audio stream, and subtitle stream.

In this example, the HDR technology that the playback device and display device both are compatible with is type A and type C, so type A and type C are selected as candidates.

Next, in a case where there are two or more candidates, the playback device confirms the PSR27, and selects from the two or more candidates the HDR technology that has the largest value for the PSR27 (step 3). The value for PSR27 is "3" for type A and "1" for type C, so type A that has the larger value is selected. The video stream of type A in the content 1 is played.

As described above, the disc has no redundant audio and subtitle data recorded. The user decides which HDR video stream to play in accordance with the AV playing environment of the user by the PSR27.

The following is a description of a method for updating the PSR27 in a case where the display device (TV) connected to the playback device has been changed. In a case where a new HDR technology becomes available, the playback device inquires the user's preference (degree of priority) for the new HDR technology, and updates the PSR27. For example, in a case where a display device (TV) compatible with a new HDR technology is connected, the playback device displays a menu for setting the PSR27.

Figure 45:
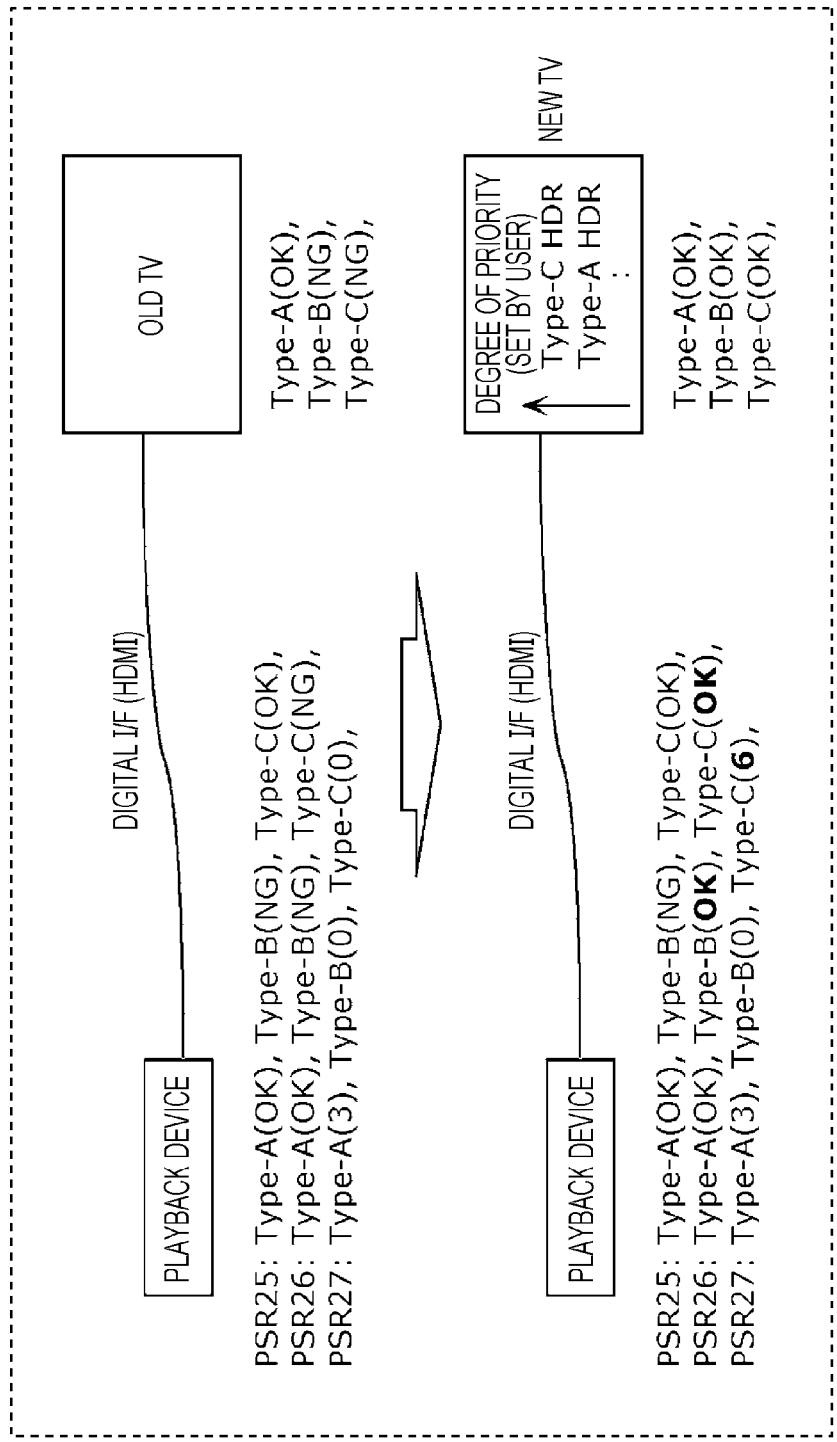
FIG. 45 is a diagram for describing an updating method of a PSR27 in a case where a display device connected to a playback device has been changed.

FIG. 45 is a diagram for describing the operations thereof. In the example illustrated in FIG. 45, the playback device is compatible with type A and type C, but is not compatible with type B. Also, the old TV is compatible with type A but is not compatible with type B and type C. Accordingly, in this state, only type A is usable, and only the degree of priority of type A is set in the PSR27.

Next, a new TV compatible with type A, type B, and type C is connected to the playback device, and the PSR 26 is updated. In this state, type A and type C is usable. That is to say, type C newly becomes usable. Accordingly, the playback device performs notification to prompt the user to set the degree of priority of type C, and the value of type C is updated in the PSR27 based on the user settings.

Next, a method of updating the PSR27 in a case where the playback device has been updated will be described. In a case where a new HDR technology becomes available, the playback device inquires the user's preference (degree of priority) for the new HDR technology, and updates the PSR27, in the same way as in the case of the display device having been changed.

Figure 46:
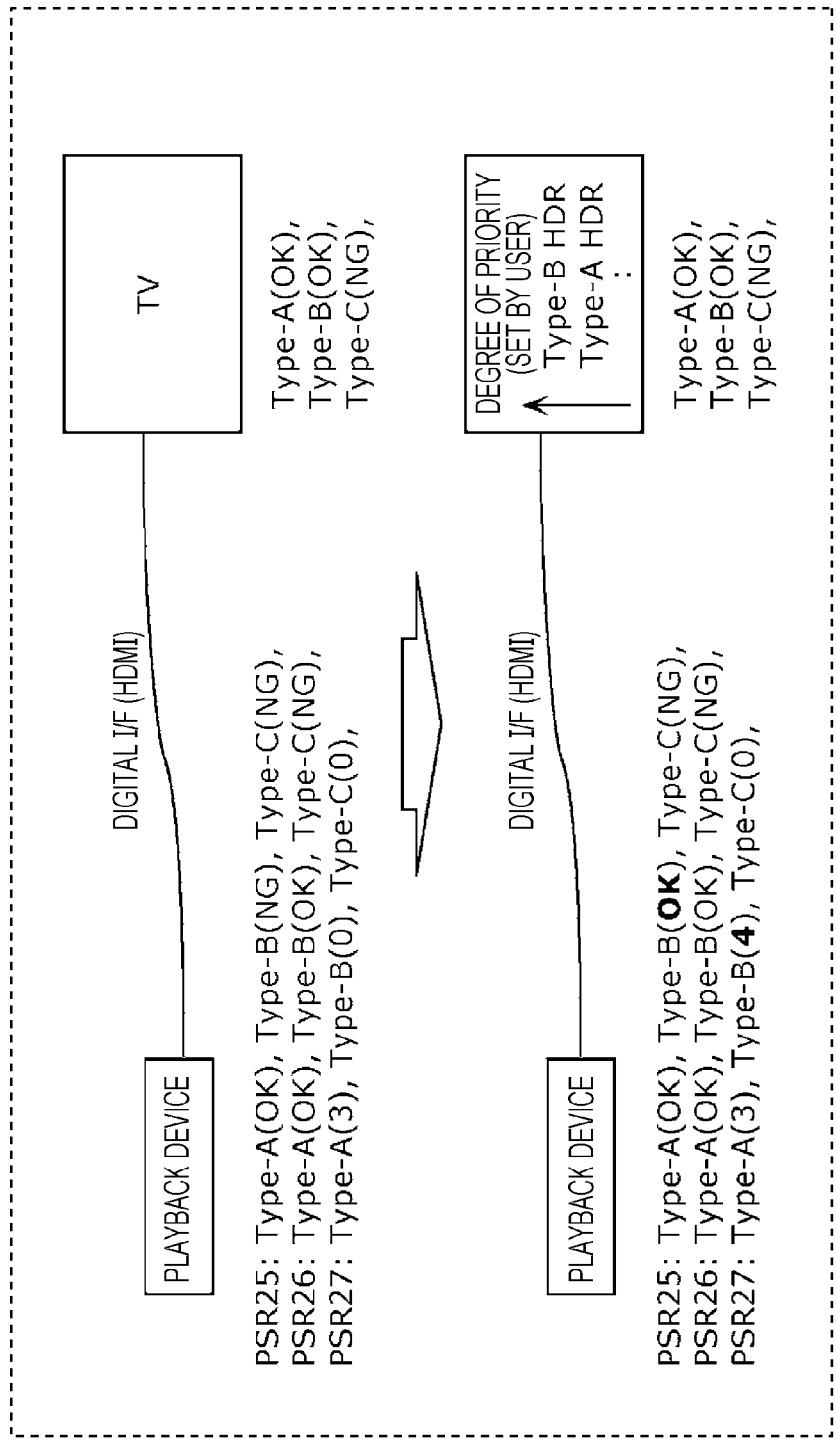
FIG. 46 is a diagram for describing an updating method of a PSR27 in a case where the playback device has been updated.

FIG. 46 is a diagram for describing the operations thereof. In the example illustrated in FIG. 46, before updating, the playback device is compatible only with type A and is not compatible with type B and type C. Also, the display device the is compatible with type A and type B, but is not compatible with type C. Accordingly, in this state, only type A is usable, and only the degree of priority of type A is set in the PSR27.

Next, the playback device is updated, and the PSR25 is updated. In this state, the playback device is compatible with type A and type B. Accordingly, in this state, the playback device is compatible with type A and type B. Thus, type A and type B, with which both the playback device and the display device are compatible, are usable. That is to say, type B newly becomes usable. Accordingly, the playback device performs notification to prompt the user to set the degree of priority of type B, and the value of type B is updated in the PSR27 based on the user settings.

As described above, the playback method according to the present embodiment is a playback method of a playback device that reads out from a recording medium and plays a video stream that is encoded video information. The playback device includes a first register (PSR25) storing first information indicating, out of multiple playback formats (type A through type C), a playback format corresponding to the playback device, a second register (PSR26) storing second information indicating, out of the multiple playback formats, a playback format corresponding to a display device connected to the playback device, and a third register (PSR27) storing third information indicating, out of the multiple playback formats, a playback format set by a user.

In the playback method, the video stream is played using the playback format indicated by the third information, in a case where the first information and the second information indicate that there are multiple playback formats corresponding to both the playback device and the display device, out of the multiple playback formats corresponding to both the playback device and the display device.

Specifically, the third information indicates a degree of priority of the multiple playback formats. In the playing, the playback format of the multiple playback formats corresponding to both the playback device and the display device of which the degree of priority indicated by the third information is the highest is used to play the video stream. Accordingly, the user can select a playback method according as desired.

Also, in the playback method, in a case where a playback format corresponding to both the playback device and the display device has been added by the first information or the second information being updated, notification is performed to prompt the user to set a degree of priority for the playback format that has been newly added.

Accordingly, in a case where a usable playback format has been added in accordance with change in the usage environment of the user, a menu or the like setting the degree of priority of this playback format is automatically displayed. Accordingly, ease of user for the user can be improved.

Also, the present disclosure may be realized as a playback device that executes the above-described playback method. That is to say, the playback device according to the present embodiment is a playback device that reads out from a recording medium and plays a video stream that is encoded video information. The device includes a first register storing first information indicating, out of multiple playback formats, a playback format corresponding to the playback device; a second register storing second information indicating, out of the multiple playback formats, a playback format corresponding to a display device connected to the playback device; a third register storing third information indicating, out of the multiple playback formats, a playback format set by a user; and a playback unit that plays the video stream using the playback format indicated by the third information, in a case where the first information and the second information indicate that there are a multiple playback formats corresponding to both the playback device and the display device, out of the multiple playback formats corresponding to both the playback device and the display device.

In the above embodiments, the components may be realized by a dedicated hardware configuration, or by executing a software program suitable for the components. The components may be realized by a program executing unit such as a CPU or processor reading out and executing a software program recorded in a recording medium such as a hard disk or semiconductor memory or the like.

Although the playback device and playback method according to one or multiple forms has been described by way of embodiments, the present disclosure is not restricted to these embodiments. Embodiments of various modifications conceivable by one skilled in the art, and forms configured by combining components in different embodiments, and so forth, may be included in the scope of one or multiple forms without departing from the essence of the present disclosure. Note that the above description is only exemplary, and that one skilled in the art can make various applications.

The present disclosure is applicable to a recording medium such as a BD, a playback device such as a BD player or the like that reads out and plays data in the recording medium, and a playback method.

What is claimed is:

1. A playback device that reads out from a recording medium and plays a plurality of High Dynamic Range (HDR) video streams that is encoded with video information and that has a wider luminance range than Standard Dynamic Range (SDR), the playback device comprising:
a first register that stores first information indicating, for each of a plurality of playback formats for the plurality of HDR video streams, whether the playback device corresponds to or not;
a second register that stores second information indicating, for each of the plurality of playback formats for the plurality of HDR video streams, whether a display device connected to the playback device corresponds to or not; and
a playback unit that plays the plurality of HDR video streams using a playback format selected based on a playback program stored in the recording medium, in a case where the first information and the second information indicate that there are a plurality of playback formats corresponding to both the playback device and the display device for the plurality of HDR video streams.

2. The playback device according to claim 1, wherein an intent of a content producer about the selected playback format of the HDR video streams with priority is reflected in the playback program.

3. A playback method of a playback device that reads out from a recording medium and plays a plurality of High Dynamic Range (HDR) video streams that is encoded with video information and that has a wider luminance range than Standard Dynamic Range (SDR), the playback method including:
storing, in a first register, first information indicating, for each of a plurality of playback formats for the plurality of HDR video streams, whether the playback device corresponds to or not;

storing, in a second register, second information indicating, for each of the plurality of playback formats for the plurality of HDR video streams, whether a display device connected to the playback device corresponds to or not; and playing the plurality of HDR video streams using a playback format selected based on a playback program stored in the recording medium, in a case where the first information and the second information indicate that there are a plurality of playback formats corresponding to both the playback device and the display device for the plurality of HDR video streams.

4. The playback method according to claim 3, wherein an intent of a content producer about the selected playback format of the HDR video streams with priority is reflected in the playback program.

\* \* \* \* \*